(12) United States Patent
Uenaka et al.

(10) Patent No.: US 7,295,770 B2
(45) Date of Patent: Nov. 13, 2007

(54) ANTI-SHAKE APPARATUS

(75) Inventors: Yukio Uenaka, Tokyo (JP); Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 359 days.

(21) Appl. No.: 11/108,868

(22) Filed: Apr. 19, 2005

(65) Prior Publication Data

US 2005/0232617 A1    Oct. 20, 2005

(30) Foreign Application Priority Data

| Apr. 20, 2004 | (JP) | ............................ P2004-123683 |
| Apr. 20, 2004 | (JP) | ............................ P2004-123817 |
| Apr. 20, 2004 | (JP) | ............................ P2004-123821 |
| Apr. 20, 2004 | (JP) | ............................ P2004-123995 |
| Apr. 20, 2004 | (JP) | ............................ P2004-124294 |
| Apr. 20, 2004 | (JP) | ............................ P2004-124298 |

(51) Int. Cl.
    *G03B 17/00* (2006.01)

(52) U.S. Cl. ...................................... 396/55; 348/208.7

(58) Field of Classification Search .................. 396/55; 348/208.7, 208.8, 208.11; 359/554–557
    See application file for complete search history.

(56) References Cited

U.S. PATENT DOCUMENTS

| 5,153,633 | A | * | 10/1992 | Otani | ............................ | 396/55 |
| 5,266,988 | A | * | 11/1993 | Washisu | ...................... | 396/55 |
| 5,974,269 | A | | 10/1999 | Sato et al. | | |
| 5,986,826 | A | * | 11/1999 | Kosaka et al. | ............... | 359/814 |
| 6,157,779 | A | * | 12/2000 | Kosaka et al. | ................. | 396/55 |
| 2003/0067544 | A1 | | 4/2003 | Wada | | |

FOREIGN PATENT DOCUMENTS

| JP | 7-261234 | 10/1995 |
| JP | 10-142647 | 5/1998 |
| JP | 2002-229090 | 8/2002 |
| JP | 2003-110919 | 4/2003 |

OTHER PUBLICATIONS

English Language Abstract of JP 2002-229090, Aug. 2002.
English Language Abstract of JP 2003-110919, Apr. 2003.
English Language Abstract of JP 7-261234, Oct. 1995.
U.S. Appl. No. 11/044,010 to Uenaka et al., filed Jan. 28, 2005.
U.S. Appl. No. 11/044,055 to Uenaka et al., filed Jan. 28, 2005.

(Continued)

*Primary Examiner*—W. B. Perkey
(74) *Attorney, Agent, or Firm*—Greenblum & Bernstein, P.L.C.

(57) ABSTRACT

An anti-shake apparatus of a photographing apparatus, comprises a movable unit, a fixed unit, and an urging member. The movable unit has one of an imaging device and a hand-shake correcting lens, and can be moved in first and second directions. The first direction is perpendicular to an optical axis of a photographing optical system of the photographing apparatus. The second direction is perpendicular to the optical axis and the first direction. The fixed unit slidably supports the movable unit in both the first and second directions. The urging member extends, and then urges and fixes the movable unit when the urging member is in the off state, and shrinks, and then releases fixing the movable unit when the urging member is in the on state.

45 Claims, 20 Drawing Sheets

OTHER PUBLICATIONS

U.S. Appl. No. 11/044,054 to Uenaka, filed Jan. 28, 2005.
U.S. Appl. No. 11/065,577 to Uenaka, filed Feb. 25, 2005.
U.S. Appl. No. 11/065,354 to Uenaka et al., filed Feb. 25, 2005.
U.S. Appl. No. 11/073,638 to Uenaka et al., filed Mar. 8, 2005.
U.S. Appl. No. 11/073,604 to Uenaka, filed Mar. 8, 2005.
U.S. Appl. No. 11/071,234 to Uenaka, filed Mar. 4, 2005.
U.S. Appl. No. 11/071,220 to Uenaka et al., filed Mar. 4, 2005.
U.S. Appl. No. 11/071,241 to Uenaka, filed Mar. 4, 2005.
U.S. Appl. No. 11/071,242 to Uenaka, filed Mar. 4, 2005.
U.S. Appl. No. 11/078,367 to Seo, filed Mar. 14, 2005.

* cited by examiner

ANTI-SHAKE APPARATUS

BACKGROUND OF THE INVENTION

1. Field of the Invention

The present invention relates to an anti-shake apparatus for a photographing device (apparatus), and in particular to a fixing apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus does not have a fixing-mechanism for fixing a movable unit at the center of its movement range such as a motor etc., and performs a moving operation of the movable unit, which includes a hand-shake correcting lens, by using a magnet and a coil.

However, in this anti-shake apparatus, the movable unit is moved by gravity etc., as the holding situation of the photographing apparatus is changed in the direction which is perpendicular to the optical axis, when the photographing apparatus which includes the anti-shake apparatus, is in the off state. This movement of the movable unit by gravity etc., can cause breakage problems.

Japanese unexamined patent publication (KOKAI) No. H10-142647 discloses an anti-shake apparatus for a photographing apparatus. The anti-shake apparatus has a fixing mechanism for fixing a movable unit at the center of its movement range such as a motor etc., and performs a moving operation of the movable unit, which includes a hand-shake correcting lens.

In this anti-shake apparatus, the above described problem does not occur, however, the anti-shake apparatus has to be enlarged.

SUMMARY OF THE INVENTION

Therefore, an object of the present invention is to provide an apparatus which fixes the movable unit having one of the imaging device and the hand-shake correcting lens, without using a mechanism which enlarges the photographing apparatus, such as a motor etc., in an anti-shake apparatus.

According to the present invention, an anti-shake apparatus of a photographing apparatus comprises a movable unit, a fixed unit, and an urging member.

The movable unit has one of an imaging device and a hand-shake correcting lens, and can be moved in first and second directions. The first direction is perpendicular to an optical axis of a photographing optical system of the photographing apparatus. The second direction is perpendicular to the optical axis and the first direction.

The fixed unit slidably supports the movable unit in both the first and second directions.

The urging member extends, and then urges and fixes the movable unit when the urging member is in the off state, and shrinks, and then releases the movable unit when the urging member is in the on state.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
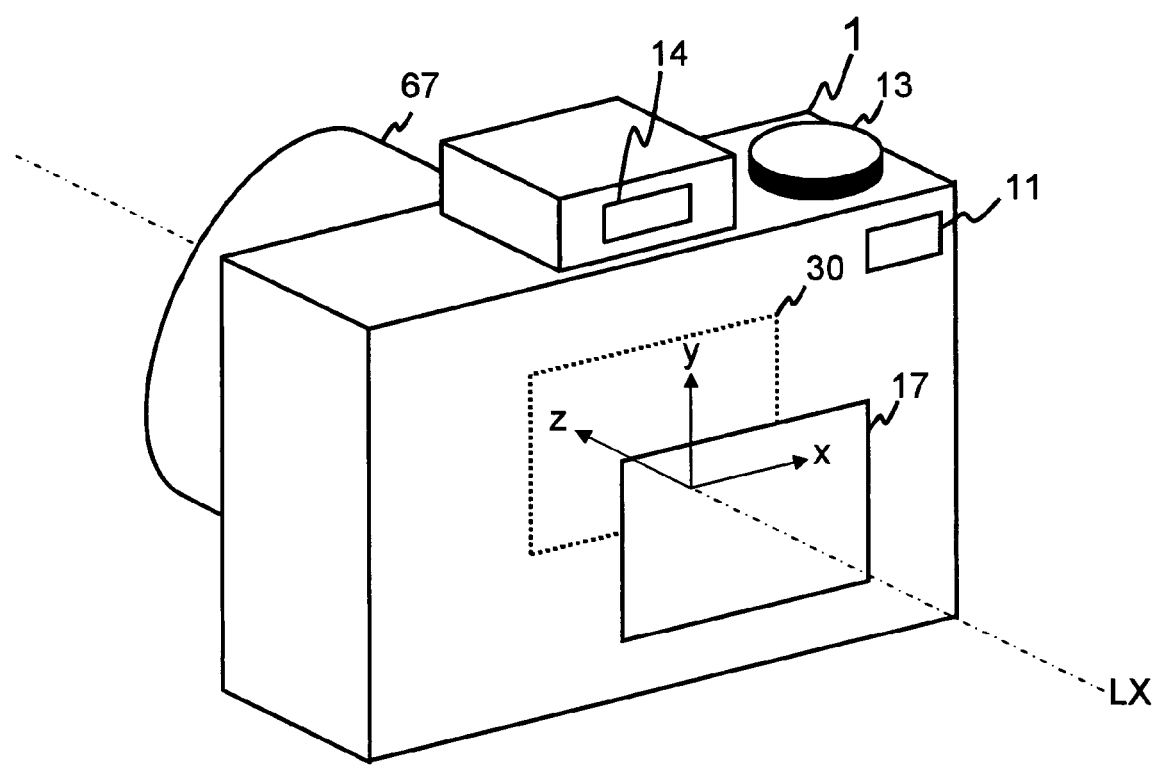
FIG. 1 is a perspective view of a photographing apparatus of all the embodiments viewed from the back side of the photographing apparatus.

The present invention is described below with reference to the embodiments shown in the drawings. In this embodiment, the photographing apparatus 1 is a digital camera. The photographing apparatus 1 has an optical axis LX.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 4:
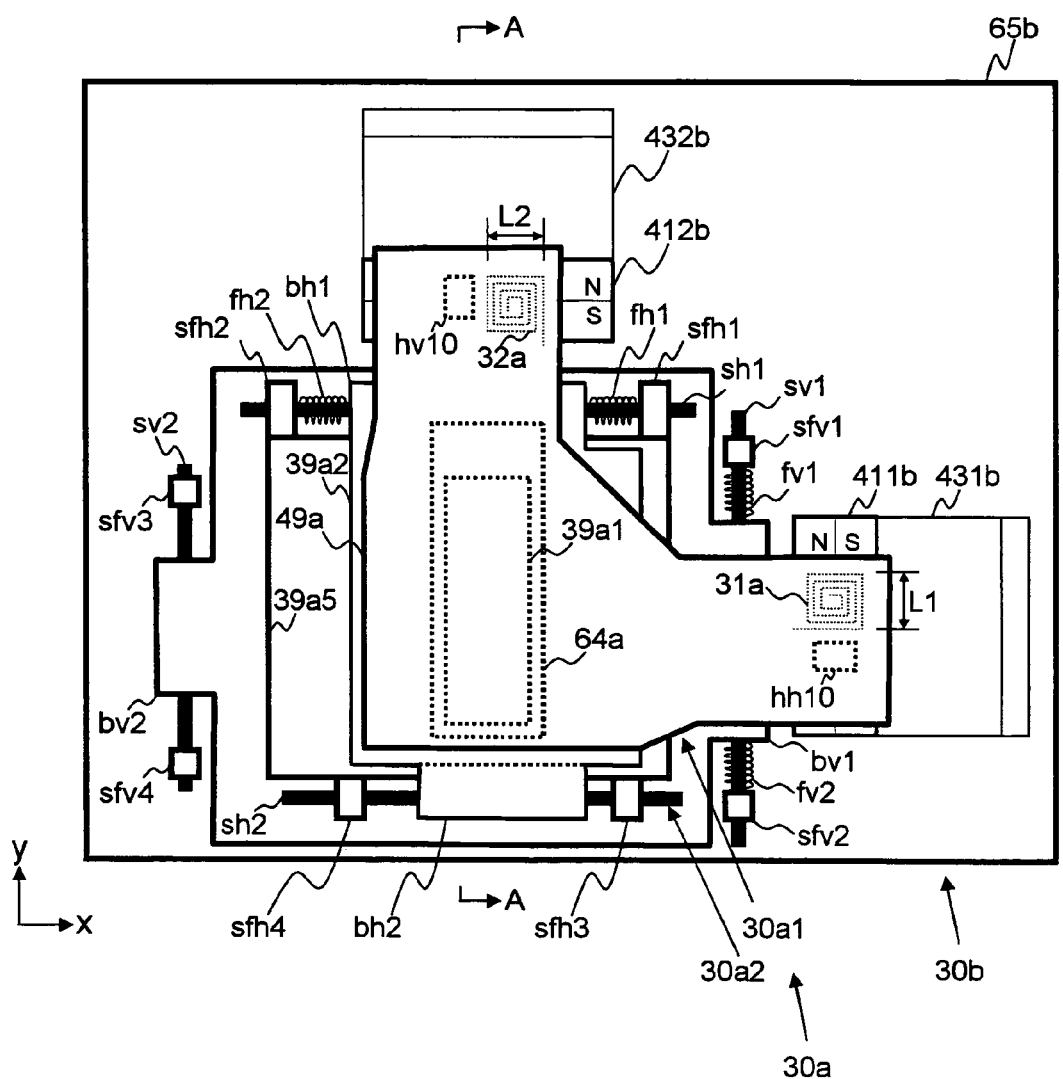
FIG. 4 is a figure showing the construction of the anti-shake unit, in the all embodiments.
Figure 5:
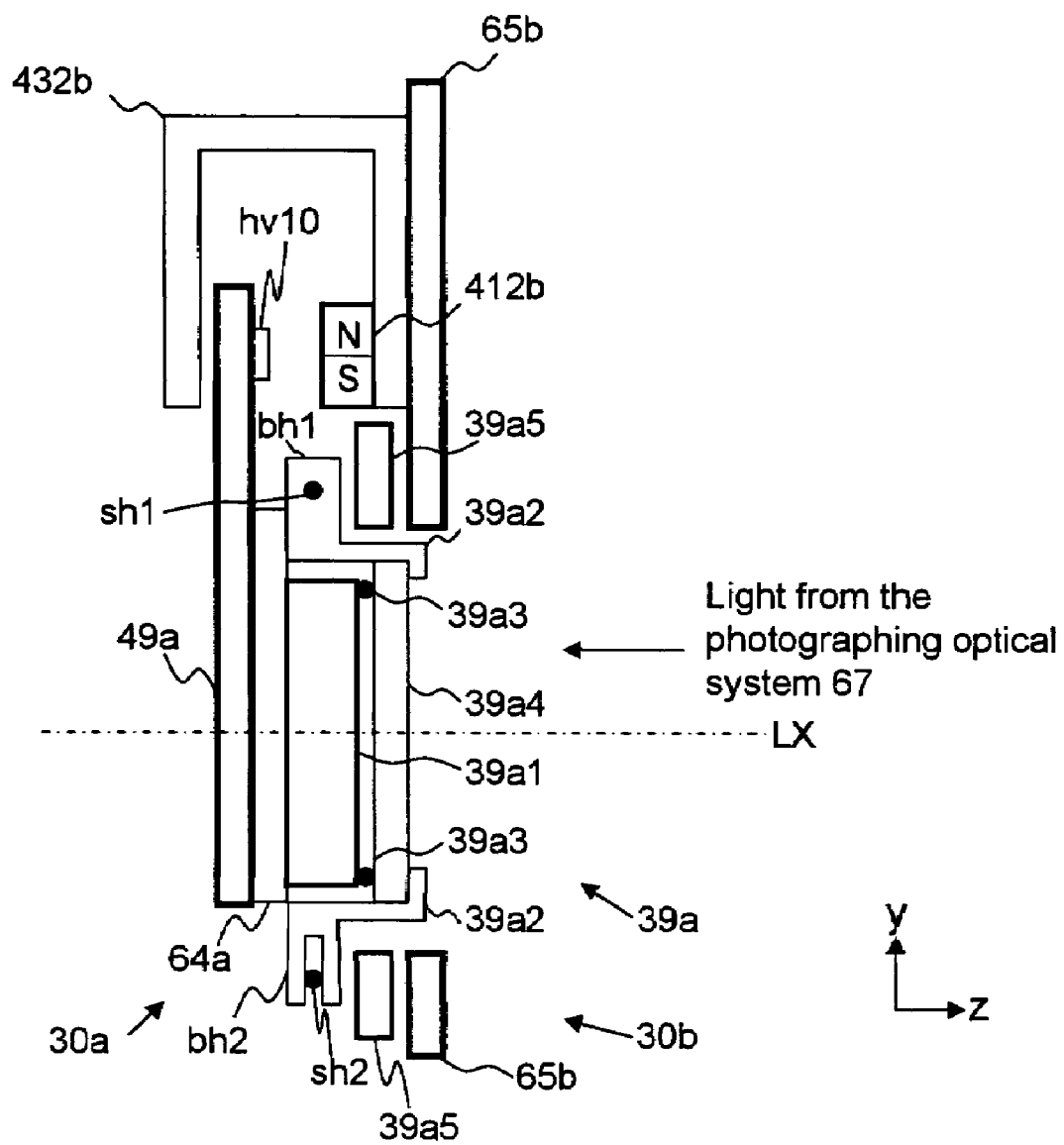
FIG. 5 is a view along line A-A of FIG. 4.

FIG. 5 shows a construction diagram of the section along line A-A of FIG. 4.

Figure 2:
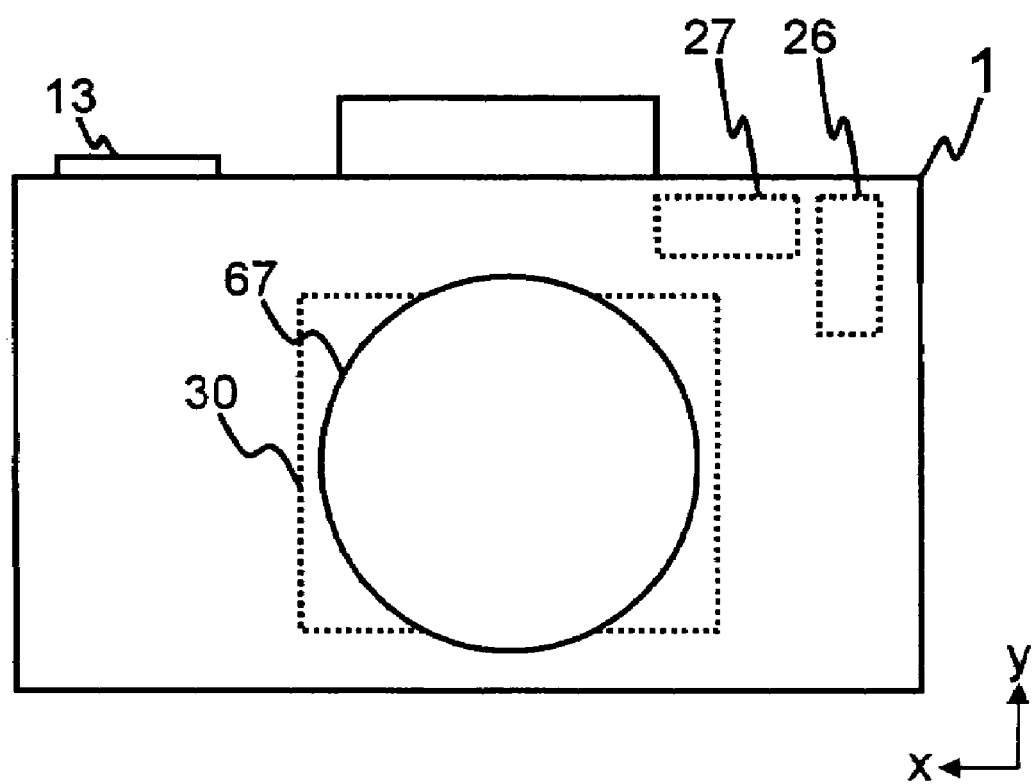
FIG. 2 is a front view of the photographing apparatus of all the embodiments.
Figure 3:
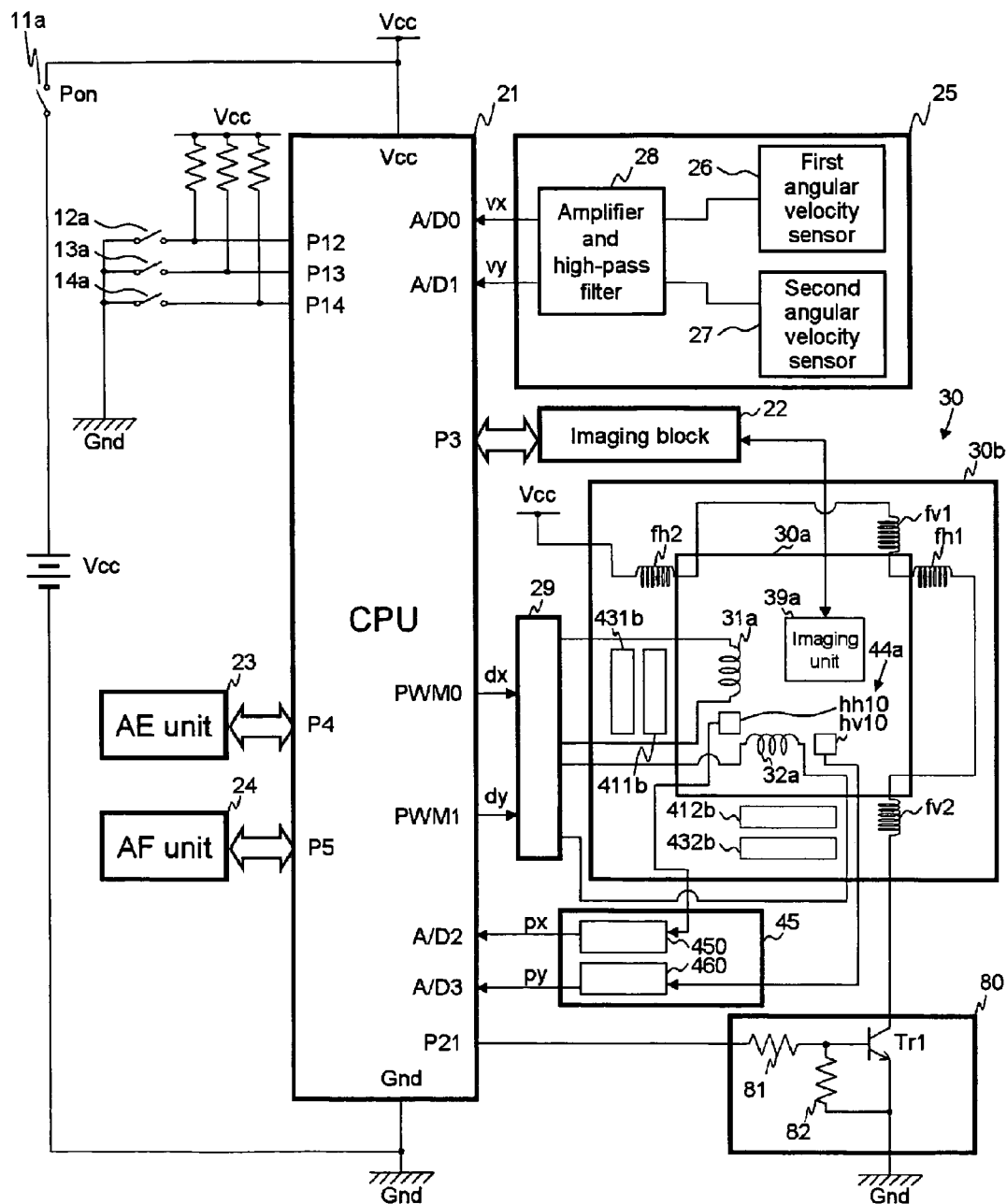
FIG. 3 is a circuit construction diagram of the photographing apparatus, in the first, second, third, fourth, fifth, and sixth embodiments.

The imaging part of the photographing apparatus 1 comprises a Pon button 11, a Pon switch 11*a*, a photometric switch 12a, a release button 13, a release switch 13a, an indicating unit 17 such as an LCD monitor etc., a CPU 21, an imaging block 22, an AE (automatic exposure) unit 23, an AF (automatic focusing) unit 24, an imaging unit 39a in the anti-shake unit 30, and a photographing optical system 67 (see FIGS. 1, 2, and 3).

Whether the Pon switch 11a is in the on state or the off state, is determined by a state of the Pon button 11, so that the on/off states of the photographing apparatus 1 are changed corresponding to the on/off states of the Pon switch 11a.

The photographic subject image is taken as an optical image through the photographing optical system 67 by the imaging block 22, which drives the imaging unit 39a, so that the image which is taken, is indicated on the indicating unit 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The CPU 21 controls an electrical on/off control of a first horizontal urging member fh1, a second horizontal urging member fh2, a first vertical urging member fv1, and a second vertical urging member fv2 by using the on/off change of an anti-shake switch 14a, through a port P21 and a second driver circuit 80.

The CPU 21 stores the value of a parameter IS which is used for judging whether the photographing apparatus 1 is in the anti-shake mode.

The imaging block 22 drives the imaging unit 39a.

The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the photographing optical system 67 is moved in the optical axis LX direction.

The anti-shaking part of the photographing apparatus 1 comprises an anti-shake button 14, an anti-shake switch 14a, a CPU 21, an angular velocity detecting unit 25, a first driver circuit 29, an anti-shake unit 30, a hall-element signal-processing unit 45, the photographing optical system 67, and a second driver circuit 80.

When the anti-shake button 14 is fully pushed by the operator, the anti-shake switch 14a changes to the on state, so that the anti-shake operation is performed where the angular velocity detecting unit 25 and the anti-shake unit 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In this embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

Next, the details of the input and output relationship with the CPU 21 for the angular velocity unit 25, the first driver circuit 29, the anti-shake unit 30, the hall-element signal-processing unit 45, and the second driver circuit 80 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y.

The location in the first direction x of the position S is defined as sx, and the location in the second direction y of the position S is defined as sy. The movement of the movable unit 30a, which includes the imaging unit 39a, is performed by using electro-magnetic force and is described later. The driving force D, which drives the first driver circuit 29 in order to move the movable unit 30a to the position S, has a first PWM duty dx as the driving-force component in the first direction x, and a second PWM duty dy as the driving-force component in the second direction y.

The anti-shake unit 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake unit 30 has a movable unit 30a, which includes the imaging unit 39a, a fixed unit 30b, first and second horizontal urging members fh1 and fh2, and first and second vertical urging members fv1 and fv2. Or, the anti-shake unit 30 is composed of a driving part which moves the movable unit 30a by electro-magnetic force to the position S, and a position-detecting part which detects the position of the movable unit 30a (a detected-position P).

The movable unit 30a is movable in a movable area on the fixed unit.

The size and the direction of the electro-magnetic force are determined by the size and the direction of the current which flows in the coil, and the size and the direction of the magnetic-field of the magnet.

The driving of the movable unit 30a of the anti-shake unit 30, is performed by the first driver circuit 29 which has the first PWM duty dx input from the PWM 0 of the CPU 21 and has the second PWM duty dy input from the PWM 1 of the CPU 21. The detected-position P of the movable unit 30a, either before moving or after moving, which is moved by driving the first driver circuit 29, is detected by the hall element unit 44a and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

Driving the movable unit 30a on the basis of the PID control, in other words the anti-shake operation, is performed in the anti-shake mode when the anti-shake switch 14a is in the on state.

The movable unit 30a is composed of a first movable assembly 30a1 and a second movable assembly 30a2. The first movable assembly 30a1 is movable in both the first direction x and the second direction y. The second movable assembly 30a2 is movable in the second direction y.

The first movable assembly 30a1 has a first driving coil 31a, a second driving coil 32a, an imaging unit 39a except for a vertical stage 39a5, a hall element unit 44a, a movable circuit board 49a, a plate 64a, a first horizontal bearing bh1, and a second horizontal bearing bh2 (see FIGS. 4 and 5).

The second movable assembly 30a2 has the vertical stage 39a5, a first horizontal shaft sh1, a second horizontal shaft sh2, a first horizontal shaft-fixing unit sfh1, a second horizontal shaft-fixing unit sfh2, a third horizontal shaft-fixing unit sfh3, a fourth horizontal shaft-fixing unit sfh4, a first vertical bearing bv1, and a second vertical bearing bv2.

The fixed unit 30b has a position-detecting magnet unit, a first position-detecting and driving yoke 431b, a second position-detecting and driving yoke 432b, a base board 65b, a first vertical shaft sv1, a second vertical shaft sv2, a first vertical shaft-fixing unit sfv1, a second vertical shaft-fixing unit sfv2, a third vertical shaft-fixing unit sfv3, and a fourth shaft-fixing unit sfv4. The position-detecting magnet unit has a first position-detecting and driving magnet 411b and a second position-detecting and driving magnet 412b.

Next, the way in which the fixed unit 30b slidably supports the movable unit 30a in both the first direction x and the second direction y, is explained.

The first and second vertical shafts sv1 and sv2 are shaped like long bars and are parallel to the second direction y when viewed from the third direction z. The first and second vertical bearings bv1 and bv2 are attached to the vertical stage 39a5 of the movable unit 30a. The first and second vertical shafts sv1 and sv2 are slidably supported in the vertical direction (the second direction y), by the first and second vertical bearings bv1 and bv2.

The first vertical shaft sv1 is fixed to the first and second vertical shaft-fixing units sfv1 and sfv2 which are attached to the base board 65b of the fixed unit 30b.

The second vertical shaft sv2 is fixed to the third and fourth vertical shaft-fixing units sfv3 and sfv4 which are attached to the base board 65b of the fixed unit 30b.

The first and second vertical shafts sv1 and sv2 have a location relation where the imaging device 39a1 is between the first and second vertical shafts sv1 and sv2 in the first direction x.

Therefore, the second movable assembly 30a2 can move relative to the fixed unit 30b, in the vertical direction (the second direction y).

The first and second horizontal shafts sh1 and sh2 are shaped like long bars and are parallel to the first direction x when viewed from the third direction z. The first and second horizontal bearings bh1 and bh2 are attached to the horizontal stage 39a2 of the movable unit 30a. The first and second horizontal shafts sh1 and sh2 are slidably supported in the horizontal direction (the first direction x), by the first and second horizontal bearings bh1 and bh2.

The first horizontal shaft sh1 is fixed to the first and second horizontal shaft-fixing units sfh1 and sfh2 which are attached to the vertical stage 39a5 of the movable unit 30a.

The second horizontal shaft sh2 is fixed to the third and fourth horizontal shaft-fixing units sfh3 and sfh4 which are attached to the vertical stage 39a5 of the movable unit 30a.

The first and second horizontal shafts sh1 and sh2 have a location relation where the imaging device 39a1 is between the first and second horizontal shafts sh1 and sh2 in the second direction y.

Therefore, the first movable assembly 30a1 can move relative to the second movable assembly 30a 2 and the fixed unit 30b, in the horizontal direction (the first direction x). Further, the first movable assembly 30a1 and the second movable assembly 30a2 can move relative to the fixed unit 30b in the vertical direction (the second direction y).

The first and second horizontal urging members fh1 and fh2 and the first and second vertical urging members fv1 and fv2 are made of a shape-memory alloy which shrinks when the temperature of the member itself increases during the electrical on state, and which expands (extends) when the temperature of the member itself decreases during the electrical off state. The shape-memory alloy can be a BioMetal of the trade name (TOKI CORPORATION) for example.

The first and second horizontal urging members fh1 and fh2 and the first and second vertical urging members fv1 and fv2 have a coil shape. The first horizontal shaft sh1 goes through the inside of the windings of the first and second horizontal urging members fh1 and fh2. The first vertical shaft sv1 goes through the inside of the windings of the first and second vertical urging members fv1 and fv2.

By having a coil shape, the extension speeds of the first and second horizontal urging members fh1 and fh2 and the first and second vertical urging members fv1 and fv2 become fast because the coil shape has an increased electrical resistance, in comparison with when the urging members fh1, fh2, fv1, and fv2 have another shape (i.e. do not have the coil shape).

The first horizontal urging member fh1 is arranged between the first horizontal bearing bh1 and the first horizontal shaft-fixing unit sfh1.

The second horizontal urging member fh2 is arranged between the first horizontal bearing bv1 and the second horizontal shaft-fixing unit sfh2.

The lengths of the first and second horizontal urging members fh1 and fh2 are set to the lengths, where the first horizontal urging member fh1 extends and then urges one of the edges of the first horizontal bearing bh1 in the first direction x and the second horizontal urging member fh2 extends and then urges another of the edges of the first horizontal bearing bh1 in the first direction x during the electrical off state, so that the movable unit 30a can be fixed at the center of its movement range in the first direction x, and the first and second horizontal urging members fh1 and fh2 shrink during the electrical on state, so that the movable unit 30a can be movable in its movement range in the first direction x.

The first vertical urging member fv1 is arranged between the first vertical bearing bv1 and the first vertical shaft-fixing unit sfv1.

The second vertical urging member fv2 is arranged between the first vertical bearing bv1 and the second vertical shaft-fixing unit sfv2.

The lengths of the first and second vertical urging members fv1 and fv2 are set to the lengths, where the first vertical urging member fv1 extends and then urges one of the edges of the first vertical bearing bv1 in the second direction y and the second vertical urging member fv2 extends and then urges another of the edges of the first vertical bearing bv1 in the second direction y during the electrical off state, so that the movable unit 30a can be fixed at the center of its movement range in the second direction y, and the first and second vertical urging members fv1 and fv2 shrink during the electrical on state, so that the movable unit 30a can be movable in its movement range in the second direction y.

Accordingly, the movable unit 30a is fixed at the center of its movement range in both the first direction x and the second direction y, when the first and second horizontal urging members fh1 and fh2 and the first and second vertical urging members fv1 and fv2 extend during the electrical off state.

Specifically, the first horizontal urging member fh1 urges the first horizontal bearing bh1 from one side in the first direction x, and the second horizontal urging member fh2 urges the first horizontal bearing bh1 from another side in the first direction x, so that the first movable assembly 30a1 of the movable unit 30a is fixed at the center of its movement range in the first direction x.

The first and second horizontal urging members fh1 and fh2 have a location relation where the first movable assembly 30a1 is held by the first and second horizontal urging members fh1 and fh2 in the first direction x.

Similarly, the first vertical urging member fv1 urges the first vertical bearing bv1 from one side in the second direction y, and the second vertical urging member fv2 urges the first vertical bearing bv1 from another side in the second direction y, so that the second movable assembly 30a2 of the movable unit 30a is fixed at the center of its movement range in the second direction y.

The first and second vertical urging members fv1 and fv2 have a location relation where the second movable assembly 30a2 is held by the first and second vertical urging members fv1 and fv2 in the second direction y.

Further, the first movable assembly 30a1 is also fixed at the center of its movement range in the second direction y, corresponding to the second movable assembly 30a2 which is fixed at the center of its movement range in the second direction y.

FIG. 4 shows where the first and second horizontal urging members fh1 and fh2 and the first and second vertical urging members fv1 and fv2 extend during the electrical off state, so that the movable unit 30a is fixed at the center of its movement range.

In the first embodiment, the first and second horizontal urging members fh1 and fh2 and the first and second vertical urging members fv1 and fv2 are connected in series (see FIG. 3). However, the urging members fh1, fh2, fv1, and fv2 may be connected in parallel (not depicted).

When the center area of the imaging device 39a1 is located on the optical axis LX of the photographing optical system 67, the location relation between the movable unit 30a and the fixed unit 30b is set up so that the movable unit 30a is located at the center of its movement range in both the first direction x and the second direction y, in order to utilize the full size of the imaging range of the imaging device 39a1 for the anti-shake operation.

A rectangle shape, which forms the imaging surface (the valid pixel area) of the imaging device 39a1, has two diagonal lines. In the first embodiment, the center of the imaging device 39a1 is the crossing point of these two diagonal lines.

In this embodiment, the center of the imaging device 39a1 agrees with the center of gravity of the rectangular shape of the valid pixel area. Accordingly, when the movable unit 30a is located at the center of its movement range, the center of gravity of the rectangle shape of the valid pixel area is located on the optical axis LX of the photographing optical system 67.

The imaging unit 39a, the plate 64a, and the movable circuit board 49a are attached, in this order along the optical axis LX direction, viewed from the side of the photographing optical system 67. The imaging unit 39a has an imaging device 39a1 (such as a CCD or a COMS etc.), a horizontal stage 39a2, a holding unit 39a3, an optical low-pass filter 39a4, and a vertical stage 39a5. The horizontal stage 39a2 and the plate 64a hold and urge the imaging device 39a1, the holding unit 39a3, and the optical low-pass filter 39a4 in the optical axis LX direction.

The first and second horizontal bearings bh1 and bh2 are attached to the horizontal stage 39a2. The first, second, third, and fourth horizontal shaft-fixing unit sfh1, sfh2, sfh3, and sfh4 are attached to the vertical stage 39a5. The first and second vertical bearings bv1 and bv2 are attached to the vertical stage 39a5. The first, second, third, and fourth vertical shaft-fixing unit sfv1, sfv2, sfv3, and sfv4 are attached to the base board 65b.

The imaging device 39a1 is attached to the plate 64a, so that positioning of the imaging device 39a1 is performed where the imaging device 39a1 is perpendicular to the optical axis LX of the photographing optical system 67. In the case where the plate 64a is made of a metallic material, the plate 64a has the effect of radiating heat from the imaging device 39a1, by contacting the imaging device 39a1.

The first driving coil 31a, the second driving coil 32a, and the hall element unit 44a are attached to the movable circuit board 49a.

The first driving coil 31a forms a seat and a spiral shape coil pattern. The coil pattern of the first driving coil 31a has lines which are parallel to either the first direction x or the second direction y, where the movable unit 30a which includes the first driving coil 31a, is moved in the first direction x, by the first electro-magnetic force. The lines which are parallel to the second direction y, are used for moving the movable unit 30a in the first direction x. The lines which are parallel to the second direction y, have a first effective length L1.

The first electro-magnetic force occurs on the basis of the current direction of the first driving coil 31a and the magnetic-field direction of the first position-detecting and driving magnet 411b.

The second driving coil 32a forms a seat and a spiral shape coil pattern. The coil pattern of the second driving coil 32a has lines which are parallel to either the first direction x or the second direction y, where the movable unit 30a which includes the second driving coil 32a, is moved in the second direction y, by the second electromagnetic force. The lines which are parallel to the first direction x, are used for moving the movable unit 30a in the second direction y. The lines which are parallel to the first direction x, have a second effective length L2.

The second electro-magnetic force occurs on the basis of the current direction of the second driving coil 32a and the magnetic-field direction of the second position-detecting and driving magnet 412b.

The first and second driving coils 31a and 32a are connected with the first driver circuit 29 which drives the first and second driving coils 31a and 32a through the flexible circuit board (not depicted). The first PWM duty dx is input to the first driver circuit 29 from the PWM 0 of the CPU 21, and the second PWM duty dy is input to the first driver circuit 29 from the PWM 1 of the CPU 21. The first driver circuit 29 supplies power to the first driving coil 31a corresponding to the value of the first PWM duty dx, and to the second driving coil 32a corresponding to the value of the second PWM duty dy, to drive the movable unit 30a.

The first and second horizontal urging members fh1 and fh2, and the first and second vertical urging members fv1 and fv2 are connected with the second driver circuit 80, through the flexible circuit board (not depicted).

Specifically, one of the terminals of the second horizontal urging member fh2 is connected with a power supply whose voltage is the voltage Vcc. Another terminal of the second horizontal urging member fh2 is connected with one of the terminals of the first vertical urging member fv1. Another terminal of the first vertical urging member fv1 is connected with one of the terminals of the first horizontal urging member fh1. Another terminal of the first horizontal urging member fh1 is connected with one of the terminals of the second vertical urging member fv2. Another terminal of the second vertical urging member fv2 is connected with a collector of the transistor Tr1 of the second driver circuit 80.

The second driver circuit 80 is connected with the port P21 of the CPU 21. The Hi signal and the Lo signal are output from the port P21 to the second driver circuit 80. When the port P21 outputs the Hi signal, the first and second horizontal urging members fh1 and fh2 and the first and second vertical urging members fv1 and fv2 are set to the on state. When the port P21 outputs the Lo signal, the urging members fh1, fh2, fv1, and fv2 are set to the off state.

When the photographing apparatus 1 is in the off state, the urging members fh1, fh2, fv1, and fv2 are set to the off state. Further, when the photographing apparatus 1 is in the on state and when the anti-shake operation is not performed (in the non anti-shake mode), the urging members fh1, fh2, fv1, and fv2 are also set to the off state.

When the photographing apparatus 1 is in the on state, and when the anti-shake operation is performed (in the anti-shake mode), the urging members fh1, fh2, fv1, and fv2 are set to the on state.

When the urging members fh1, fh2, fv1, and fv2 are in the off state, the first and second horizontal urging members fh1 and fh2 extend and then restrict the movement of the movable unit 30a and fix the movable unit 30a at the center of its movement range in the first direction x, so that the first and second vertical urging members fv1 and fv2 extend and then restrict the movement the movable unit 30a and fix the movable unit 30a at the center of its movement range in the second direction y.

When the urging members fh1, fh2, fv1, and fv2 are in the on state, the first and second horizontal urging members fh1 and fh2 shrink and release the fixed situation of the movable unit 30a in the first direction x (non-restricted movement), so that the first and second vertical urging members fv1 and fv2 shrink and release the fixed situation of the movable unit 30a in the second direction y (non-restricted movement).

Accordingly, the on/off states of the urging members fh1, fh2, fv1, and fv2 are changed corresponding to the on/off states of the Pon switch 11a and the on/off states of the anti-shake switch 14a.

The second driver circuit 80 is composed of transistor Tr1, a first bias resistor 81, and a second bias resistor 82. The transistor Tr1 is an NPN transistor which performs the switching of the power supplied to the first and second horizontal urging members fh1 and fh2 and the first and second vertical urging members fv1 and fv2, and whose base is connected to the port P21 of the CPU 21 through the first bias resistor 81. The second bias resistor 82 is connected between the base of the transistor Tr1 and the emitter of the transistor Tr1.

In the case where the anti-shake unit 30 does not have urging members such as the first and second horizontal urging members fh1 and fh2 and the first and second vertical urging members fv1 and fv2, which urge and fix the movable unit 30a at the center of its movement range, a fixing mechanism such as a motor, which fixes the movable unit 30a at the center of its movement range, is needed.

If the anti-shake unit 30 also does not have the fixing mechanism, when the photographing apparatus 1 is in the off state, the movable unit 30a is not fixed, so that the movable unit 30a is moved by gravity etc., as the holding situation of the photographing apparatus 1 is changed in the direction which is perpendicular to the optical axis LX. This movement of the movable unit 30a by gravity etc., has breakage problems. Further, when the photographing apparatus 1 is in the on state and in the non anti-shake mode (IS=0), the movable unit 30a has to be moved and held at the center of its movement range, so that the coil such as the first and second driving coils 31a and 32a have to be driven. This driving of the coil has a problem of consuming too much power.

If the anti-shake unit 30 has a fixing mechanism such as a motor, the anti-shake unit 30 (the photographing apparatus 1) is enlarged.

In the first embodiment, when the photographing apparatus 1 is in the off state, or when the photographing apparatus 1 is in the on state and in the non anti-shake mode, the first and second horizontal urging members fh1 and fh2 and the first and second vertical urging members fv1 and fv2 are set to the off state and extend and then urge and fix the movable unit 30a at the center of its movement range. Because this is done in the off state, the problem of consuming too much power does not occur.

Further, a fixing mechanism such as a motor is not needed, because the fixing of the movable unit 30a is performed by the first and second horizontal urging members fh1 and fh2 and the first and second vertical urging members fv1 and fv2. Therefore, the anti-shake unit 30 (the photographing apparatus 1) is not enlarged by the fixing mechanism.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the base board 65b of the fixed unit 30b, on the side of the movable unit 30a, in the third direction z.

The length of the first position-detecting and driving magnet 411b in the second direction y, is longer in comparison with the first effective length L1 of the first driving coil 31a. The magnetic-field which influences the first driving coil 31a and the horizontal hall element hh10, is not changed during movement of the movable unit 30a in the second direction y.

The second position-detecting and driving magnet 412b is attached to the second position-detecting and driving yoke 432b, under the condition where the N pole and S pole are arranged in the second direction y. The second position-detecting and driving yoke 432b is attached to the base board 65b of the fixed unit 30b, on the side of the movable unit 30a, in the third direction z.

The length of the second position-detecting and driving magnet 412b in the first direction x, is longer in comparison with the second effective length L2 of the second driving coil 32a. The magnetic-field which influences the second driving coil 32a and the vertical hall element hv10, is not changed during movement of the movable unit 30a in the first direction x.

The first position-detecting and driving yoke 431b is made of a soft magnetic material, and forms a square-u-shape channel when viewed from the second direction y. The first position-detecting and driving magnet 411b, the first driving coil 31a, and the horizontal hall element hh10 are inside the channel of the first position-detecting and driving yoke 431b.

The side of the first position-detecting and driving yoke 431b, which contacts the first position-detecting and driving magnet 411b, prevents the magnetic-field of the first position-detecting and driving magnet 411b from leaking to the surroundings.

The other side of the first position-detecting and driving yoke 431b (which faces the first position-detecting and driving magnet 411b, the first driving coil 31a, and the movable circuit board 49a) raises the magnetic-flux density between the first position-detecting and driving magnet 411b and the first driving coil 31a, and between the first position-detecting and driving magnet 411b and the horizontal hall element hh10.

The second position-detecting and driving yoke 432b is made of a soft magnetic material, and forms a square-u-shape channel when viewed from the first direction x. The second position-detecting and driving magnet 412b, the second driving coil 32a, and the vertical hall element hv10 are inside the channel of the second position-detecting and driving yoke 432b.

The side of the second position-detecting and driving yoke 432b, which contacts the second position-detecting and driving magnet 412b, prevents the magnetic-field of the second position-detecting and driving magnet 412b from leaking to the surroundings.

The other side of the second position-detecting and driving yoke 432b (which faces the second position-detecting and driving magnet 412b, the second driving coil 32a, and the movable circuit board 49a) raises the magnetic-flux density between the second position-detecting and driving magnet 412b and the second driving coil 32a, and between the second position-detecting and driving magnet 412b and the vertical hall element hv10.

The hall element unit 44a is a one-axis hall element which has two hall elements that are magnetoelectric converting elements (magnetic-field change-detecting elements) using the Hall Effect. The hall element unit 44a detects the first detected-position signal px which is used for specifying the first location in the first direction x for the present position P of the movable unit 30a, and the second detected-position signal py which is used for specifying the second location in the second direction y for the present position P of the movable unit 30a.

One of the two hall elements is a horizontal hall element hh10 for detecting the first location in the first direction x of the movable unit 30a, so that the other is a vertical hall element hv10 for detecting the second location in the second direction y of the movable unit 30a (see FIG. 4).

The horizontal hall element hh10 is attached to the movable circuit board 49a of the movable unit 30a, under the condition where the horizontal hall element hh10 faces the first position-detecting and driving magnet 411b of the fixed unit 30b, in the third direction z.

The vertical hall element hv10 is attached to the movable circuit board 49a of the movable unit 30a, under the condition where the vertical hall element hv10 faces the second position-detecting and driving magnet 412b of the fixed unit 30b, in the third direction z.

When the center of the imaging device 39a1, passes through the optical axis LX, it is desirable that the horizontal hall element hh10 is located at a place on the hall element unit 44a which faces an intermediate area between the N pole and S pole of the first position-detecting and driving magnet 411b in the first direction x, viewed from the third direction z, to perform the position-detecting operation utilizing the full size of the range where an accurate position-detecting operation can be performed based on the linear output-change (linearity) of the one-axis hall element.

Similarly, when the center of the imaging device 39a1, passes through the optical axis LX, it is desirable that the vertical hall element hv10 is located at a place on the hall element unit 44a which faces an intermediate area between the N pole and S pole of the second position-detecting and driving magnet 412b in the second direction y, viewed from the third direction z.

The base board 65b is a plate state member which becomes the base for attaching the first position-detecting and driving yoke 431b etc., and is arranged being parallel to the imaging surface of the imaging device 39a1.

In this embodiment, the base board 65b is arranged at the side nearer to the photographing optical system 67 in comparison with the movable circuit board 49a, in the third direction z. However, the movable circuit board 49a may be arranged at the side nearer to the photographing optical system 67 in comparison with the base board 65b. In this case, the first and second driving coils 31a and 32a, and the hall element unit 44a are arranged on the opposite side of the movable circuit board 49a to the photographing optical system 67, so that the first and second position-detecting and driving magnets 411b and 412b are arranged on the same side of the base board 65b as the photographing optical system 67.

The hall-element signal-processing unit 45 has a first hall-element signal-processing circuit 450 and a second hall-element signal-processing circuit 460.

The first hall-element signal-processing circuit 450 detects a horizontal potential-difference x10 between output terminals of the horizontal hall element hh10, based on an output signal of the horizontal hall element hh10.

The first hall-element signal-processing circuit 450 outputs the first detected-position signal px, which specifies the first location in the first direction x of the movable unit 30a, to the A/D converter A/D 2 of the CPU 21, on the basis of the horizontal potential-difference x10.

The second hall-element signal-processing circuit 460 detects a vertical potential-difference y10 between output terminals of the vertical hall element hv10, based on an output signal of the vertical hall element hv10.

The second hall-element signal-processing circuit 460 outputs the second detected-position signal py, which specifies the second location in the second direction y of the movable unit 30a, to the A/D converter A/D 3 of the CPU 21, on the basis of the vertical potential-difference y10.

Figure 6:
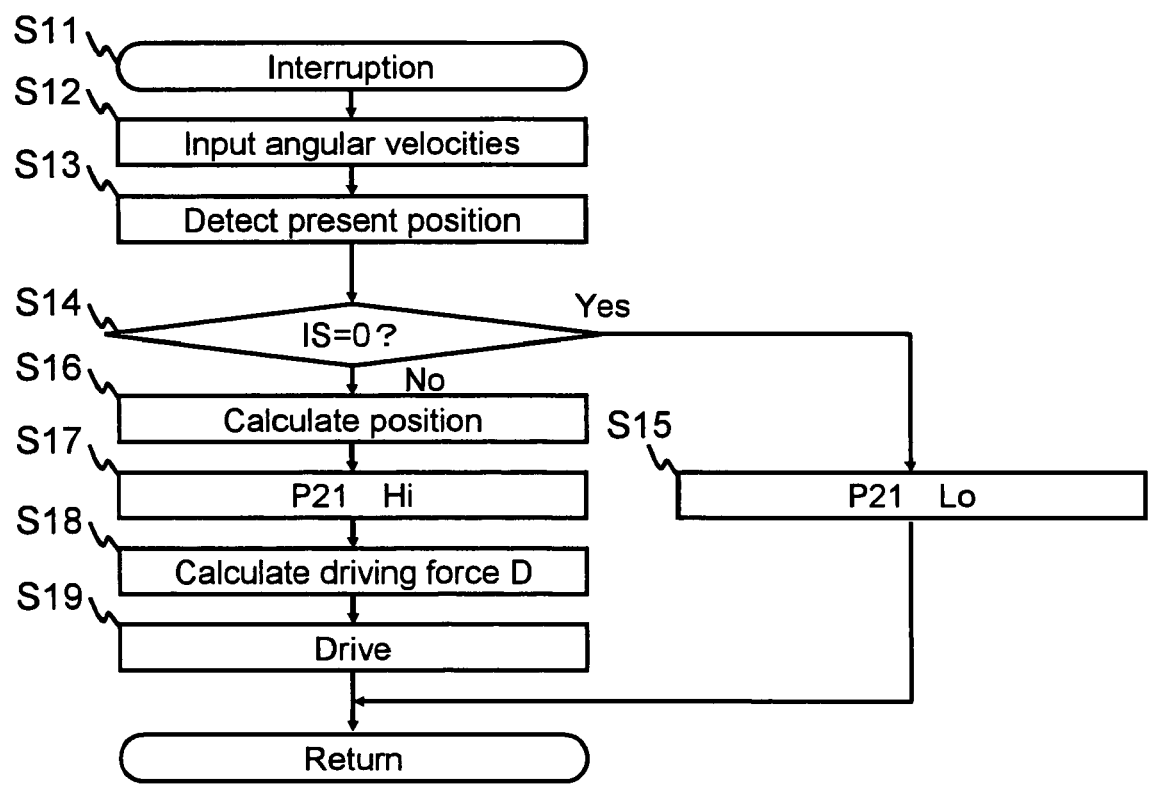
FIG. 6 is a flowchart of the anti-shake operation, which is performed at every predetermined time interval, as an interruption process, in the first and second embodiments.

Next, the flow of the anti-shake operation, which is performed at every predetermined time interval (1 ms) as an interruption process in the first embodiment, independently of the other operations, is explained by using the flowchart in FIG. 6.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S14, it is judged whether the value of the IS is 0. When it is judged that the value of the IS is 0 (IS=0), in other words in the non anti-shake mode, the signal which is output from the port P21 of the CPU 21 is set to the Lo signal, in step S15. The first and second horizontal urging members fh1 and fh2 and the first and second vertical urging members fv1 and fv2 are set to the off state and extend, so that the movable unit 30a is urged and fixed at the center of its movement range, by the urging members fh1, fh2, fv1, and fv2.

If the photographing apparatus 1 is also in the non anti-shake mode (IS=0), at the time just before anti-shake operation (before 1 ms), the off state of the urging members fh1, fh2, fv1, and fv2 is continued.

When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S16.

In step S17, the signal which is output from the port P21 of the CPU 21 is set to the Hi signal. The urging members fh1, fh2, fv1, and fv2 are set to the on state and shrink, so that the fixed situation of the movable unit 30a is released.

If the photographing apparatus 1 is also in the anti-shake mode (IS=1), at the time just before anti-shake operation (before 1 ms), the on state of the urging members fh1, fh2, fv1, and fv2 is continued.

In step S18, the driving force D, which drives the first driver circuit 29 in order to move the movable unit 30a to the position S, in other words the first PWM duty dx and the second PWM duty dy, is calculated on the basis of the position S (sx, sy), which is determined in step S16, and the present position P (pdx, pdy).

In step S19, the first driving coil unit 31a is driven by using the first PWM duty dx through the first driver circuit 29, and the second driving coil unit 32a is driven by using the second PWM duty dy through the first driver circuit 29, so that the movable unit 30a is moved.

The process in steps S18 and S19 is an automatic control calculation, which is used with the PID automatic control for performing general (normal) proportional, integral, and differential calculations.

In the first embodiment, the anti-shake unit 30 has two shafts (the first and second horizontal shafts sh1 and sh2) for slidably supporting the movable unit 30a in the first direction x, and the anti-shake unit 30 has two shafts (the first and second vertical shafts sv1 and sv2) for slidably supporting the movable unit 30a in the second direction y. However, the anti-shake unit 30 may have one shaft for slidably supporting the movable unit 30a in the first direction x, and may have one shaft for slidably supporting the movable unit 30a in the second direction y.

In this case, the first movable assembly 30a1 has the first horizontal bearing bh1, and does not have the second horizontal bearing bh2. Similarly, the second movable assembly 30a2 has the first horizontal shaft sh1, the first horizontal shaft-fixing unit sfh1, the second horizontal shaft-fixing unit sfh2, and the first vertical bearing bv1, and does not have the second horizontal shaft sh2, the third horizontal shaft-fixing unit sfh3, the fourth horizontal shaft-fixing unit sfh4, and the second vertical bearing bv2. Similarly, the fixed unit 30b has the first vertical shaft sv1, the first vertical shaft-fixing unit sfv1, the second vertical shaft-fixing unit sfv2, and does not have the second vertical shaft sv2, the third vertical shaft-fixing unit sfv3, and the fourth vertical shaft-fixing unit sfv4.

Next, the second embodiment is explained. In the second embodiment, the arrangement of the second horizontal urging member fh2 and the second vertical urging member fv2 is different from that of the first embodiment (see FIG. 7).

Therefore, the second embodiment is explained centering on the constructions of the photographing apparatus 1 in the second embodiment which are different to the constructions of the photographing apparatus 1 in the first embodiment.

The first horizontal shaft sh1 goes through the inside of the winding of the first horizontal urging member fh1, so that the second horizontal shaft sh2 goes through the inside of the winding of the second horizontal urging member fh2. The first vertical shaft sv1 goes through the inside of the winding of the first vertical urging member fv1, so that the second vertical shaft sv2 goes through the inside of the winding of the second vertical urging member fv2.

The first horizontal urging member fh1 is arranged between the first horizontal bearing bh1 and the first horizontal shaft-fixing unit sfh1.

The second horizontal urging member fh2 is arranged between the second horizontal bearing bh2 and the fourth horizontal shaft-fixing unit sfh4.

The lengths of the first and second horizontal urging members fh1 and fh2 are set to the lengths, where the first horizontal urging member fh1 extends and then urges one of the edges of the first horizontal bearing bh1 in the first direction x, and the second horizontal urging member fh2 extends and then urges one of the edges of the second horizontal bearing bh2 in the first direction x during the electrical off state, so that the movable unit 30a can be fixed at the center of its movement range in the first direction x, and the first and second horizontal urging members fh1 and fh2 shrink during the electrical on state, so that the movable unit 30a can be movable in its movement range in the first direction x.

The first vertical urging member fv1 is arranged between the first vertical bearing bv1 and the first vertical shaft-fixing unit sfv1.

The second vertical urging member fv2 is arranged between the second vertical bearing bv2 and the fourth vertical shaft-fixing unit sfv4.

The lengths of the first and second vertical urging members fv1 and fv2 are set to the lengths, where the first vertical urging member fv1 extends and then urges one of the edges of the first vertical bearing bv1 in the second direction y and the second vertical urging member fv2 extends and then urges one of the edges of the second vertical bearing bv2 in the second direction y during the electrical off state, so that the movable unit 30a can be fixed at the center of its movement range in the second direction y, and the first and second vertical urging members fv1 and fv2 shrink during the electrical on state, so that the movable unit 30a can be movable in its movement range in the second direction y.

Accordingly, the movable unit 30a is fixed at the center of its movement range in both the first direction x and the second direction y, when the first and second horizontal urging members fh1 and fh2 and the first and second vertical urging members fv1 and fv2 extend during the electrical off state.

Specifically, the first horizontal urging member fh1 urges the first horizontal bearing bh1 from one side in the first direction x, and the second horizontal urging member fh2 urges the second horizontal bearing bh2 from another side in the first direction x, so that the first movable assembly 30a1 of the movable unit 30a is fixed at the center of its movement range in the first direction x.

The first and second horizontal urging members fh1 and fh2 have a location relation where the first movable assembly 30a1 is held by the first and second horizontal urging members fh1 and fh2 in the first direction x.

Similarly, the first vertical urging member fv1 urges the first vertical bearing bv1 from one side in the second direction y, and the second vertical urging member fv2 urges the second vertical bearing bv2 from another side in the second direction y, so that the second movable assembly 30a2 of the movable unit 30a is fixed at the center of its movement range in the second direction y.

The first and second vertical urging members fv1 and fv2 have a location relation where the second movable assembly 30a2 is held by the first and second vertical urging members fv1 and fv2 in the second direction y.

Further, the first movable assembly 30a1 is also fixed at the center of its movement range in the second direction y, corresponding to the second movable assembly 30a2 which is fixed at the center of its movement range in the second direction y.

Figure 7:
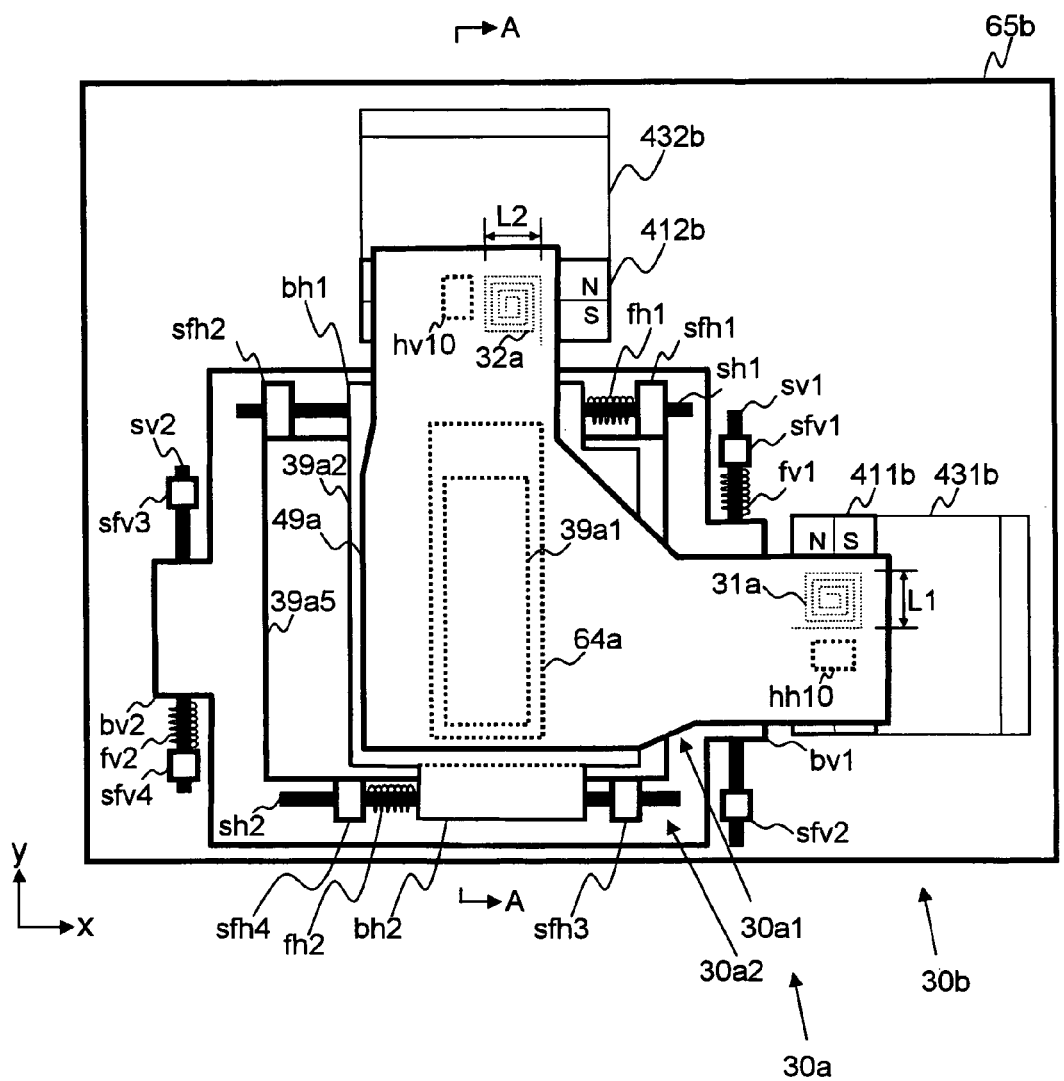
FIG. 7 is a figure showing the construction of the anti-shake unit, in the second embodiment.

FIG. 7 shows where the urging members fh1, fh2, fv1, and fv2 extend during the electrical off state, so that the movable unit 30a is fixed at the center of its movement range.

The other constructions in the second embodiment are the same as those in the first embodiment.

In the second embodiment, the urging members such as the first and second horizontal urging members fh1 and fh2 and the first and second vertical urging members fv1 and fv2, are arranged on the first and second horizontal shafts sh1 and sh2 and the first and second vertical shafts sv1 and sv2. Accordingly, fixing the movable unit 30a can be further stabilized.

Next, the third embodiment is explained. In the third embodiment, a function of the CPU 21 in the anti-shake operation, according to time, is different from that of the first embodiment (see FIG. 9).

Therefore, the third embodiment is explained centering on the constructions (functions) of the photographing apparatus 1 in the third embodiment which are different to the constructions (functions) of the photographing apparatus 1 in the first embodiment.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The CPU 21 controls an electrical on/off control of the first horizontal urging member fh1, the second horizontal urging member fh2, the first vertical urging member fv1, and the second vertical urging member fv2 by using the on/off change of the anti-shake switch 14a, through the port P21 and the second driver circuit 80.

The CPU 21 stores the value of the parameter IS which is used for judging whether the photographing apparatus 1 is in the anti-shake mode.

The CPU 21 stores the value of a first time-length TT1. The CPU 21 stores the value of a first time-count parameter TC1 which shows the difference between the first time-length TT1 and a progress time-length from when the anti-shake switch 14a is set to the off state.

The first time-length TT1 is 1 or an integer greater than 1. The first time-count parameter TC1 is 0 or an integer greater than 0.

Driving the movable unit 30a by the PID control, in other words the anti-shake operation is performed in the anti-shake mode when the anti-shake switch 14a is in the on state.

Further, in the first time-length TT1, from when the anti-shake switch 14a is set to the off state, driving the movable unit 30a by the PID control is also performed. In this time (the first time-length TT1), the movable unit 30a is moved and fixed at the center of its movement range by the PID control.

The first time-length TT1 is equal to or longer than a time period from when the anti-shake switch 14a is set to the off state (whereby the urging members fh1, fh2, fv1, and fv2 start to extend by being set to the off state), until the urging members fh1, fh2, fv1, and fv2 fix the movable unit 30a by extending. It is considered that a time lag occurs when the urging members fh1, fh2, fv1, and fv2 extend.

It is desirable that the first time-length TT1 is the same as this time period, when considering the consumption of the power. This is because the movable unit 30a is moved and fixed at the center of its movement range by driving the first and second driving coils 31a and 32a, until the first time-length TT1 has passed, from when the urging members fh1, fh2, fv1, and fv2 are set to the off state.

However, the first time-length TT1 may be longer than this time period.

A judgment of whether the time from when the urging members fh1, fh2, fv1, and fv2 were set to the off state, is longer than the first time-length TT1, is performed by the CPU 21. Specifically, this judgment is performed by judging whether the first time-count parameter TC1 is in the anti-shake operation which is performed at every predetermined time interval (1 ms), which is described later using the flowchart in FIG. 8.

The other constructions in the third embodiment are the same as those in the first embodiment.

In the third embodiment, when the photographing apparatus 1 is in the off state, or when the photographing apparatus 1 is in the on state and in the non anti-shake mode, the urging members fh1, fh2, fv1, and fv2 are set to the off state and extend and then urge and fix the movable unit 30a at the center of its movement range. Because this is done in the off state, the problem of consuming too much power does not occur, as in the first embodiment.

Further, a fixing mechanism such as a motor is not needed, because the fixing of the movable unit 30a is performed by the urging members fh1, fh2, fv1, and fv2. Therefore, the anti-shake unit 30 (the photographing apparatus 1) is not enlarged by the fixing mechanism, as in the first embodiment.

Further, in the first time-length TT1, from when the anti-shake switch 14a is set to the off state and when the urging members fh1, fh2, fv1, and fv2 are set to the off state (from when the anti-shake mode is changed to the non anti-shake mode), the movable unit 30a is moved and fixed at the center of its movement range by the PID control.

Accordingly, the movable unit 30a is not moved by gravity, immediately after the anti-shake mode is changed to the non anti-shake mode.

In the case where the movable unit 30a is moved by gravity, breakage of the movable unit 30a occurs by the shock of a sudden movement. Further, the image which is indicated on the indicating unit 17 while the movable unit 30a is moving due to gravity, is an image which is imaged where the imaging device is moving and is like a floating image, so that this image is unpleasant for the operator. However, in the third embodiment, such problems do not occur.

Figure 8:
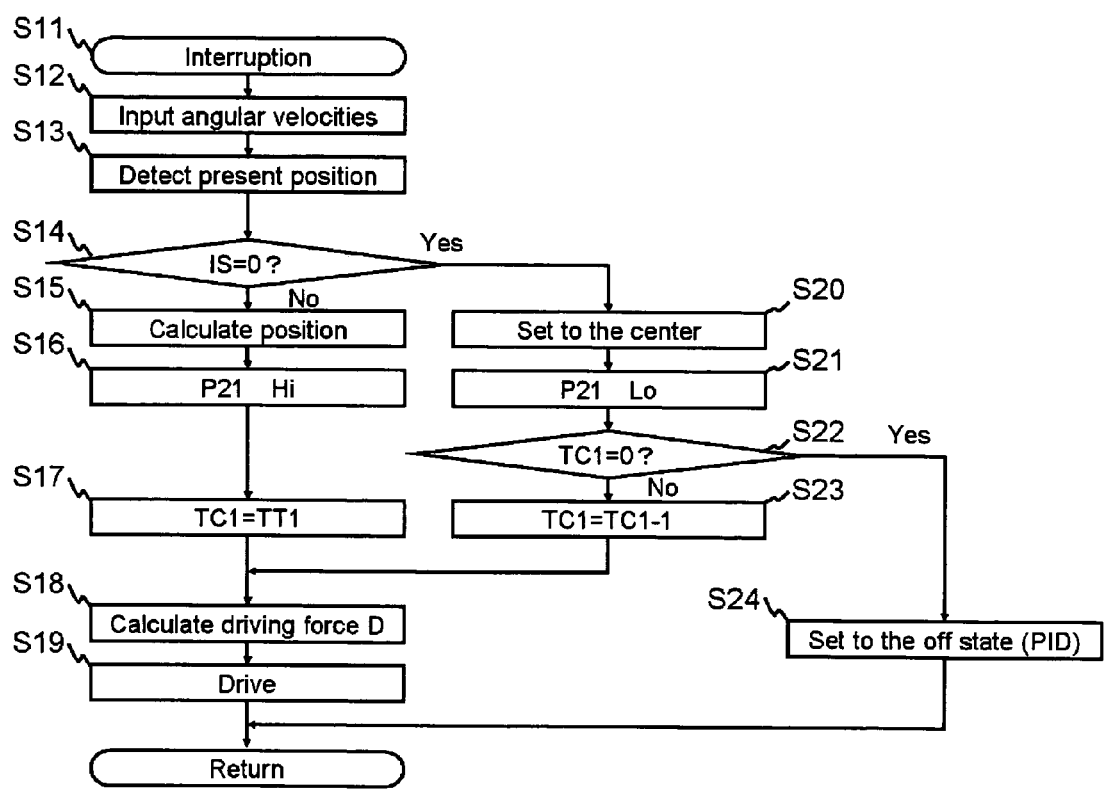
FIG. 8 is a flowchart of the anti-shake operation, which is performed at every predetermined time interval, as an interruption process, in the third embodiment.

Next, the flow of the anti-shake operation, which is performed at every predetermined time interval (1 ms) as an interruption process in the third embodiment, independently of the other operations, is explained by using the flowchart in FIG. 8. In the third embodiment, after the photographing apparatus 1 is set to the on state, before the 1st interruption of the anti-shake operation is performed, the output signal from the port P21 of the CPU 21 is set to the Lo signal and the value of the first time-count parameter TC1 is set to the same value as the first time-length TT1.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S14, it is judged whether the value of the IS is 0. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S15.

In step S16, the output signal from the port P21 of the CPU 21 is set to the Hi signal. The urging members fh1, fh2, fv1, and fv2 are set to the on state, and shrink, so that the fixed situation of the movable unit 30a is released. In the case that it is judged that the value of the IS is not 0 (in the anti-shake mode), in the previous anti-shake operation (before 1 ms), the on state situation of the urging members fh1, fh2, fv1, and fv2 is continued.

In step S17, the value of the first time-count parameter TC1 is set to the same value as the first time-length TT1. In step S18, the driving force D, which drives the first driver circuit 29 in order to move the movable unit 30a to the position S, in other words the first PWM duty dx and the second PWM duty dy, is calculated on the basis of the position S (sx, sy), which is determined in step S15, and the present position P (pdx, pdy).

In step S19, the first driving coil unit 31a is driven by using the first PWM duty dx through the first driver circuit 29, and the second driving coil unit 32a is driven by using the second PWM duty dy through the first driver circuit 29, so that the movable unit 30a is moved.

The process in steps S18 and S19 is an automatic control calculation, which is used with the PID automatic control for performing general (normal) proportional, integral, and differential calculations.

When it is judged that the value of the IS is 0 (IS=0), in other words in the non anti-shake mode in step S14, the position S (sx, sy) of the movable unit 30a (the imaging unit 39a), which should be moved to, is set to the center of the movement range of the movable unit 30a, in step S20.

In step S21, the output signal from the port P21 of the CPU 21 is set to the Lo signal. The urging members fh1, fh2, fv1, and fv2 are set to the off state, and extend, so that the movable unit 30a is moved to the center of its movement range. In the case that it is judged that the value of the IS is 0 (in the non anti-shake mode), in the previous anti-shake operation (before 1 ms), the off state situation of the urging members fh1, fh2, fv1, and fv2 is continued.

In step S22, it is judged whether the value of the first time-count parameter TC1 is 0. When it is judged that the value of the first time-count parameter TC1 is not 0, the value of the first time-count parameter TC1 is reduced by only 1, in step S23, so that the process is forwarded to step S18. When it is judged that the value of the first time-count parameter TC1 is 0, the PID control is set to the off state (stopped), so that the interruption is finished.

Figure 9:
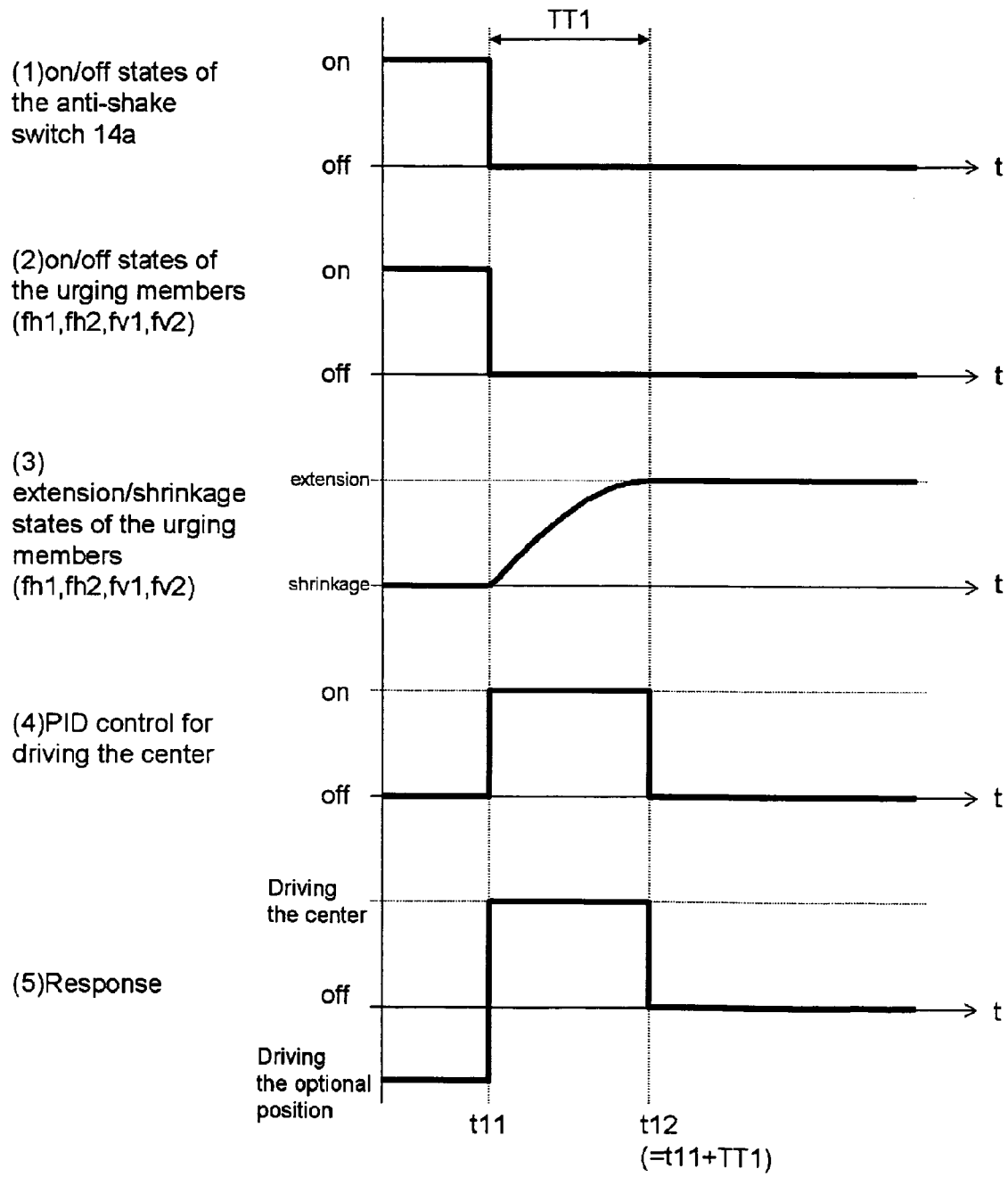
FIG. 9 is a timing chart in the third embodiment.

Next, changes in the on/off states of the anti-shake switch 14a, the on/off states of the urging members (fh1, fh2, fv1, and fv2), the extension/shrunken states of the urging members (fh1, fh2, fv1, and fv2), and the PID control for the movable unit 30a, are explained by using a timing chart in FIG. 9.

At the time point t11, the anti-shake switch 14a is set to the off state from the on state ((1) in FIG. 9), so that the urging members fh1, fh2, fv1, and fv2 is set to the off state from the on state ((2) in FIG. 9).

The urging members fh1, fh2, fv1, and fv2 gradually extend in the first time-length TT1, from when the urging members fh1, fh2, fv1, and fv2 are set to the off state ((3) in FIG. 9).

The PID control by the first driver circuit 29 and the anti-shake unit 30, for driving the movable unit 30a to the center of its movement range, is performed from the time point t11 until the time point t12 ((4) in FIG. 9). The time point t12 is a time point which is the first time-length TT1 past the time point t11.

As a response to the PID control, the driving of the movable unit 30a to the optional position which is calculated, is performed until the time point t11, so that the driving of the movable unit 30a to the center of its movement range is performed from the time point t11 until the time point t12 ((5) in FIG. 9).

After the time point t12, the PID control for driving the movable unit 30a to the center of its movement range, is stopped, so that the response to the PID control is set to the off state ((5) in FIG. 9). However, the movable unit 30a is not moved because the movable unit 30a is fixed at the center of its movement range by the urging members (fh1, fh2, fv1, and fv2).

In the third embodiment, the anti-shake unit 30 has two shafts (the first and second horizontal shafts sh1 and sh2) for slidably supporting the movable unit 30a in the first direction x, so that the anti-shake unit 30 has two shafts (the first and second vertical shafts sv1 and sv2) for slidably supporting the movable unit 30a in the second direction y, as in the first embodiment. However, the anti-shake unit 30 may have one shaft for slidably supporting the movable unit 30a in the first direction x, so that the anti-shake unit 30 may have one shaft for slidably supporting the movable unit 30a in the second direction y.

In this case, the first movable assembly 30a1 has the first horizontal bearing bh1, and does not have the second horizontal bearing bh2. Similarly, the second movable assembly 30a2 has the first horizontal shaft sh1, the first horizontal shaft-fixing unit sfh1, the second horizontal shaft-fixing unit sfh2, and the first vertical bearing bv1, and does not have the second horizontal shaft sh2, the third horizontal shaft-fixing unit sfh3, the fourth horizontal shaft-fixing unit sfh4, and the second vertical bearing bv2. Similarly, the fixed unit 30b has the first vertical shaft sv1, the first vertical shaft-fixing unit sfv1, the second vertical shaft-fixing unit sfv2, and does not have the second vertical shaft sv2, the third vertical shaft-fixing unit sfv3, and the fourth vertical shaft-fixing unit sfv4.

In the third embodiment, the arrangements of the second horizontal urging member fh2 and the second vertical urging member fv2 are similar to those in the first embodiment. However, these arrangements may be similar to those in the second embodiment, see FIG. 7.

Next, the fourth embodiment is explained. In the fourth embodiment, a function of the CPU 21 in the anti-shake operation, according to time, is different from that of the first embodiment (see FIG. 11).

Therefore, the fourth embodiment is explained centering on the constructions (functions) of the photographing apparatus 1 in the fourth embodiment which are different to the constructions (functions) of the photographing apparatus 1 in the first embodiment.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The CPU 21 controls an electrical on/off control of the first horizontal urging member fh1, the second horizontal urging member fh2, the first vertical urging member fv1, and the second vertical urging member fv2 by using the on/off change of the anti-shake switch 14a, through the port P21 and the second driver circuit 80.

The CPU 21 stores the value of the parameter IS which is used for judging whether the photographing apparatus 1 is in the anti-shake mode.

The CPU 21 stores a standard-value DP, which is described later.

The CPU 21 calculates the position S of the imaging unit 39a (the movable unit 30a), which should be moved to, corresponding to the hand-shake quantity which is calculated, for the first direction x and the second direction y.

The location in the first direction x of the position S is defined as sx, and the location in the second direction y of the position S is defined as sy. The movement of the movable unit 30a, which includes the imaging unit 39a, is performed by using electromagnetic force and is described later. The driving force D, which drives the first driver circuit 29 in order to move the movable unit 30a to the position S, has a first PWM duty dx as the driving-force component in the first direction x, and a second PWM duty dy as the driving-force component in the second direction y.

As the force which is needed to move the movable unit 30a to the position S is large, the values of the first and second PWM duties dx and dy are set to be large. For example, when the direction of the force which is needed to move the movable unit 30a to the position S, is an opposite direction to the force of gravity, the value of the first and second PWM duties dx and dy are set to be large in comparison with when the direction of force is the same direction as the force of gravity.

Similarly, as the required force is small, the values of the first and second PWM duties dx and dy are set to be small.

When the movable unit 30a is moved and fixed at the center of its movement range by the extending of and then urging of the urging members fh1, fh2, fv1, and fv2, the position S which should be moved to is also set to the center of the movement range. Therefore, at this time, the distance between the present position of the movable unit 30a and the position S is nearly equal to 0, so that the values of the first and second PWM duties dx and dy are nearly equal to 0.

The standard-value DP is equal to or more than 0, and set to the value which is nearly equal to 0. The standard-value DP is used for comparison with the values of the first and second PWM duties dx and dy.

In the fourth embodiment, by judging whether the values of the first and second PWM duties dx and dy are less than the standard-value DP, whether the values of the first and second PWM duties dx and dy reach the value which is nearly equal to 0 is judged. When it is judged that the values of the first and second PWM duties dx and dy reach a value which is nearly equal to 0, it is judged by the CPU 21 that the movable unit 30a is fixed at the center of its movement range by the urging members fh1, fh2, fv1, and fv2.

Driving the movable unit 30a by the PID control, in other words the anti-shake operation is performed in the anti-shake mode when the anti-shake switch 14a is in the on state.

Further, in an urging time-period from when the anti-shake switch 14a is set to the off state, until when the movable unit 30a is fixed at the center of its movement range by the extending of and then urging of the urging members fh1, fh2, fv1, and fv2, driving the movable unit 30a by the PID control is also performed. In this time (the urging time-period), the movable unit 30a is moved and fixed at the center of its movement range by the PID control, because it is considered that a time lag occurs when the urging members fh1, fh2, fv1, and fv2 extend.

The other constructions in the fourth embodiment are the same as those in the first embodiment.

In the fourth embodiment, when the photographing apparatus 1 is in the off state, or when the photographing apparatus 1 is in the on state and in the non anti-shake mode, the urging members fh1, fh2, fv1, and fv2 are set to the off state and extend and urge, and fix the movable unit 30a at the center of its movement range. Because this is done in the off state, the problem of consuming too much power does not occur, as in the first embodiment.

Further, the fixing mechanism such as the motor is not needed, because the fixing of the movable unit 30a is performed by the urging members fh1, fh2, fv1, and fv2. Therefore, the anti-shake unit 30 (the photographing apparatus 1) is not enlarged by the fixing mechanism, as in the first embodiment.

Further, in the urging time-period from when the anti-shake switch 14a is in the off state, until when the movable unit 30a is fixed at the center of its movement range by the extending of and then urging of the urging members fh1, fh2, fv1, and fv2, the movable unit 30a is moved and fixed at the center of its movement range by the PID control.

Accordingly, the movable unit 30a is not moved by gravity, immediately after the anti-shake mode is changed to the non anti-shake mode.

In the case where the movable unit 30a is moved by gravity, breakage of the movable unit 30a occurs by the shock of a sudden movement. Further, the image which is indicated on the indicating unit 17 while the movable unit 30a is moving due to gravity, is an image which is imaged where the imaging device is moving and is like a floating image, so that this image is unpleasant for the operator. However, in the fourth embodiment, such problems do not occur.

Figure 10:
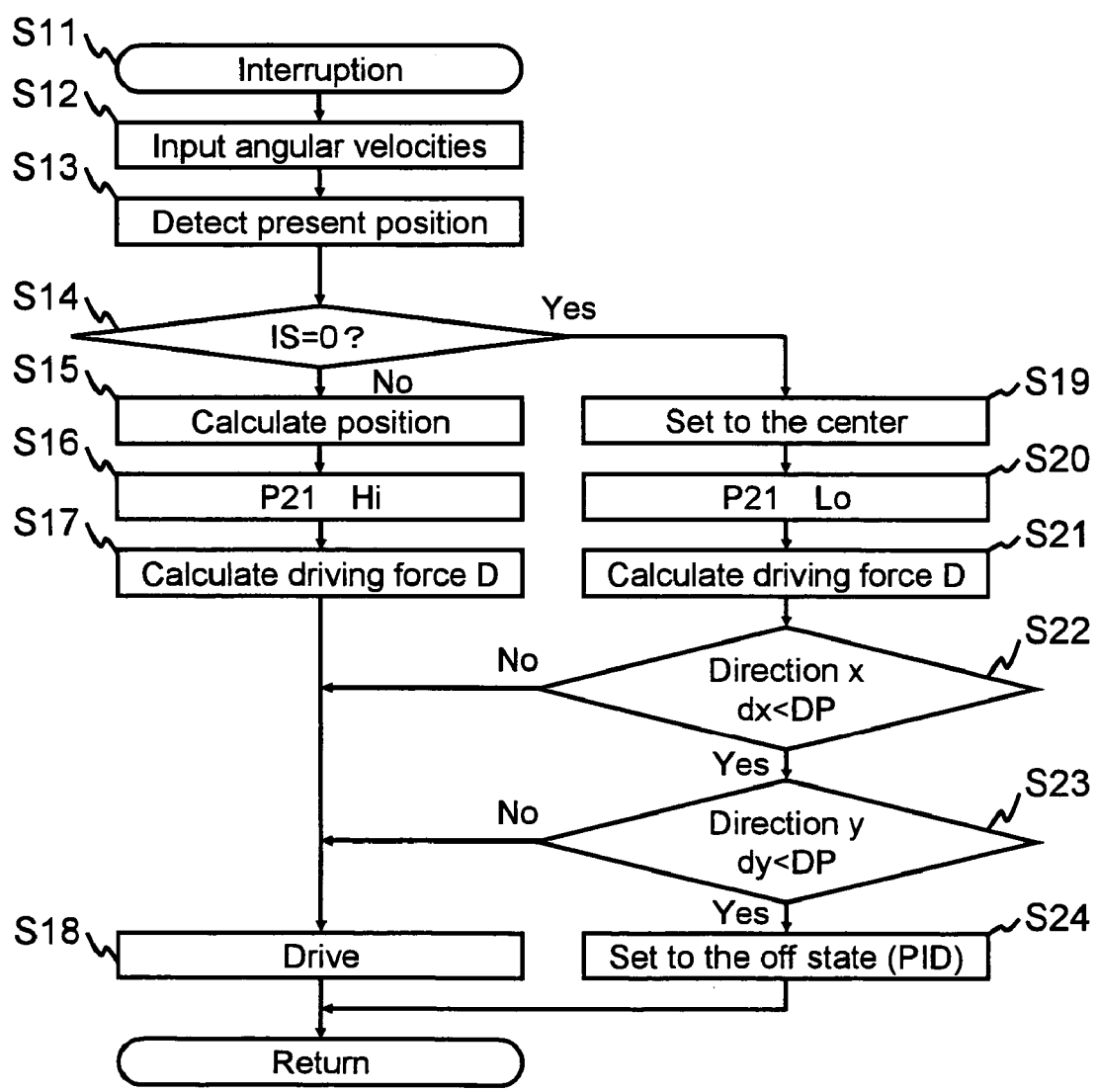
FIG. 10 is a flowchart of the anti-shake operation, which is performed at every predetermined time interval, as an interruption process, in the fourth embodiment.

Next, the flow of the anti-shake operation, which is performed at every predetermined time interval (1 ms) as an interruption process in the fourth embodiment, independently of the other operations, is explained by using the flowchart in FIG. 10.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S14, it is judged whether the value of the IS is 0. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S15.

In step S16, the output signal from the port P21 of the CPU 21 is set to the Hi signal. The urging members fh1, fh2, fv1, and fv2 are set to the on state, and shrink, so that the fixed situation of the movable unit 30a is released. In the case that it is judged that the value of the IS is not 0 (in the anti-shake mode), in the previous anti-shake operation (before 1 ms), the on state situation of the urging members fh1, fh2, fv1, and fv2 is continued.

In step S17, the driving force D, which drives the first driver circuit 29 in order to move the movable unit 30a to the position S, in other words the first PWM duty dx and the second PWM duty dy, is calculated on the basis of the position S (sx, sy), which is determined in step S15, and the present position P (pdx, pdy).

In step S18, the first driving coil unit 31a is driven by using the first PWM duty dx through the first driver circuit 29, and the second driving coil unit 32a is driven by using the second PWM duty dy through the first driver circuit 29, so that the movable unit 30a is moved.

The process in steps S17 and S18 is an automatic control calculation, which is used with the PID automatic control for performing general (normal) proportional, integral, and differential calculations.

When it is judged that the value of the IS is 0 (IS=0), in other words in the non anti-shake mode in step S14, the position S (sx, sy) of the movable unit 30a (the imaging unit 39a), which should be moved to, is set to the center of the movement range of the movable unit 30a, in step S19.

In step S20, the output signal from the port P21 of the CPU 21 is set to the Lo signal. The urging members fh1, fh2, fv1, and fv2 are set to the off state, and extend, so that the movable unit 30a is moved to the center of its movement range. In the case that it is judged that the value of the IS is 0 (in the non anti-shake mode), in the previous anti-shake operation (before 1 ms), the off state situation of the urging members fh1, fh2, fv1, and fv2 is continued.

In step S21, the driving force D, which drives the first driver circuit 29 in order to move the movable unit 30a to the position S, in other words the first PWM duty dx and the second PWM duty dy, is calculated on the basis of the position S (sx, sy), which is determined in step S19, and the present position P (pdx, pdy).

In step S22, it is judged whether the value of the first PWM duty dx is less than the standard-value DP. When it is judged that the value of the first PWM duty dx is not less than the standard-value DP, the process is forwarded to step S18. When it is judged that the value of the first PWM duty dx is less than the standard-value DP, it is judged whether the value of the second PWM duty dy is less than the standard-value DP. When it is judged that the value of the second PWM duty dy is not less than the standard-value DP, the process is forwarded to step S18. When it is judged that the value of the second PWM duty dy is less than the standard-value DP, the PID control is set to the off state (stopped), in step S24. Or the interruption is finished.

Figure 11:
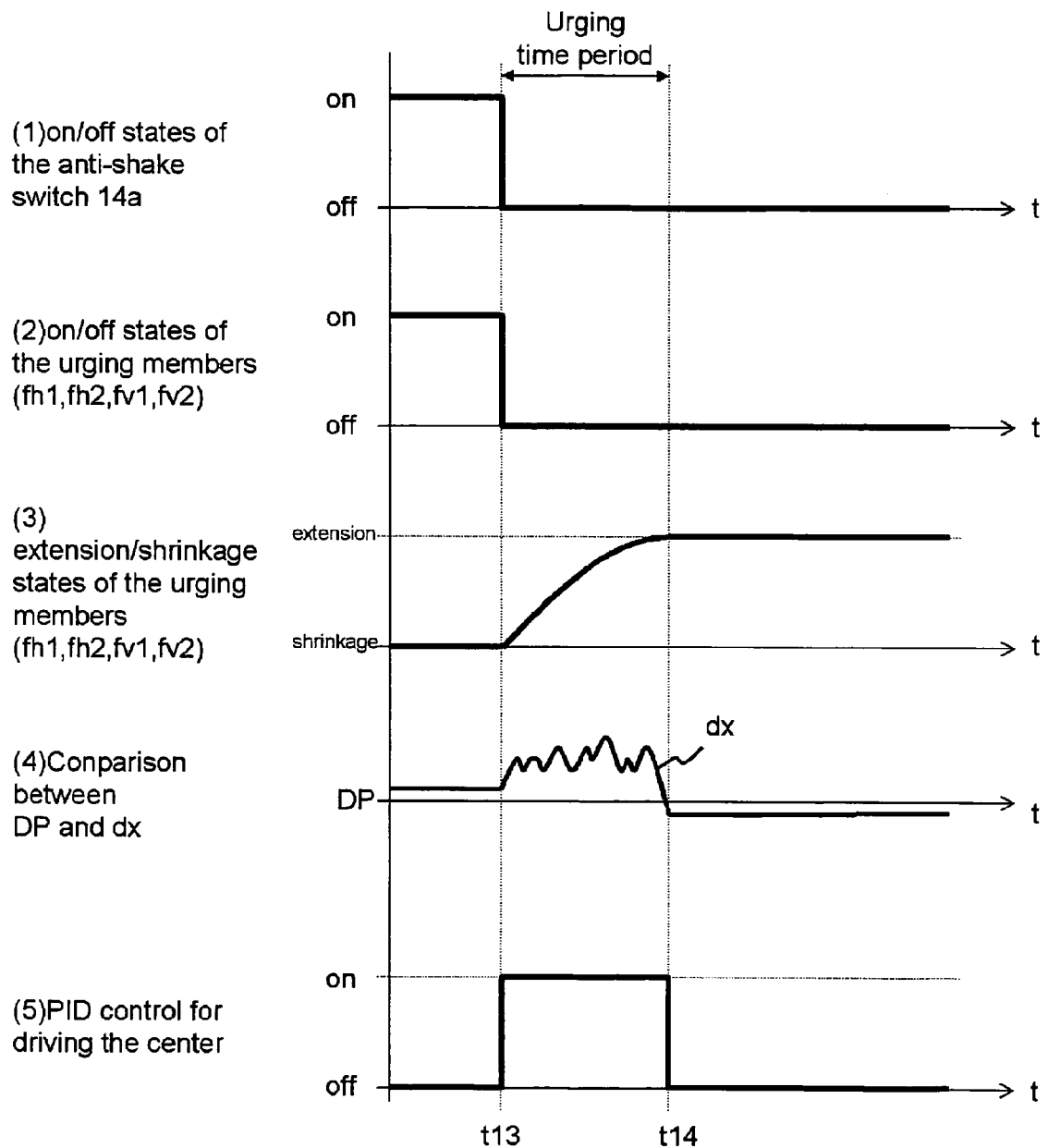
FIG. 11 is a timing chart in the fourth embodiment.

Next, changes in the on/off states of the anti-shake switch 14a, the on/off states of the urging members (fh1, fh2, fv1, and fv2), the extension/shrunken states of the urging members (fh1, fh2, fv1, and fv2), and the PID control for the movable unit 30a, are explained by using a timing chart in FIG. 11.

At the time point t13, the anti-shake switch 14a is set to the off state from the on state ((1) in FIG. 11), so that the urging members fh1, fh2, fv1, and fv2 is set to the off state from the on state ((2) in FIG. 11).

The urging members fh1, fh2, fv1, and fv2 gradually extend, from when the urging members fh1, fh2, fv1, and fv2 are set to the off state ((3) in FIG. 11).

Viewed from the change in the driving current, the value of the first PWM duty dx is set to the value for moving the optional position of the movable unit 30a in the first direction x by calculating in the anti-shake operation, until the time point t13. After the time point t13, the value of the first PWM duty dx is set to the value for moving and fixing the movable unit 30a at the center of its movement range in the first direction x.

At the time point t14, the movable unit 30a is fixed at the center of its movement range by the extending of and then urging of the urging members fh1, fh2, fv1, and fv2, so that the value of the first PWM duty dx reaches a small value which is less than the standard-value DP ((4) in FIG. 11). The change in the value of the second PWM duty dy is similar to that of the value of the first PWM duty dx.

Until the time point t14, because the movable unit 30a is driven by the first and second PWM duties dx and dy against gravity etc., the values of the first and second PWM duty dx and dy are larger than those after the time point t14.

The PID control by the first driver circuit 29 and the anti-shake unit 30 for driving the movable unit 30a to the center of its movement range, is performed from the time point t13 until the time point t14 ((5) in FIG. 11). The time point t14 is the time point when the movable unit 30a is moved and fixed at the center of its movement range by the urging members fh1, fh2, fv1, and fv2.

After the time point t14, the PID control for driving the movable unit 30a to the center of its movement range, is stopped ((5) in FIG. 11). However, the movable unit 30a is not moved because the movable unit 30a is fixed at the center of its movement range by the urging members (fh1, fh2, fv1, and fv2).

In the fourth embodiment, the anti-shake unit 30 has two shafts (the first and second horizontal shafts sh1 and sh2) for slidably supporting the movable unit 30a in the first direction x, so that the anti-shake unit 30 has two shafts (the first and second vertical shafts sv1 and sv2) for slidably supporting the movable unit 30a in the second direction y, as in the first embodiment. However, the anti-shake unit 30 may have one shaft for slidably supporting the movable unit 30a in the first direction x, so that the anti-shake unit 30 may have one shaft for slidably supporting the movable unit 30a in the second direction y.

In this case, the first movable assembly 30a1 has the first horizontal bearing bh1, and does not have the second horizontal bearing bh2. Similarly, the second movable assembly 30a2 has the first horizontal shaft sh1, the first horizontal shaft-fixing unit sfh1, the second horizontal shaft-fixing unit sfh2, and the first vertical bearing bv1, and does not have the second horizontal shaft sh2, the third horizontal shaft-fixing unit sfh3, the fourth horizontal shaft-fixing unit sfh4, and the second vertical bearing bv2. Similarly, the fixed unit 30b has the first vertical shaft sv1, the first vertical shaft-fixing unit sfv1, the second vertical shaft-fixing unit sfv2, and does not have the second vertical shaft sv2, the third vertical shaft-fixing unit sfv3, and the fourth vertical shaft-fixing unit sfv4.

In the fourth embodiment, the arrangements of the second horizontal urging member fh2 and the second vertical urging member fv2 are similar to those in the first embodiment. However, these arrangements may be similar to those in the second embodiment, see FIG. 7.

Next, the fifth embodiment is explained. In the fifth embodiment, a function of the CPU 21 in the anti-shake operation, according to time, is different from that of the first embodiment (see FIG. 13).

Therefore, the fifth embodiment is explained centering on the constructions (functions) of the photographing apparatus 1 in the fifth embodiment which are different to the constructions (functions) of the photographing apparatus 1 in the first embodiment.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The CPU 21 controls an electrical on/off control of the first horizontal urging member fh1, the second horizontal urging member fh2, the first vertical urging member fv1, and the second vertical urging member fv2 by using the on/off change of the anti-shake switch 14a, through the port P21 and the second driver circuit 80.

The CPU 21 stores the value of the parameter IS which is used for judging whether the photographing apparatus 1 is in the anti-shake mode.

The CPU 21 stores the value of a second time-length TT2. The CPU 21 stores the value of a second time-count parameter TC2 which shows the difference between the second time-length TT2 and a progress time-length from when the anti-shake switch 14a is set to the on state.

Driving the movable unit 30a by the PID control, in other words the anti-shake operation is performed in the anti-shake mode when the anti-shake switch 14a is in the on state.

Further, in the second time-length TT2, from when the anti-shake switch 14a is set to the on state, the movable unit 30a is moved and fixed at the center of its movement range by the PID control.

The second time-length TT2 is equal to or longer than a time period from when the anti-shake switch 14a is set to the on state (whereby the urging members fh1, fh2, fv1, and fv2 which urge the movable unit 30a start to shrink by being set to the on state), until when the urging members fh1, fh2, fv1, and fv2 fully shrink where the movable unit 30a becomes movable over the whole of its movement range. It is considered that a time lag occurs when the urging members fh1, fh2, fv1, and fv2 shrink.

It is desirable that the second time-length TT2 is the same as this time period, in order to perform the anti-shake operation as soon as the movable unit 30a becomes movable over the whole of its movement range. However, the second time-length TT2 may be longer than this time period.

A judgment whether the time that has passed from when the urging members fh1, fh2, fv1, and fv2 are set to the on state, is longer than the second time-length TT2, is performed by the CPU 21. Specifically, this judgment is performed by judging whether the second time-count parameter TC2 has reached 0 in the anti-shake operation which is performed at every predetermined time interval (1 ms), which is described later using the flowchart in FIG. 12.

The other constructions in the fifth embodiment are the same as those in the first embodiment.

In the fifth embodiment, when the photographing apparatus 1 is in the off state, or when the photographing apparatus 1 is in the on state and in the non anti-shake mode, the urging members fh1, fh2, fv1, and fv2 are set to the off state and extend and then urge and fix the movable unit 30a at the center of its movement range. Because this is done in the off state, the problem of consuming too much power does not occur, as in the first embodiment.

Further, the fixing mechanism such as the motor is not needed, because the fixing of the movable unit 30a is performed by the urging members fh1, fh2, fv1, and fv2. Therefore, the anti-shake unit 30 (the photographing apparatus 1) is not enlarged by the fixing mechanism, as in the first embodiment.

Further, in the second time-length TT2, from when the anti-shake switch 14a is set to the on state and when the urging members fh1, fh2, fv1, and fv2 are set to the on state (from when the non anti-shake mode is changed to the anti-shake mode), the urging members fh1, fh2, fv1, and fv2 gradually shrink, so that the movement range of the movable unit 30a is gradually extended. The movement range of the movable unit 30a is the same as a correcting-range in which the anti-shake operation can be performed.

Accordingly, while the movement range of the movable unit 30a is gradually extended, in other words during the switching period from extension to shrinkage of the urging members fh1, fh2, fv1, and fv2, the anti-shake operation can not be performed effectively.

In the case that the anti-shake operation is performed where the movement range of the movable unit 30a is not sufficiently wide, a through image which is indicated on the indicating unit 17 has a wave of a hand-shake including a high-frequency component in comparison with when the movable unit 30a is fixed and the anti-shake operation is not performed. This is because when the movable unit 30a is fixed and the anti-shake operation is not performed, a through image which is indicated on the indicating unit 17 has a wave of hand-shake without including a high-frequency component. During this time, the through image including the high-frequency component is unpleasant for the operator.

In the fifth embodiment, in the second time-length TT2, from when the anti-shake switch 14a is set to the on state and when the urging members fh1, fh2, fv1, and fv2 are set to the on state (from when the non anti-shake mode is changed to the anti-shake mode), the movable unit 30a is moved and fixed at the center of its movement range by the PID control. Therefore, the above stated problem does not occur.

Figure 12:
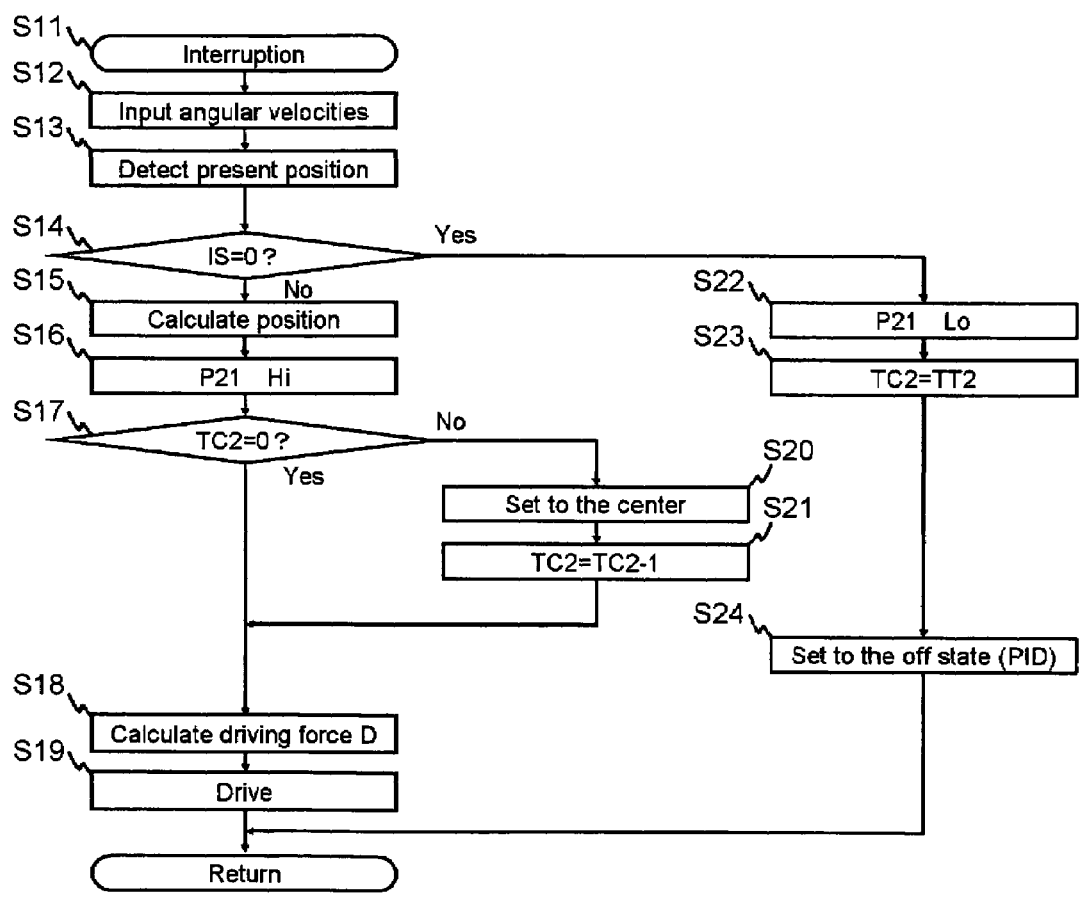
FIG. 12 is a flowchart of the anti-shake operation, which is performed at every predetermined time interval, as an interruption process, in the fifth embodiment.

Next, the flow of the anti-shake operation, which is performed at every predetermined time interval (1 ms) as an interruption process in the fifth embodiment, independently of the other operations, is explained by using the flowchart in FIG. 12. In the fifth embodiment, after the photographing apparatus 1 is set to the on state, before the 1st interruption of the anti-shake operation is performed, the output signal from the port P21 of the CPU 21 is set to the Lo signal and the value of the second time-count parameter TC2 is set to the same value as the second time-length TT2.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S14, it is judged whether the value of the IS is 0. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S15.

In step S16, the output signal from the port P21 of the CPU 21 is set to the Hi signal. The urging members fh1, fh2, fv1, and fv2 are set to the on state, and shrink, so that the fixed situation of the movable unit 30a is released. In the case that it is judged that the value of the IS is not 0 (in the anti-shake mode), in the previous anti-shake operation (before 1 ms), the on state situation of the urging members fh1, fh2, fv1, and fv2 is continued.

In step S17, it is judged whether the value of the second time-count parameter TC2 is 0. When it is judged that the value of the second time-count parameter TC2 is 0, the driving force D, which drives the first driver circuit 29 in order to move the movable unit 30a to the position S, in other words the first PWM duty dx and the second PWM duty dy, is calculated on the basis of the position S (sx, sy), which is determined in step S15, and the present position P (pdx, pdy), in step S18.

In step S19, the first driving coil unit 31a is driven by using the first PWM duty dx through the first driver circuit 29, and the second driving coil unit 32a is driven by using the second PWM duty dy through the first driver circuit 29, so that the movable unit 30a is moved. Then the interruption is finished.

The process in steps S18 and S19 is an automatic control calculation, which is used with the PID automatic control for performing general (normal) proportional, integral, and differential calculations.

When it is judged that the value of the second time-count parameter TC2 is not 0 in step S17, the position S (sx, sy) of the movable unit 30a (the imaging unit 39a), which should be moved to, is set to the center of the movement range of the movable unit 30a, in step S20. In step S21, the value of the second time-count parameter TC2 is reduced by only 1, so that the process is forwarded to step S18.

When it is judged that the value of the IS is 0 (IS=0), in other words in the non anti-shake mode in step S14, the output signal from the port P21 of the CPU 21 is set to the Lo signal, in step S22. The urging members fh1, fh2, fv1, and fv2 are set to the off state, and extend, so that the movable unit 30a is moved to the center of its movement range. In the case where it is judged that the value of the IS is 0 (in the non anti-shake mode), in the previous anti-shake operation (before 1 ms), the off state situation of the urging members fh1, fh2, fv1, and fv2 is continued.

In step S23, the value of the second time-count parameter TC2 is set to the same value as the second time-length TT2. In step S24, the PID control is set to the off state (stopped), so that the interruption is finished.

Figure 13:
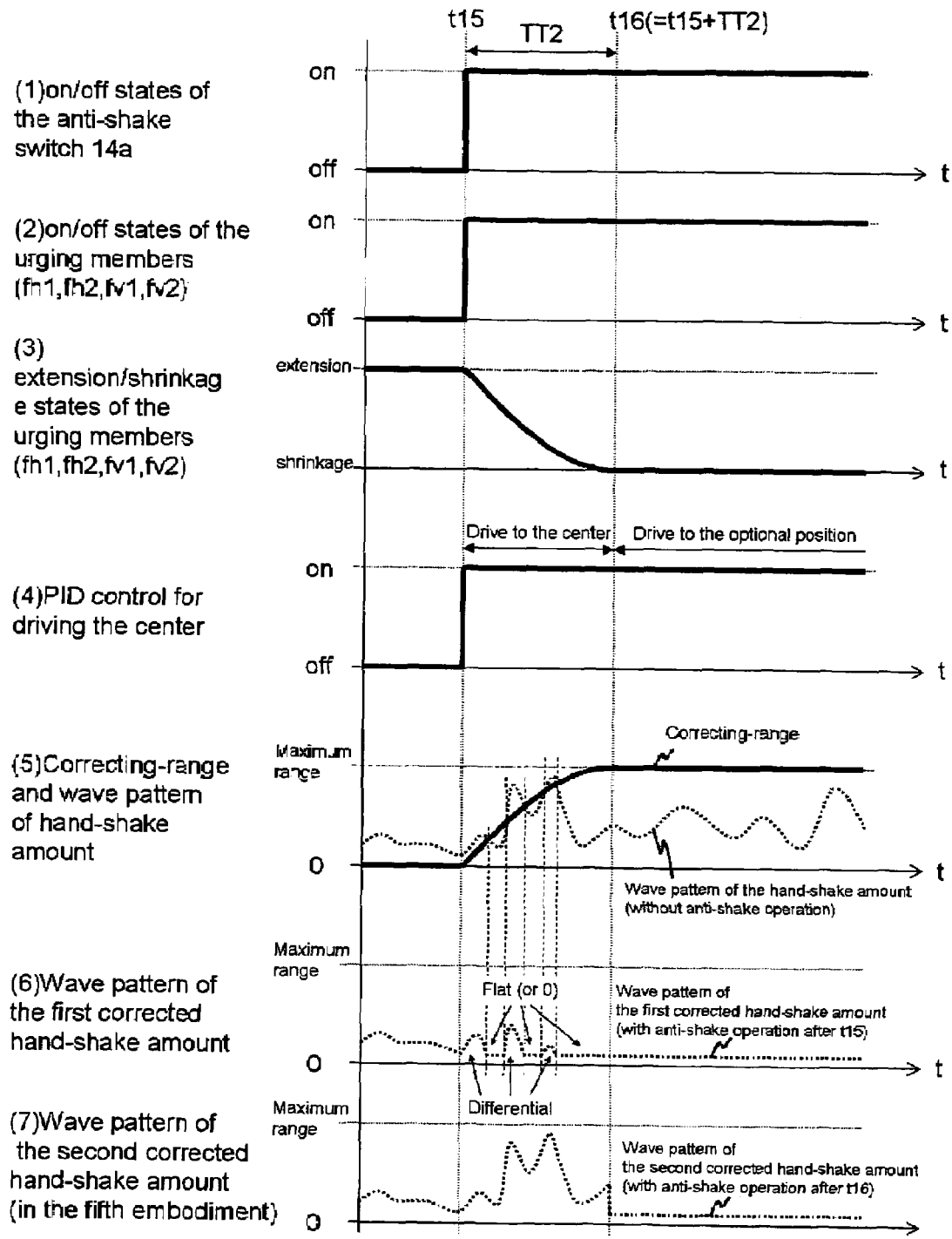
FIG. 13 is a timing chart in the fifth embodiment.

Next, changes in the on/off states of the anti-shake switch 14a, the on/off states of the urging members (fh1, fh2, fv1, and fv2), the extension/shrunken states of the urging members (fh1, fh2, fv1, and fv2), the PID control for the movable unit 30a, and the wave of the hand-shake, are explained by using a timing chart in FIG. 13.

At the time point t15, the anti-shake switch 14a is set to the on state from the off state ((1) in FIG. 13), so that the urging members fh1, fh2, fv1, and fv2 is set to the on state from the off state ((2) in FIG. 13).

The urging members fh1, fh2, fv1, and fv2 gradually shrink in the second time-length TT2, from when the urging members fh1, fh2, fv1, and fv2 are set to the on state ((3) in FIG. 13).

The PID control by the first driver circuit 29 and the anti-shake unit 30 for driving the movable unit 30a to the center of its movement range, is performed from the time point t15 until the time point t16 ((4) in FIG. 13). The time point t16 is a time point which is the second time-length TT2 past the time point t15. After the time point t16, the PID control by the first driver circuit 29 and the anti-shake unit 30 for driving the movable unit 30a to the optional point which is calculated, is performed.

The correcting-range in which the anti-shake operation can be performed, is gradually extended up to the maximum range where the movable unit 30a is movable over the whole of its movement range (see a solid line of (5) in FIG. 13) The hand-shake amount changes over time, depending on the operator (see a dotted line of (5) of FIG. 13). The dotted line shown in graph (5) of FIG. 13 shows that the hand-shake amount without the anti-shake operation is in the maximum range over the whole movement range of the movable unit 30a.

A dotted line shown in graph (6) of FIG. 13 shows a first corrected hand-shake amount with the anti-shake operation after the time point t15, for comparing with the fifth embodiment.

A dotted line shown in graph (7) of FIG. 13 shows a second corrected hand-shake amount with the anti-shake operation after the time point t16, in the fifth embodiment.

If the anti-shake operation is performed from the time point t15 to the time point t16, the wave pattern of the first corrected hand-shake amount has flat and variable areas. This is because the hand-shake amount without the anti-shake operation is not always in the correcting-range where the movable unit 30a is movable in its movement range which is extending.

Specifically, while (or if) the hand-shake amount without the anti-shake operation is not in the extending correcting-range, the anti-shake operation can not be performed effectively. Accordingly, during this time, the wave pattern of the first corrected hand-shake amount is differential (variable). In other words, a corrected hand-shake value between a value of the hand-shake amount without the anti-shake operation, and a value of the extending correcting-range, during this time, is a differential value.

While (or if) the hand-shake amount without the anti-shake operation is in the extending correcting-range, the anti-shake operation can be performed effectively. Accordingly, during this time, the wave pattern of the first corrected hand-shake amount is flat (or 0).

A wave pattern having the first corrected hand-shake amount ((6) of FIG. 13) includes a high-frequency component. Further, the image which is indicated on the indicating unit 17, is an image which is imaged where the wave pattern of the second corrected hand-shake amount includes the high-frequency component, so that this image is unpleasant for the operator.

However, in the fifth embodiment, the anti-shake operation is not performed from the time point t15 to the time point t16, so that the wave pattern of the second corrected hand-shake amount does not include a high-frequency component.

After the time point t16, the wave pattern of the first (or second) corrected hand-shake amount is flat (or 0), because the anti-shake operation can be performed effectively, by using the whole movement range of the movable unit 30a.

In the fifth embodiment, the anti-shake unit 30 has two shafts (the first and second horizontal shafts sh1 and sh2) for slidably supporting the movable unit 30a in the first direction x, so that the anti-shake unit 30 has two shafts (the first and second vertical shafts sv1 and sv2) for slidably supporting the movable unit 30a in the second direction y, as in the first embodiment. However, the anti-shake unit 30 may have one shaft for slidably supporting the movable unit 30a in the first direction x, so that the anti-shake unit 30 may have one shaft for slidably supporting the movable unit 30a in the second direction y.

In this case, the first movable assembly 30a1 has the first horizontal bearing bh1, and does not have the second horizontal bearing bh2. Similarly, the second movable assembly 30a2 has the first horizontal shaft sh1, the first horizontal shaft-fixing unit sfh1, the second horizontal shaft-fixing unit sfh2, and the first vertical bearing bv1, and does not have the second horizontal shaft sh2, the third horizontal shaft-fixing unit sfh3, the fourth horizontal shaft-fixing unit sfh4, and the second vertical bearing bv2. Similarly, the fixed unit 30b has the first vertical shaft sv1, the first vertical shaft-fixing unit sfv1, the second vertical shaft-fixing unit sfv2, and does not have the second vertical shaft sv2, the third vertical shaft-fixing unit sfv3, and the fourth vertical shaft-fixing unit sfv4.

In the fifth embodiment, the arrangements of the second horizontal urging member fh2 and the second vertical urging member fv2 are similar to those in the first embodiment.

However, these arrangements may be similar to those in the second embodiment, see FIG. 7.

Next, the sixth embodiment is explained. In the sixth embodiment, a function of the CPU 21 in the anti-shake operation, according to time, is different from that of the first embodiment (see FIG. 15).

Therefore, the sixth embodiment is explained centering on the constructions (functions) of the photographing apparatus 1 in the sixth embodiment which are different to the constructions (functions) of the photographing apparatus 1 in the first embodiment.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The CPU 21 controls an electrical on/off control of the first horizontal urging member fh1, the second horizontal urging member fh2, the first vertical urging member fv1, and the second vertical urging member fv2 by using the on/off change of the anti-shake switch 14a, through the port P21 and the second driver circuit 80.

The CPU 21 stores the value of the parameter IS which is used for judging whether the photographing apparatus 1 is in the anti-shake mode.

The CPU 21 stores the value of a third time-length TT3. The CPU 21 stores the value of a third time-count parameter TC3 which shows the difference between the third time-length TT3 and a progress time-length from when the urging members fh1, fh2, fv1, and fv2 are set to the on state.

The third time-length TT3 is 1 or an integer greater than 1. The third time-count parameter TC3 is 0 or an integer greater than 0.

Driving the movable unit 30a by the PID control, in other words the anti-shake operation is performed in the anti-shake mode when the anti-shake switch 14a is in the on state.

The first and second horizontal urging members fh1 and fh2 and the first and second vertical urging members fv1 and fv2 are made of a shape-memory alloy which shrinks when the temperature of the member itself increases during the electrical on state, and which expands (extends) when the temperature of the member itself decreases during the electrical off state. The shape-memory alloy can be a BioMetal of the trade name (TOKI CORPORATION) for example.

A minimum value of the temperature where the urging members fh1, fh2, fv1, and fv2 change their forms (shrink/extend), is defined as a standard temperature Te0.

A value of the temperature which is slightly more than a maximum value of the temperature-range where the urging members fh1, fh2, fv1, and fv2 change their forms (shrink/extend), is defined as a second temperature Te2.

A predetermined value of the temperature which is more than the second temperature Te2, is defined as a first temperature Te1.

When the temperature of the urging members fh1, fh2, fv1, and fv2 is under the minimum value of the temperature (the standard temperature Te0), the urging members fh1, fh2, fv1, and fv2 fully extend and then urge the movable unit 30a.

When the temperature of the urging members fh1, fh2, fv1, and fv2 is over the maximum value of the temperature, the urging members fh1, fh2, fv1, and fv2 fully shrink, so that the movable unit 30a becomes movable over the whole of its movement range.

A value of the current which flows through the urging members fh1, fh2, fv1, and fv2, is defined as a first current-value I1. The temperature of the urging members fh1, fh2, fv1, and fv2 can be risen up to the first temperature Te1, when the current having the first current-value I1 flows through the urging members fh1, fh2, fv1, and fv2.

A value of the current which flows through the urging members fh1, fh2, fv1, and fv2, is defined as a second current-value I2. The temperature of the urging members fh1, fh2, fv1, and fv2 can be risen up to the second temperature Te2, when the current having the second current-value I2 flows through the urging members fh1, fh2, fv1, and fv2.

When the urging members fh1, fh2, fv1, and fv2 are in the off state, the temperature of the urging members fh1, fh2, fv1, and fv2 is kept as the standard temperature Te0.

When the urging members fh1, fh2, fv1, and fv2 are set to the on state from the off state, the temperature of the urging members fh1, fh2, fv1, and fv2 is gradually increased.

In the third time-length TT3 from when the urging members fh1, fh2, fv1, and fv2 are set to the on state, the first current-value I1 for the current flows through the urging members fh1, fh2, fv1, and fv2.

Accordingly, the temperature of the urging members fh1, fh2, fv1, and fv2 is increased to the first temperature Te1 from the standard temperature Te0.

After the third time-length TT3 has passed, a value of the current which flows through the urging members fh1, fh2, fv1, and fv2 is changed to the second current-value I2 from the first current-value I1.

Accordingly, the temperature of the urging members fh1, fh2, fv1, and fv2 drops down to the second temperature Te2 from the first temperature Te1.

Until the urging members fh1, fh2, fv1, and fv2 are changed to the off state from the electrical on state of the second current-value I2, the temperature of the urging members fh1, fh2, fv1, and fv2 is kept as the second temperature Te2.

When the urging members fh1, fh2, fv1, and fv2 are set to the off state, the current is stopped, so that the temperature of the urging members fh1, fh2, fv1, and fv2 drops down to the standard temperature Te0.

The urging members fh1, fh2, fv1, and fv2 have a coil shape. The first horizontal shaft sh1 goes through the inside of the windings of the first and second horizontal urging members fh1 and fh2. The first vertical shaft sv1 goes through the inside of the windings of the first and second vertical urging members fv1 and fv2.

By having a coil shape, the extension speeds of the urging members fh1, fh2, fv1, and fv2 become fast because the coil shape has an increased electrical resistance, in comparison with when the urging members fh1, fh2, fv1, and fv2 have another shape (i.e. do not have the coil shape).

The third time-length TT3 is equal to or longer than a time period from when the urging members fh1, fh2, fv1, and fv2 which urge the movable unit 30a, start to shrink by being set to the on state, until when the urging members fh1, fh2, fv1, and fv2 fully shrink, where the movable unit 30a becomes movable over the whole of its movement range.

Or, the third time-length TT3 is equal to or longer than a time period from when the urging members fh1, fh2, fv1, and fv2, are set to the on state from the off state, until the temperature of the urging members fh1, fh2, fv1, and fv2, is increased to the first temperature Te1 from the standard temperature Te0 due to the current having the first current-value I1 flowing through the urging members fh1, fh2, fv1, and fv2.

It is considered that a time lag occurs when the urging members fh1, fh2, fv1, and fv2 shrink.

It is desirable that the third time-length TT3 is the same as this time period, when considering the consumption of the power. This is because the movable unit 30a is moved and fixed at the center of its movement range by driving the first and second driving coils 31a and 32a from when the urging members fh1, fh2, fv1, and fv2 are set to the on state until the third time-length TT3 has passed.

However, the third time-length TT3 may be longer than this time period.

A judgment of whether the time from when the urging members fh1, fh2, fv1, and fv2 were set to the on state, is longer than the third time-length TT3, is performed by the CPU 21. Specifically, this judgment is performed by judging whether the third time-count parameter TC3 is in the anti-shake operation which is performed at every predetermined time interval (1 ms), which is described later using the flowchart in FIG. 14.

In the sixth embodiment, the urging members fh1, fh2, fv1, and fv2 are connected in series (see FIG. 3). However, the urging members fh1, fh2, fv1, and fv2 may be connected in parallel (not depicted).

Even if the connecting style is in series or in parallel, a pulse signal is input to each of the urging members fh1, fh2, fv1, and fv2 in which current having the first current-value I1 or the second current-value I2 flows.

The urging members fh1, fh2, fv1, and fv2 are connected with the second driver circuit 80.

Specifically, one of the terminals of the second horizontal urging member fh2 is connected with a power supply whose voltage is the voltage Vcc. Another terminal of the second horizontal urging member fh2 is connected with one of the terminals of the first vertical urging member fv1. Another terminal of the first vertical urging member fv1 is connected with one of the terminals of the first horizontal urging member fh1. Another terminal of the first horizontal urging member fh1 is connected with one of the terminals of the second vertical urging member fv2. Another terminal of the second vertical urging member fv2 is connected with a collector of the transistor Tr1 of the second driver circuit 80.

The second driver circuit 80 is connected with the port P21 of the CPU 21. A digital control signal is output from the port P21 to the second driver circuit 80, where the second driver circuit 80 outputs the pulse signal having one of a first duty D1 and a second duty D2.

When the second driver circuit 80 outputs the pulse signal having the first duty D1, the current having the first current-value I1 flows through each the urging members fh1, fh2, fv1, and fv2.

When the second driver circuit 80 outputs the pulse signal having the second duty D2, the current having the second current-value I2 flows through each the urging members fh1, fh2, fv1, and fv2.

When the second driver circuit 80 does not output the pulse signal having one of the first duty D1 and the second duty D2, the urging members fh1, fh2, fv1, and fv2 are set to the off state. In other words, the pulse signal which is output from the second driver circuit 80, has 0 duty.

In the sixth embodiment, the value of the first duty D1 is 100%, and the value of the second duty D2 is less than 100%. However, the values of the first and second duties D1 and D2 may be another values, where the first duty D1 is more than the second duty D2 (D1>D2).

The other constructions in the sixth embodiment are the same as those in the first embodiment.

In the sixth embodiment, when the photographing apparatus 1 is in the off state, or when the photographing apparatus 1 is in the on state and in the non anti-shake mode, the urging members fh1, fh2, fv1, and fv2 are set to the off state and extend and then urge and fix the movable unit 30a at the center of its movement range. Because this is done in the off state, the problem of consuming too much power does not occur, as in the first embodiment.

Further, the fixing mechanism such as the motor is not needed, because the fixing of the movable unit 30a is performed by the urging members fh1, fh2, fv1, and fv2. Therefore, the anti-shake unit 30 (the photographing apparatus 1) is not enlarged by the fixing mechanism, as in the first embodiment.

Further, when the urging members fh1, fh2, fv1, and fv2 are set to the on state, the extension state is gradually changed to the shrunken state with a time lag. This time lag is changeable corresponding to the speed of the temperature-rise of the urging members fh1, fh2, fv1, and fv2, specifically this time lag becomes short as the speed of the temperature-rise of the urging members fh1, fh2, fv1, and fv2, becomes high.

In the sixth embodiment, in order to rise the speed of the temperature-rise of the urging members fh1, fh2, fv1, and fv2, the first current-value I1 for the current flows through each the urging members fh1, fh2, fv1, and fv2, in the third time-length TT3 from when the urging members fh1, fh2, fv1, and fv2 are set to the on state.

In this case, the speed of the temperature-rise is high in comparison with when the second current-value I2 for the current flows through each the urging members fh1, fh2, fv1, and fv2, so that the temperature of the urging members fh1, fh2, fv1, and fv2 reaches the second temperature faster than when the second current-value I2 for the current flows through each the urging members fh1, fh2, fv1, and fv2.

Therefore, it is possible to shorten a time that necessary for the urging members fh1, fh2, fv1, and fv2 to reach a shrunken state from the extended state where the movable unit 30a is urged and fixed at the center of its movement range by the urging members fh1, fh2, fv1, and fv2, so that the fixing of the movable unit 30a is released and the movable unit 30a is movable over the whole of its movement range.

A value of current which needs to flow through the urging members fh1, fh2, fv1, and fv2, for keeping a shrunken state of the urging members fh1, fh2, fv1, and fv2, is only the second current-value I2 which is less than the first current-value I1. Accordingly, after the third time-length TT3 has passed from when the urging members fh1, fh2, fv1, and fv2 are set to the on state, a value of current which flows through the urging members fh1, fh2, fv1, and fv2, is changed to the second current-value I2 from the first current-value I1. Therefore, it becomes possible to restrain the consumption of power.

In the case where the value of the current which flows through the urging members fh1, fh2, fv1, and fv2 is kept as the first current-value I1, the temperature of the urging members fh1, fh2, fv1, and fv2 is kept as the first temperature Te1. However, in the sixth embodiment, the value of the current which flows through the urging members fh1, fh2, fv1, and fv2 is changed to and kept as the second current-value I2, so that the temperature of the urging members fh1, fh2, fv1, and fv2 is kept as the second temperature Te2.

Accordingly, in the sixth embodiment, it becomes possible to shorten a time which is needed to extend the urging members fh1, fh2, fv1, and fv2 where the urging members fh1, fh2, fv1, and fv2 urge the movable unit 30a, in comparison with when the value of the current which flows through the urging members fh1, fh2, fv1, and fv2 is kept as the first current-value I1. This is because the urging members fh1, fh2, fv1, and fv2 do not start to extend until the temperature of the urging members fh1, fh2, fv1, and fv2 falls below to the second temperature Te2. Therefore, in the case that the temperature of the urging members fh1, fh2, fv1, and fv2 is kept as the first temperature Te1, an additional time-length where the temperature of the urging members fh1, fh2, fv1, and fv2 falls down to the second temperature Te2 from the first temperature Te1, is needed.

Figure 14:
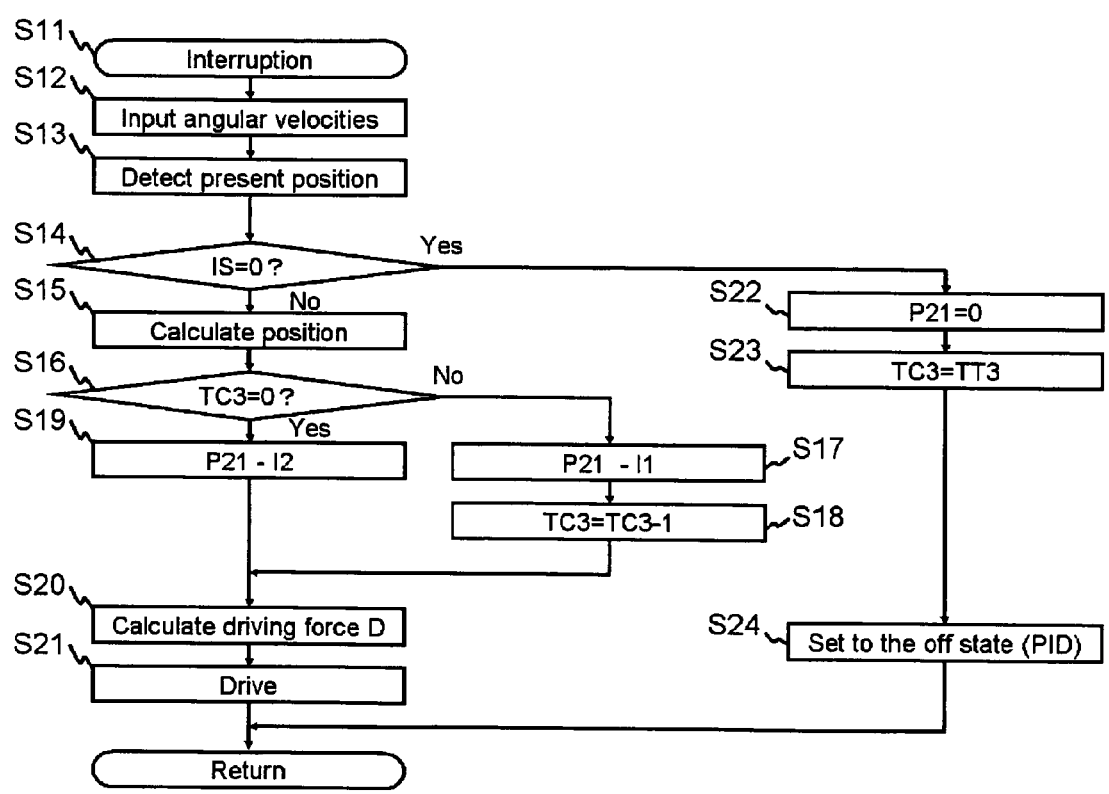
FIG. 14 is a flowchart of the anti-shake operation, which is performed at every predetermined time interval, as an interruption process, in the sixth embodiment.

Next, the flow of the anti-shake operation, which is performed at every predetermined time interval (1 ms) as an interruption process in the sixth embodiment, independently of the other operations, is explained by using the flowchart in FIG. 14. In the sixth embodiment, after the photographing apparatus 1 is set to the on state, before the 1st interruption of the anti-shake operation is performed, the output signal from the port P21 of the CPU 21 is set to the off state and the value of the third time-count parameter TC3 is set to the same value as the third time-length TT3.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S14, it is judged whether the value of the IS is 0. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S15.

In step S16, it is judged whether the value of the third time-count parameter TC3 is 0. When it is judged that the value of the third time-count parameter TC3 is not 0, the second driver circuit 80 outputs the pulse signal having the first duty D1 on the basis of the control signal from the port P21 of the CPU 21, to the urging members fh1, fh2, fv1, and fv2, in step S17. The current having the first current-value I1 flows through each of the urging members fh1, fh2, fv1, and fv2.

The urging members fh1, fh2, fv1, and fv2 are set to the on state, and shrink, so that the fixed situation of the movable unit 30a is released. In the case that it is judged that the value of the IS is not 0 (in the anti-shake mode), in the previous anti-shake operation (before 1 ms), the on state situation of the urging members fh1, fh2, fv1, and fv2 is continued. The value of the third time-count parameter TC3 is reduced by only 1, in step S18, so that the process is forwarded to step S20.

When it is judged that the value of the third time-count parameter TC3 is 0, the second driver circuit 80 outputs the pulse signal having the second duty D2 on the basis of the control signal from the port P21 of the CPU 21, to the urging members fh1, fh2, fv1, and fv2, in step S19, so that the process is forwarded to step S20. The current having the second current-value I2 flows through each of the urging members fh1, fh2, fv1, and fv2.

Because the value of the IS is not 0 (in the anti-shake mode), in the previous anti-shake operation (before 1 ms) and the urging members fh1, fh2, fv1, and fv2 are in the on state with one of the first current-value I1 and the second current-value I2, the on state situation of the urging members fh1, fh2, fv1, and fv2 is continued.

In step S20, the driving force D, which drives the first driver circuit 29 in order to move the movable unit 30a to the position S, in other words the first PWM duty dx and the second PWM duty dy, is calculated on the basis of the position S (sx, sy), which is determined in step S15, and the present position P (pdx, pdy).

In step S21, the first driving coil unit 31a is driven by using the first PWM duty dx through the first driver circuit 29, and the second driving coil unit 32a is driven by using the second PWM duty dy through the first driver circuit 29, so that the movable unit 30a is moved, so that the interruption is finished.

The process in steps S20 and S21 is an automatic control calculation, which is used with the PID automatic control for performing general (normal) proportional, integral, and differential calculations.

When it is judged that the value of the IS is 0 (IS=0), in other words in the non anti-shake mode in step S14, the urging members fh1, fh2, fv1, and fv2 are set to the off state. In other words, the pulse signal which outputs from the second driver circuit 80, has 0 duty. The urging members fh1, fh2, fv1, and fv2 are set to the off state, and extend, so that the movable unit 30a is moved to the center of its movement range. In the case that it is judged that the value of the IS is 0 (in the non anti-shake mode), in the previous anti-shake operation (before 1 ms), the off state situation of the urging members fh1, fh2, fv1, and fv2 is continued.

In step S23, the value of the third time-count parameter TC3 is set to the same value as the third time-length TT3. In step S24, the PID control is set to the off state (stopped), so that the interruption is finished.

Figure 15:
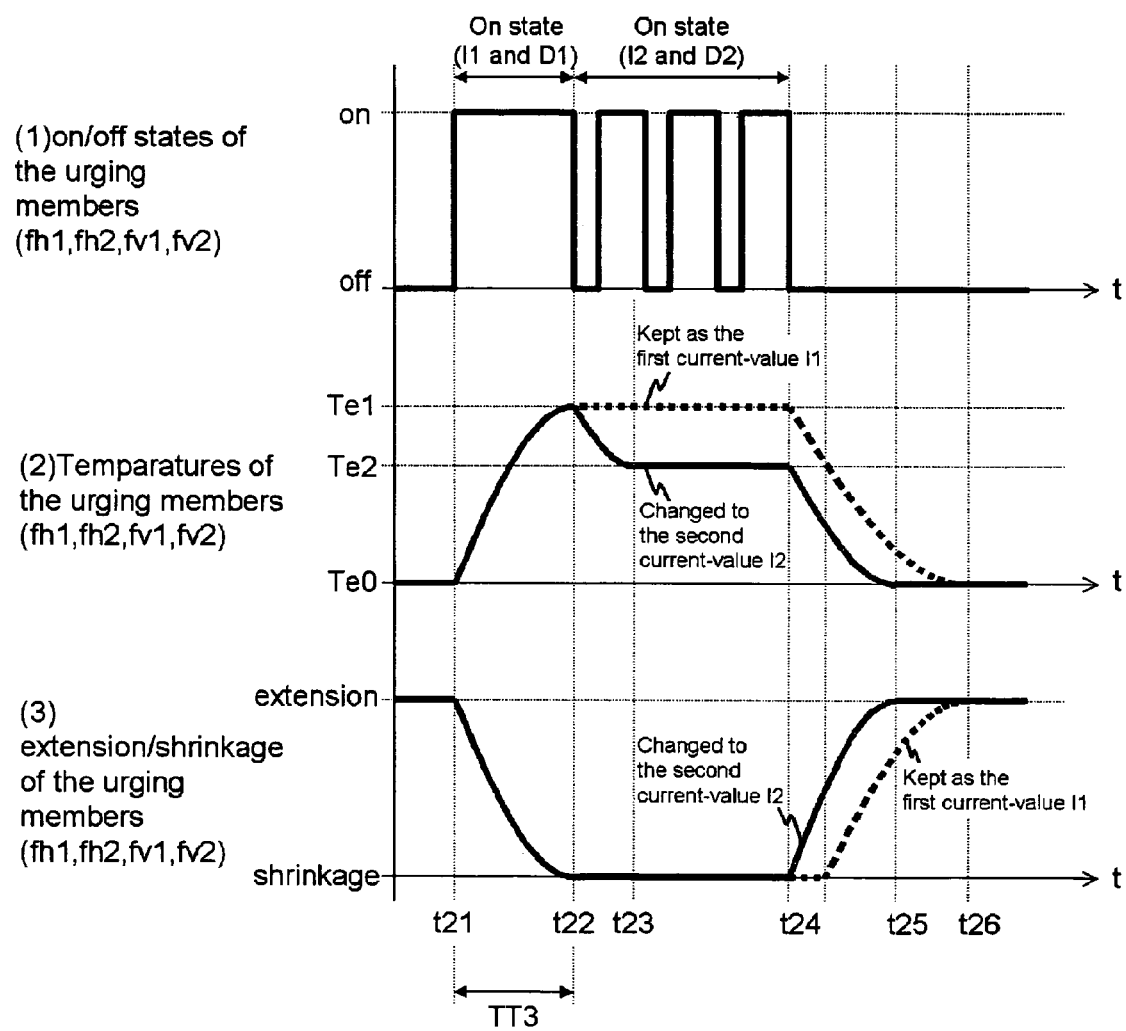
FIG. 15 is a timing chart in the sixth embodiment.

Next, changes in the on/off states of the anti-shake switch 14a, the on/off states of the urging members (fh1, fh2, fv1, and fv2), and the extension/shrunken states of the urging members (fh1, fh2, fv1, and fv2), are explained by using a timing chart in FIG. 15.

At the time point t21, the urging members fh1, fh2, fv1, and fv2 are set to the off state from the on state ((1) in FIG. 15), so that the pulse signal with the first duty D1 is input to the urging members fh1, fh2, fv1, and fv2 in which the current having the first current-value I1 flows, in the third time-length TT3 from the time point t21.

The temperature of the urging members fh1, fh2, fv1, and fv2 gradually rises up to the first temperature Te1 from the standard temperature Te0, in the third time-length TT3 ((2) in FIG. 15), so that the urging members fh1, fh2, fv1, and fv2 gradually shrink in the third time-length TT3, corresponding to the temperature-rise of the urging members fh1, fh2, fv1, and fv2 ((3) in FIG. 15).

After the time point t22, the pulse signal with the second duty D2 is input to the urging members fh1, fh2, fv1, and fv2, where the current having the second current-value I2 flows through each the urging members fh1, fh2, fv1, and fv2, until the time point t24 when the on state of the urging members fh1, fh2, fv1, and fv2 is changed to the off state ((1) in FIG. 15).

The temperature of the urging members fh1, fh2, fv1, and fv2 gradually falls down to the second temperature Te2 from the first temperature Te1, from the time point t22 to the time point t23 ((2) in FIG. 15). Because the second temperature Te2 is a temperature which is slightly more than a maximum value of the temperature-range where the urging members fh1, fh2, fv1, and fv2 change (shrink/extend) their forms, the urging members fh1, fh2, fv1, and fv2 do not extend and keep the shrunken state, corresponding to the temperature-fall ((3) in FIG. 15).

After the time point t24, the power supply to the urging members fh1, fh2, fv1, and fv2 is stopped, so that the urging members fh1, fh2, fv1, and fv2 are set to the off state. Then the temperature of the urging members fh1, fh2, fv1, and fv2 falls down to the standard temperature Te0 from the second temperature Te2 ((2) in FIG. 15). The urging members fh1, fh2, fv1, and fv2 gradually extend until the time point t25, corresponding to the temperature-fall.

In the case that at the time point t22, the value for the current which flows through each the urging members fh1, fh2, fv1, and fv2, is not changed to the second current-value I2 from the first current-value I1, the temperature of the urging members fh1, fh2, fv1, and fv2 does not fall down to the second temperature Te2 from the first temperature Te1, and keeps the first temperature Te1, which is shown by the dotted line in FIG. 15.

Accordingly, a time-length where the temperature of the urging members fh1, fh2, fv1, and fv2 falls down to the standard temperature Te0 from the first temperature Te1 (from the time point t24 to the time point t26, see the dotted line of (2) and (3) in FIG. 15), is long, in comparison with a time-length where the temperature of the urging members fh1, fh2, fv1, and fv2 falls down to the standard temperature Te0 from the second temperature Te2 (from the time point t24 to the time point t25, see the solid line of (2) and (3) in FIG. 15) in the sixth embodiment. This is because the extension of the urging members fh1, fh2, fv1, and fv2 is not started until when the temperature of the urging members fh1, fh2, fv1, and fv2 falls below the second temperature Te2 from the first temperature Te1.

Therefore, a time-length where the urging members fh1, fh2, fv1, and fv2 fully extend from the shrunken state when the temperature of the urging members fh1, fh2, fv1, and fv2 is kept as the first temperature Te1, is long, in comparison with a time-length where the urging members fh1, fh2, fv1, and fv2 fully extend from the shrunken state when the temperature of the urging members fh1, fh2, fv1, and fv2 is kept as the second temperature Te2.

In the sixth embodiment, the anti-shake unit 30 has two shafts (the first and second horizontal shafts sh1 and sh2) for slidably supporting the movable unit 30a in the first direction x, so that the anti-shake unit 30 has two shafts (the first and second vertical shafts sv1 and sv2) for slidably supporting the movable unit 30a in the second direction y, as in the first embodiment. However, the anti-shake unit 30 may have one shaft for slidably supporting the movable unit 30a in the first direction x, so that the anti-shake unit 30 may have one shaft for slidably supporting the movable unit 30a in the second direction y.

In this case, the first movable assembly 30a1 has the first horizontal bearing bh1, and does not have the second horizontal bearing bh2. Similarly, the second movable assembly 30a2 has the first horizontal shaft sh1, the first horizontal shaft-fixing unit sfh1, the second horizontal shaft-fixing unit sfh2, and the first vertical bearing bv1, and does not have the second horizontal shaft sh2, the third horizontal shaft-fixing unit sfh3, the fourth horizontal shaft-fixing unit sfh4, and the second vertical bearing bv2. Similarly, the fixed unit 30b has the first vertical shaft sv1, the first vertical shaft-fixing unit sfv1, the second vertical shaft-fixing unit sfv2, and does not have the second vertical shaft sv2, the third vertical shaft-fixing unit sfv3, and the fourth vertical shaft-fixing unit sfv4.

In the sixth embodiment, the arrangements of the second horizontal urging member fh2 and the second vertical urging member fv2 are similar to those in the first embodiment. However, these arrangements may be similar to those in the second embodiment, see FIG. 7.

Figure 16:
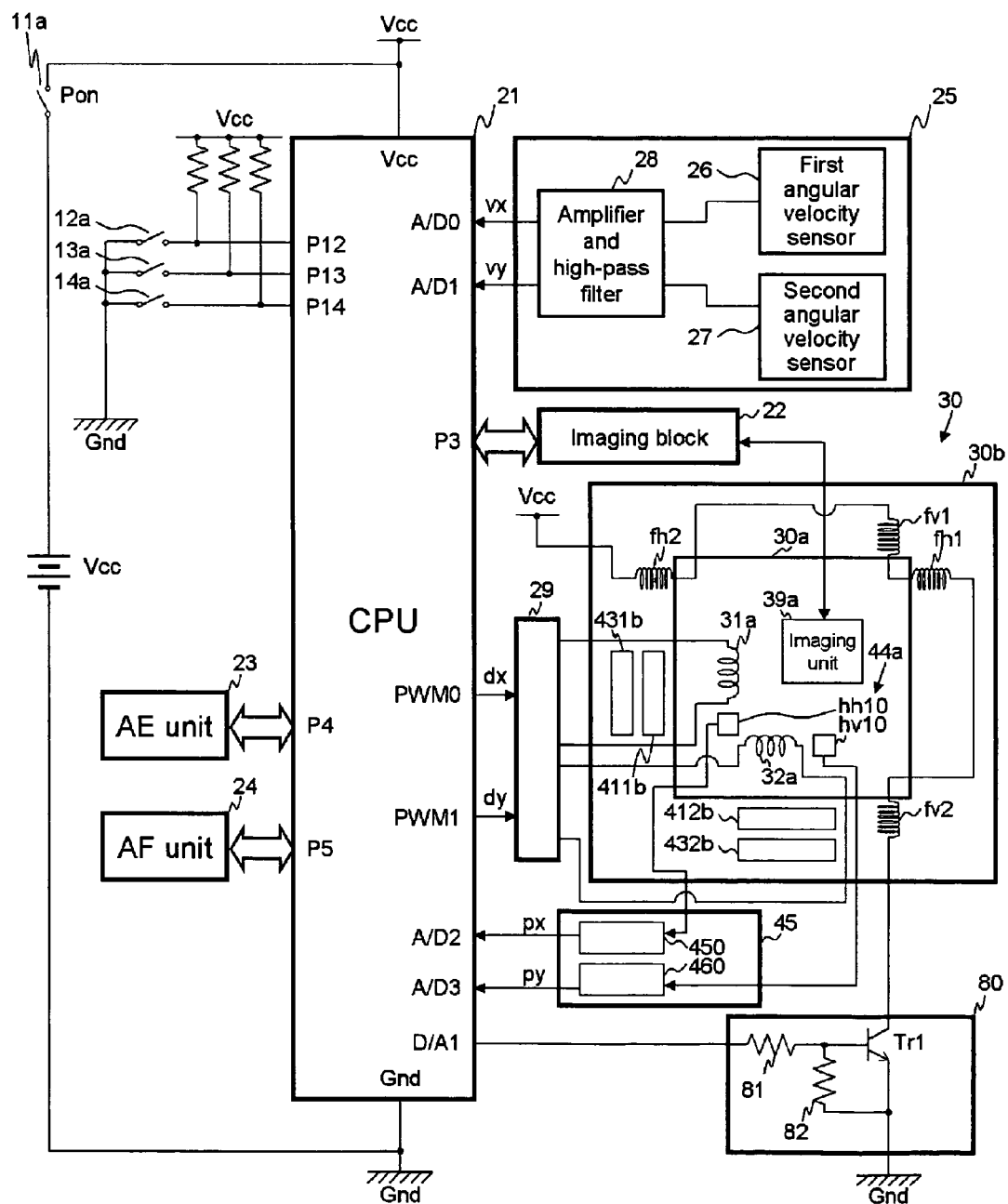
FIG. 16 is a circuit construction diagram of the photographing apparatus, in the seventh embodiment.

Next, the seventh embodiment is explained. In the seventh embodiment, an analogue control signal is output from a D/A converter D/A1 of the CPU 21 (see FIG. 16), instead of the digital control signal is output from the port P21 of the CPU 21 in the sixth embodiment. The digital output signal is output to the urging members fh1, fh2, fv1, and fv2, through the second driver circuit 80, from the port P21 of the CPU 21, where one of the first and second current-values I1 and I2 flows through the urging members fh1, fh2, fv1, and fv2.

In the seventh embodiment, the transistor Tr1 is an NPN transistor for amplifying the power which is supplied to the urging members fh1, fh2, fv1, and fv2, and whose base is connected to the D/A converter D/A1 of the CPU 21 through the first bias resistor 81.

Figure 17:
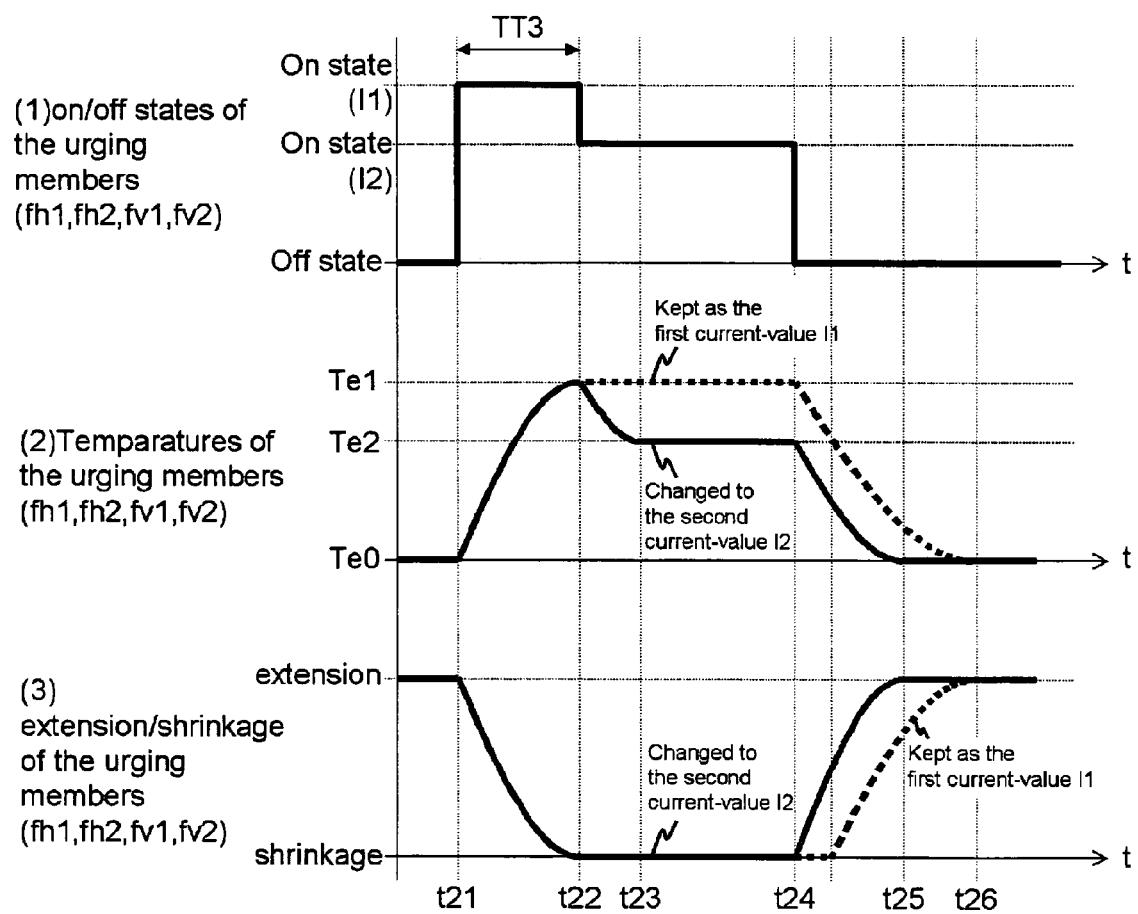
FIG. 17 is a timing chart in the seventh embodiment.

In the seventh embodiment, the current having the first current-value I1 or the second current-value I2, flows through the urging members fh1, fh2, fv1, and fv2 on the basis of the analogue output signal from the CPU 21 (see FIG. 17). In the sixth embodiment, the current having the first current-value I1 or the second current-value I2, flows through the urging members fh1, fh2, fv1, and fv2 on the basis of the pulse signal from the second driver circuit 80 (see FIG. 15).

The other constructions in the seventh embodiment are the same as those in the sixth embodiment. In the seventh embodiment, a timing where the current having the first current-value I1 or the second current-value I2 flows through the urging members fh1, fh2, fv1, and fv2, is the same as that of the sixth embodiment, so that the same effects as those of the sixth embodiment can be obtained.

Next, the eighth embodiment is explained. In the eighth embodiment, a function of the CPU 21 in the anti-shake operation according to time and an arrangement of the urging members fh1, fh2, fv1, and fv2 are different from those of the first embodiment (see FIGS. 18 and 20).

Therefore, the eighth embodiment is explained centering on the constructions (functions) of the photographing apparatus 1 in the eighth embodiment which are different from the constructions (functions) of the photographing apparatus 1 in the first embodiment.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The CPU 21 controls an electrical on/off control of the first and second horizontal urging members fh1 and fh2 by using the on/off change of the anti-shake switch 14a, through the port P18 and the second driver circuit 80.

The CPU 21 controls an electrical on/off control of the first and second vertical urging members fv1 and fv2 by using the on/off change of the anti-shake switch 14a, through the port P19 and the third driver circuit 83.

The CPU 21 stores the value of the parameter IS which is used for judging whether the photographing apparatus 1 is in the anti-shake mode.

The CPU 21 stores the value of a fourth time-length TT4. The CPU 21 stores the value of a fourth time-count parameter TCX which shows the difference between the fourth time-length TT4 and a progress time-length from when the values of the first angular velocity vx (which are detected at every predetermined time interval (1 ms)), are judged to have a same positive or negative sign.

The CPU 21 stores the value of a fifth time-count parameter TCY which shows the difference between the fourth time-length TT4 and a progress time-length from when the values of the second angular velocity vy (which are detected at every predetermined time interval (1 ms)), are judged to have a same positive or negative sign.

The fourth time-length TT4 is 1 or an integer greater than 1. The fourth time-length TT4 is longer than the predetermined time interval (1 ms). The fourth time-count parameter TCX is 0 or an integer greater than 0. The fifth time-count parameter TCY is 0 or an integer greater than 0.

The angular velocity unit 25 has a first angular velocity sensor 26, a second angular velocity sensor 27, and a combined amplifier and high-pass filter circuit 28.

The first angular velocity sensor 26 detects the velocity-component in the first direction x of the angular velocity of the photographing apparatus 1, at every predetermined time interval (1 ms), as information regarding hand-shake, which is lag of the photographic subject image on the imaging surface of the imaging device 39a1 in the first direction x.

The second angular velocity sensor 27 detects the velocity-component in the second direction y of the angular velocity of the photographing apparatus 1, at every predetermined time interval (1 ms), as information regarding hand-shake, which is lag of the photographic subject image on the imaging device 39a1.

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a drift component of the second angular velocity sensor 27, and outputs the analogue signal to the A/D converter A/D 1 of the CPU 21 as a second angular velocity vy.

Driving the movable unit 30a by the PID control, in other words the anti-shake operation, is performed in the anti-shake mode when the anti-shake switch 14a is in the on state.

Further, even in the anti-shake mode, when the value of the fourth time-count parameter TCX is 0, driving the movable unit 30a by the PID control in the first direction x, is set to the off state (stopped). In this time, the movable unit 30a is urged and fixed at the center of its movement range in the first direction x by the first and second horizontal urging members fh1 and fh2.

Similarly, even in the anti-shake mode, when the value of the fifth time-count parameter TCY is 0, driving the movable unit 30a by the PID control in the second direction y, is set to the off state (stopped). In this time, the movable unit 30a is urged and fixed at the center of its movement range in the second direction y by the first and second vertical urging members fv1 and fv2.

Figure 19:
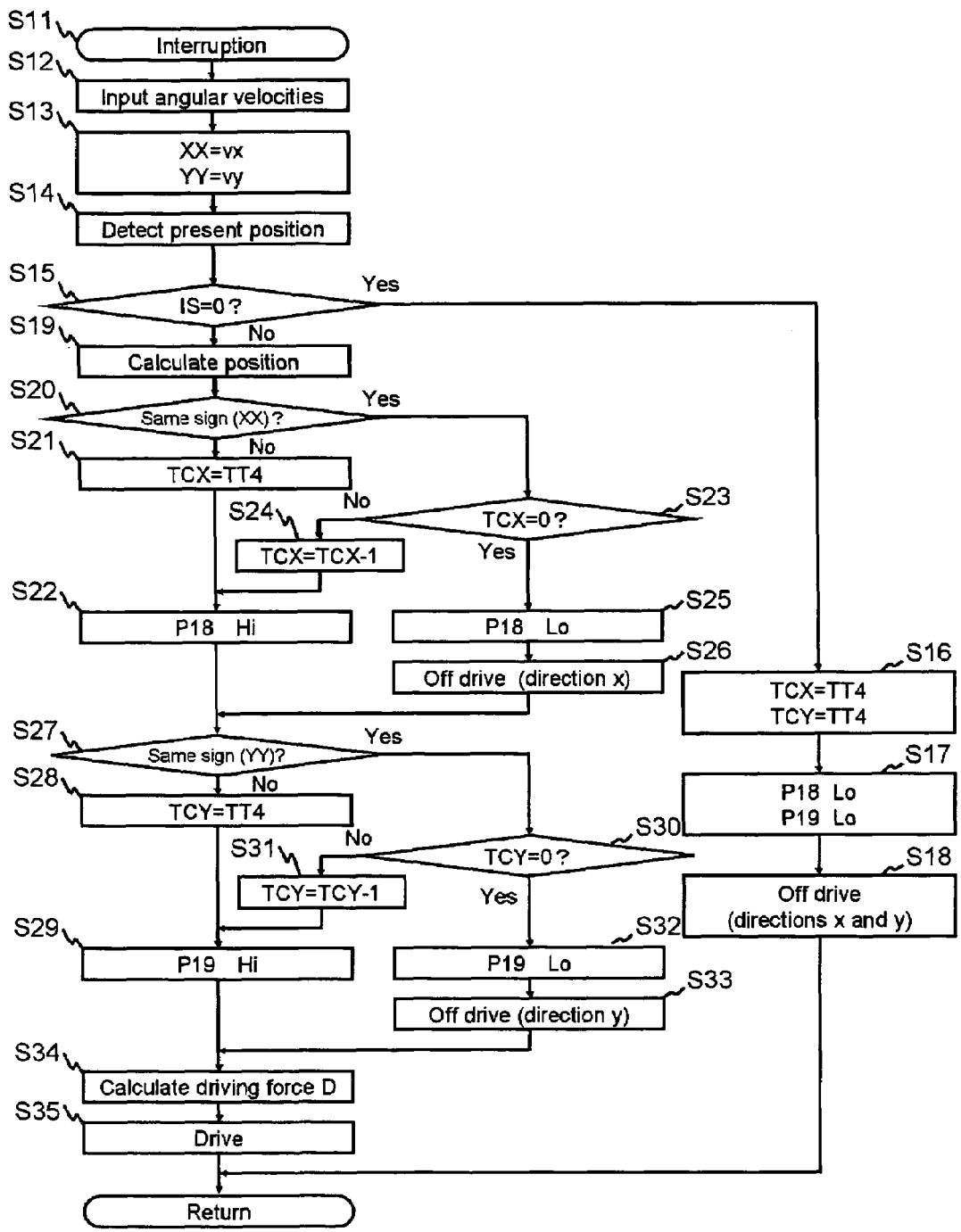
FIG. 19 is a flowchart of the anti-shake operation, which is performed at every predetermined time interval, as an interruption process, in the eighth embodiment.

A judgment whether the value of the fourth time-count parameter TCX is 0, is performed by the CPU 21 (see FIG. 19). A judgment whether the value of the fifth time-count parameter TCY is 0, is performed by the CPU 21.

Figure 18:
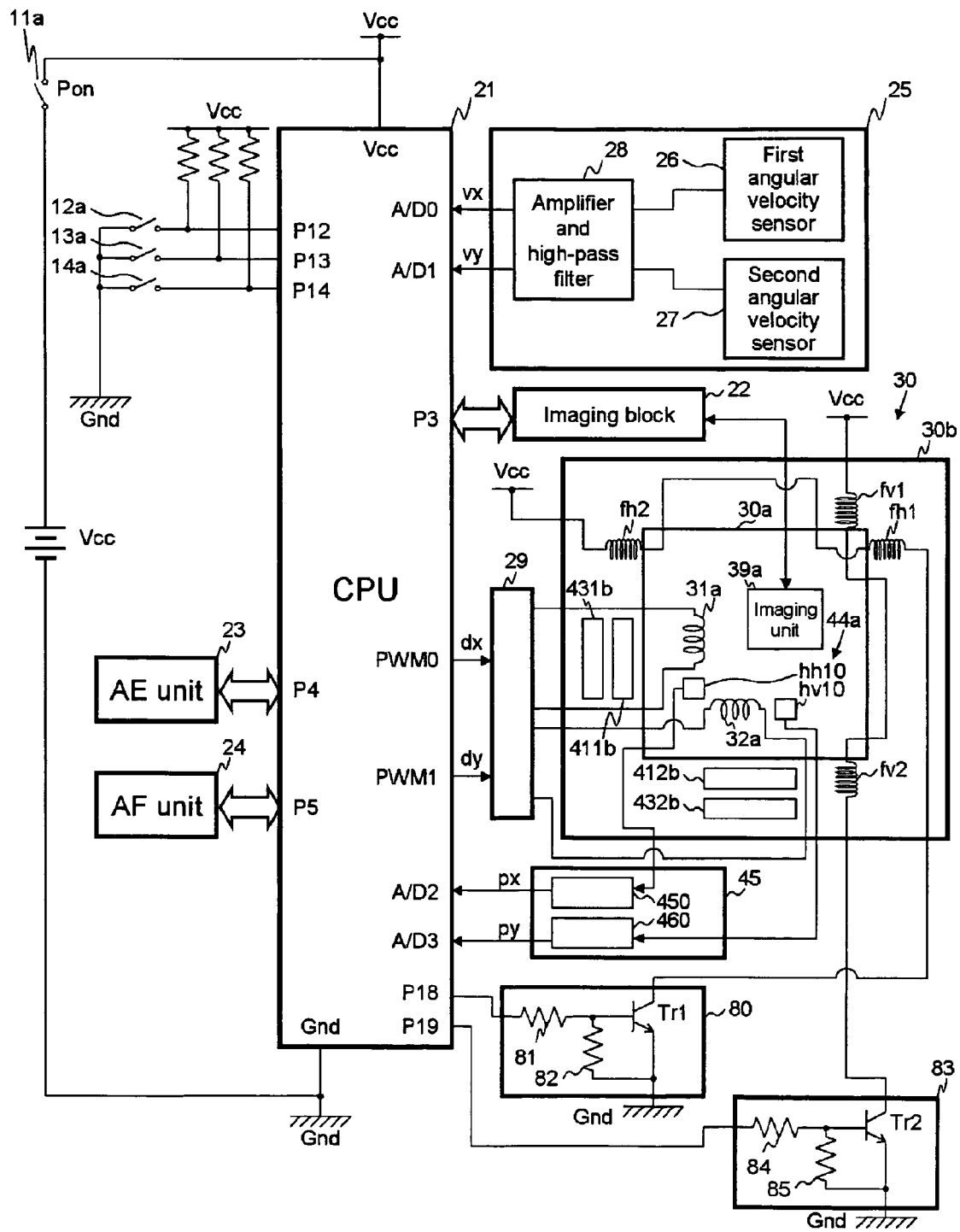
FIG. 18 is a circuit construction diagram of the photographing apparatus, in the eighth embodiment.

In the eighth embodiment, the first and second horizontal urging members fh1 and fh2 are connected in series (see FIG. 18). However, the first and second horizontal urging members fh1 and fh2 may be connected in parallel (not depicted).

Similarly, the first and second vertical urging members fv1 and fv2 are connected in series (see FIG. 18). However, the first and second vertical urging members fv1 and fv2 may be connected in parallel (not depicted).

The first and second horizontal urging members fh1 and fh2 are connected with the second driver circuit 80, through the flexible circuit board (not depicted).

Specifically, one of the terminals of the second horizontal urging member fh2 is connected with a power supply whose voltage is the voltage Vcc. Another terminal of the second horizontal urging member fh2 is connected with one of the terminals of the first horizontal urging member fh1. Another terminal of the first horizontal urging member fh1 is connected with a collector of the transistor Tr1 of the second driver circuit 80.

The second driver circuit 80 is connected with the port P18 of the CPU 21. The Hi signal and the Lo signal are output from the port P21 to the second driver circuit 80. When the port P18 outputs the Hi signal, the first and second horizontal urging members fh1 and fh2 are set to the on state. When the port P18 outputs the Lo signal, the first and second horizontal urging members fh1 and fh2 are set to the off state.

The first and second vertical urging members fv1 and fv2 are connected with the third driver circuit 83, through the flexible circuit board (not depicted).

Specifically, one of the terminals of the first vertical urging member fv1 is connected with a power supply whose voltage is the voltage Vcc. Another terminal of the first vertical urging member fv1 is connected with one of the terminals of the second vertical urging member fv2. Another terminal of the second vertical urging member fv2 is connected with a collector of the transistor Tr3 of the third driver circuit 83.

The third driver circuit 83 is connected with the port P19 of the CPU 21. The Hi signal and the Lo signal are output from the port P19 to the third driver circuit 83. When the port P19 outputs the Hi signal, the first and second vertical urging members fv1 and fv2 are set to the on state. When the port P19 outputs the Lo signal, the first and second vertical urging members fv1 and fv2 are set to the off state.

When the photographing apparatus 1 is in the off state, or when the photographing apparatus 1 is in the on state and when the anti-shake operation is not performed (in the non anti-shake mode), the first and second horizontal urging members fh1 and fh2 are set to the off state.

Further, when the photographing apparatus 1 is in the on state and when the anti-shake operation is performed (in the anti-shake mode) and when the value of the fourth time-count parameter TCX is 0, the first and second horizontal urging members fh1 and fh2 are set to the off state.

When the photographing apparatus 1 is in the on state, and when the anti-shake operation is performed (in the anti-shake mode) and then the value of the fourth time-count parameter TCX is not 0, the first and second horizontal urging members fh1 and fh2 are set to the on state.

When the photographing apparatus 1 is in the off state, or when the photographing apparatus 1 is in the on state and when the anti-shake operation is not performed (in the non anti-shake mode), the first and second vertical urging members fv1 and fv2 are set to the off state.

Further, when the photographing apparatus 1 is in the on state and when the anti-shake operation is performed (in the anti-shake mode) and when the value of the fifth time-count parameter TCY is 0, the first and second vertical urging members fv1 and fv2 are set to the off state.

When the photographing apparatus 1 is in the on state, and when the anti-shake operation is performed (in the anti-shake mode) and when the value of the fifth time-count parameter TCY is not 0, the first and second vertical urging members fv1 and fv2 are set to the on state.

When the urging members fh1, fh2, fv1, and fv2 are in the off state, the first and second horizontal urging members fh1 and fh2 extend and then restrict the movement of the movable unit 30a and fix the movable unit 30a at the center of its movement range in the first direction x, so that the first and second vertical urging members fv1 and fv2 extend and then restrict the movement the movable unit 30a and fix the movable unit 30a at the center of its movement range in the second direction y.

When the urging members fh1, fh2, fv1, and fv2 are in the on state, the first and second horizontal urging members fh1 and fh2 shrink and release the fixed situation of the movable unit 30a in the first direction x (non-restricted movement), so that the first and second vertical urging members fv1 and fv2 shrink and release the fixed situation of the movable unit 30a in the second direction y (non-restricted movement).

Accordingly, the on/off states of the urging members fh1, fh2, fv1, and fv2 are changed corresponding to the on/off states of the Pon switch 11a and the on/off states of the anti-shake switch 14a and the values of the fourth and fifth time-count parameters TCX and TCY.

The second driver circuit 80 is composed of transistor Tr1, a first bias resistor 81, and a second bias resistor 82. The transistor Tr1 is an NPN transistor which performs the switching of the power supplied to the first and second horizontal urging members fh1 and fh2, and whose base is connected to the port P18 of the CPU 21 through the first bias resistor 81. The second bias resistor 82 is connected between the base of the transistor Tr1 and the emitter of the transistor Tr1.

The third driver circuit 83 is composed of transistor Tr3, a third bias resistor 84, and a fourth bias resistor 85. The transistor Tr3 is an NPN transistor which performs the switching of the power supplied to the first and second vertical urging members fv1 and fv2, and whose base is connected to the port P19 of the CPU 21 through the third bias resistor 84. The fourth bias resistor 85 is connected between the base of the transistor Tr3 and the emitter of the transistor Tr3.

The other constructions in the eighth embodiment are the same as those in the first embodiment.

In the eighth embodiment, when the photographing apparatus 1 is in the off state, or when the photographing apparatus 1 is in the on state and in the non anti-shake mode, the first and second horizontal urging members fh1 and fh2 and the first and second vertical urging members fv1 and fv2 are set to the off state and extend and then urge and fix the movable unit 30a at the center of its movement range. Because this is done in the off state, the problem of consuming too much power does not occur.

Further, a fixing mechanism such as a motor is not needed, because the fixing of the movable unit 30a is performed by the first and second horizontal urging members fh1 and fh2 and the first and second vertical urging members fv1 and fv2. Therefore, the anti-shake unit 30 (the photographing apparatus 1) is not enlarged by the fixing mechanism.

Further, when the photographing apparatus 1 is in the on state and in the anti-shake mode, and when the value of the fourth time-count parameter TCX is 0, the first and second horizontal urging members fh1 and fh2 are set to the off state, so that the movable unit 30a is urged in the first direction x.

For example, when panning is carried out by the operator by moving the photographing apparatus 1 in the first direction x, the values of the first angular velocity vx which are detected at every predetermined time interval (1 ms), as the information regarding lag (hand-shake) in the first direction x, have the same positive or negative sign.

When a hand-shake occurs while the photographing apparatus 1 is held by the operator, the values of the first angular velocity vx which are detected at every predetermined time interval (1 ms), do not have the same positive or negative sign.

In the eighth embodiment, in the case where the values of the first velocity vx which are detected at every predetermined time interval (1 ms), have the same positive or negative sign in the fourth time-length TT4, it is judged that panning in the first direction x is occurring, so that even in the anti-shake mode, the anti-shake operation in the first direction x is set to the off state (stopped).

To have the same positive or negative sign between a value of a first velocity vx which is detected at the present time (or at the latest anti-shake operation) and a value of a first velocity vx which is detected in the predetermined time interval (1 ms) before (or at the previous anti-shake operation), means that a direction of the movement of the photographing apparatus 1 in the first direction x which is occurring at the present time, is the same as a direction of the movement of the photographing apparatus 1 in the first direction x which occurred before the predetermined time interval (1 ms).

Further, when the photographing apparatus 1 is in the on state and in the anti-shake mode and when the value of the fifth time-count parameter TCY is 0, the first and second vertical urging members fv1 and fv2 are set to the off state, so that the movable unit 30a is urged in the second direction y.

For example, when panning is carried out by the operator moving the photographing apparatus 1 in the second direction y, the values of the second angular velocity vy which are detected at every predetermined time interval (1 ms), as the information regarding lag (hand-shake) in the second direction y, have the same positive or negative sign.

When the hand-shake occurs while the photographing apparatus 1 is held by the operator, the values of the second angular velocity vy which are detected at every predetermined time interval (1 ms), do not have the same positive or negative sign.

In the eighth embodiment, in the case where the values of the second velocity vy which are detected at every predetermined time interval (1 ms), have the same positive or negative sign in the fourth time-length TT4, it is judged that panning in the second direction y is occurring, so that even in the anti-shake mode, the anti-shake operation in the second direction y is set to the off state (stopped).

To have the same positive or negative sign between a value of a second velocity vy which is detected at the present time (or at the latest anti-shake operation) and a value of a second velocity vy which is detected in the predetermined time interval (1 ms) before (or at the previous anti-shake operation), means that a direction of the movement of the photographing apparatus 1 in the second direction y which is occurring at the present time is the same as a direction of the movement of the photographing apparatus 1 in the second direction y which occurred before the predetermined time interval (1 ms).

Accordingly, corresponding to the photographing situation, the movable unit 30a can be fixed only in the first direction x or the second direction y, by the urging members, so that the anti-shake operation can be performed only in the first direction x or the second direction y. Therefore, even when the panning is operated, the appropriate anti-shake operation can be performed.

Next, the flow of the anti-shake operation, which is performed at every predetermined time interval (1 ms) as an interruption process in the eighth embodiment, independently of the other operations, is explained by using the flowchart in FIG. 19. In the eighth embodiment, after the photographing apparatus 1 is set to the on state, before the 1st interruption of the anti-shake operation is performed, the output signals from the ports P18 and P19 of the CPU 21 are set to the Lo signal and the values of the fourth and fifth time-count parameter TCX and TCY are set to the same value as the fourth time-length TT4.

Further, the CPU 21 stores a first variable XX and a second variable YY.

The first variable XX is set at a value of the first angular velocity vx which was detected in the previous predetermined time interval (1 ms) (or in the previous anti-shake operation). The first variable XX is used for judging whether the value of the first angular velocity vx which is detected at the present time (or at the latest anti-shake operation) and the value of the first angular velocity vx which was detected in the previous predetermined time interval (1 ms) (or in the previous anti-shake operation) have the same positive or negative sign.

The second variable YY is set at a value of the second angular velocity vy which was detected in the previous predetermined time interval (1 ms) (or in the previous anti-shake operation). The second variable YY is used for judging whether the value of the second angular velocity vy which is detected at the present time (or at the latest anti-shake operation) and the value of the second angular velocity vy which was detected in the previous predetermined time interval (1 ms) (or in the previous anti-shake operation) have the same positive or negative sign.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the first variable XX is set to the value of the first angular velocity vx which is detected in step S12, and the second variable YY is set to the value of the second angular velocity vy which is detected in step S12.

In step S14, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S15, it is judged whether the value of the IS is 0. When it is judged that the value of the IS is 0 (IS=0), in other words in the non anti-shake mode, the value of the fourth time-count parameter TCX is set to the value of the fourth time-length TT4, and the value of the fifth time-count parameter TCY is set to the value of the fourth time-length TT4, in step S16.

In step S17, the signals which are output from the ports P18 and P19 of the CPU 21 are set to the Lo signal. The urging members fh1, fh2, fv1, and fv2 are set to the off state, and extend, so that the movable unit 30a is moved to the center of its movement range. In the case that it is judged that the value of the IS is 0 (in the non anti-shake mode), in the previous anti-shake operation (before 1 ms) the off state situation of the urging members fh1, fh2, fv1, and fv2 is continued.

In step S18, the drive by the PID control in both the first direction x and the second direction y is set to the off state, so that the interruption is finished.

When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S19.

In step S20, it is judged whether the value of the first variable XX which is set in the latest anti-shake operation, and the value of the first variable XX which was set in the previous anti-shake operation, have the same positive or negative sign.

When it is judged that the value of the first variable XX which is set in the latest anti-shake operation, and the value of the first variable XX which was set in the previous anti-shake operation, do not have the same positive or negative sign, the value of the fourth time-count parameter TCX is set to the value of the fourth time-length TT4, in step S21.

In step S22, the signal which is output from the ports P18 of the CPU 21 is set to the Hi signal. The first and second horizontal urging members fh1 and fh2 are set to the on state, and shrink, so that the fixed situation of the movable unit 30a in the first direction x is released.

In the case where it is judged that the value of the first variable XX which was set in the previous anti-shake operation, and the value of the first variable XX which was set in the anti-shake operation one before the previous anti-shake operation, do not have the same positive or negative sign, the on state situation of the first and second horizontal urging members fh1 and fh2 is continued.

When it is judged that the value of the first variable XX which is set in the latest anti-shake operation, and the value of the first variable XX which was set in the previous anti-shake operation, have the same positive or negative sign, it is judged whether the value of the fourth time-count parameter TCX is 0, in step S23.

When it is judged that the value of the fourth time-count parameter TCX is not 0, the value of the fourth time-count parameter TCX is reduced by only 1, in step S24, so that the process is forwarded to step S22.

When it is judged that the value of the fourth time-count parameter TCX is 0, the output signal from the port P18 of the CPU 21 is set to the Lo signal, in step S25. The first and second horizontal urging members fh1 and fh2 are set to the off state, and extend, so that the movable unit 30a is moved to the center of its movement range in the first direction x. In the case where it is judged that the value of fourth time-count parameter TCX is 0, in the previous anti-shake operation (before 1 ms), the off state situation of the first and second horizontal urging members fh1 and fh2 is continued.

In step S26, the drive by the PID control in the first direction x is set to the off state, so that the process is forwarded to step S27.

In step S27, it is judged whether the value of the second variable YY which is set in the latest anti-shake operation, and the value of the second variable YY which was set in the previous anti-shake operation, have a same positive or negative sign.

When it is judged that the value of the second variable YY which is set in the latest anti-shake operation, and the value of the second variable YY which was set in the previous anti-shake operation, do not have the same positive or negative sign, the value of the fifth time-count parameter TCY is set to the value of the fourth time-length TT4, in step S28.

In step S29, the signal which is output from the ports P19 of the CPU 21 is set to the Hi signal. The first and second vertical urging members fv1 and fv2 are set to the on state, and shrink, so that the fixed situation of the movable unit 30a in the second direction y is released.

In the case that it is judged that the value of the second variable YY which was set in the previous anti-shake operation, and the value of the second variable YY which was set in the anti-shake operation one before the previous anti-shake operation, do not have the same positive or negative sign, the on state situation of the first and second vertical urging members fv1 and fv2 is continued.

When it is judged that the value of the second variable YY which is set in the latest anti-shake operation, and the value of the second variable YY which was set in the previous anti-shake operation, have the same positive or negative sign, it is judged whether the value of the fifth time-count parameter TCY is 0, in step S30.

When it is judged that the value of the fifth time-count parameter TCY is not 0, the value of the fifth time-count parameter TCY is reduced by only 1, in step S31, so that the process is forwarded to step S29.

When it is judged that the value of the fifth time-count parameter TCY is 0, the output signal from the port P19 of the CPU 21 is set to the Lo signal, in step S32. The first and second vertical urging members fv1 and fv2 are set to the off state, and extend, so that the movable unit 30a is moved to the center of its movement range in the second direction y. In the case that it is judged that the value of fifth time-count parameter TCY is 0, in the previous anti-shake operation (before 1 ms), the off state situation of the first and second vertical urging members fv1 and fv2 is continued.

In step S33, the drive by the PID control in the second direction y is set to the off state, so that the process is forwarded to step S34.

In step S34, the driving force D, which drives the first driver circuit 29 in order to move the movable unit 30a to the position S, in other words the first PWM duty dx and the second PWM duty dy, is calculated on the basis of the position S (sx, sy), which is determined in step S19, and the present position P (pdx, pdy).

In step S35, the first driving coil unit 31a is driven by using the first PWM duty dx through the first driver circuit 29, and the second driving coil unit 32a is driven by using the second PWM duty dy through the first driver circuit 29, so that the movable unit 30a is moved. The interruption is finished.

The process in steps S34 and S35 is an automatic control calculation, which is used with the PID automatic control for performing general (normal) proportional, integral, and differential calculations.

Figure 20:
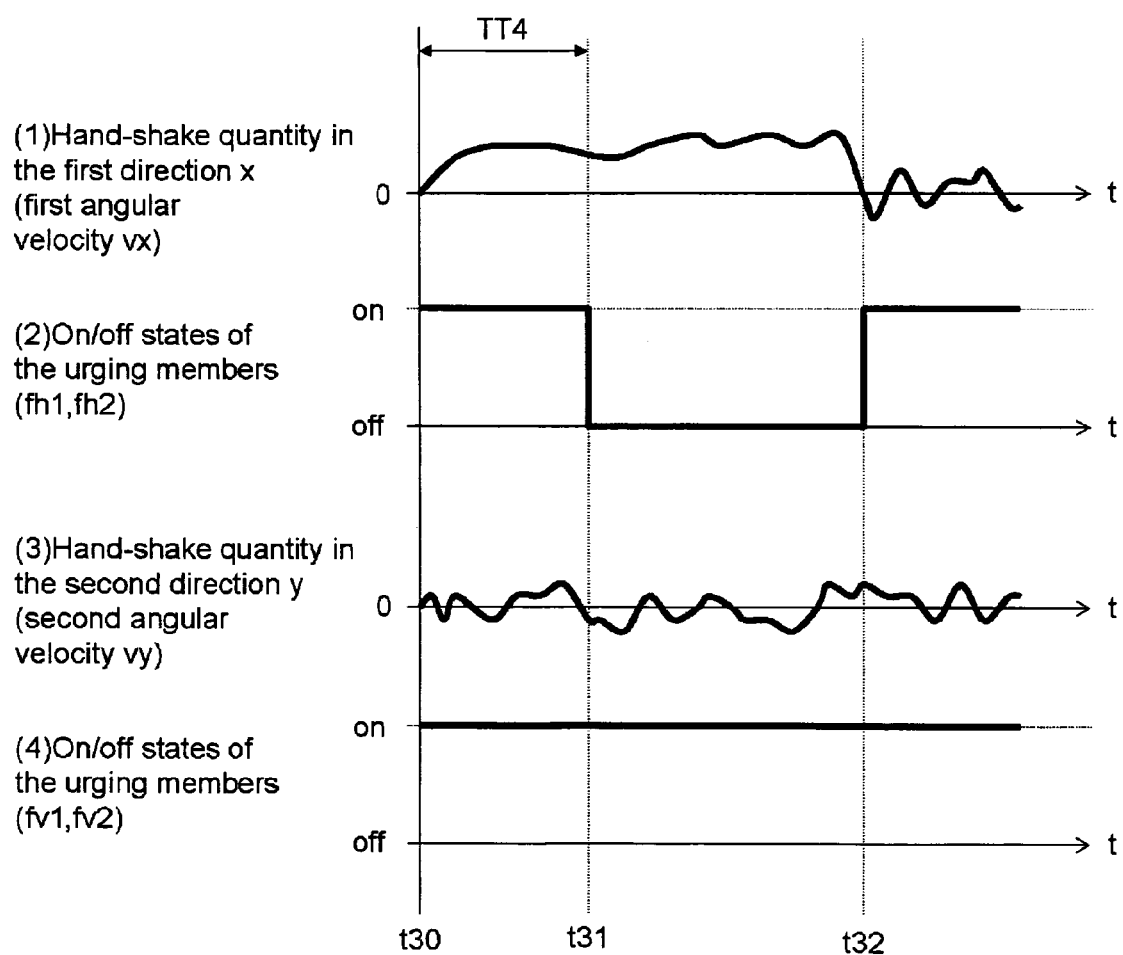
FIG. 20 is a timing chart in the eighth embodiment.

Next, changes in the first and second velocities vx and vy, and the on/off states of the urging members (fh1, fh2, fv1, and fv2) are explained by using a timing chart in FIG. 20.

At the time point t30, the anti-shake switch 14a is set to the on state from the off state, so that the urging members fh1, fh2, fv1, and fv2 is set to the on state from the off state.

The urging members fh1, fh2, fv1, and fv2 gradually shrink, so that the fixed situation of the movable unit 30a is released, and the movable unit 30a becomes movable in its movement range both in the first direction x and the second direction y.

The values of the first angular velocity vx (as an information regarding hand-shake in the first direction x) which is detected from the time point t30 to the time point t32, have the same positive sign ((1) in FIG. 20).

The time point t32 is a later time point in comparison with the time point t31, when the fourth time-length TT4 has passed from the time point t31. The time point t32 is the time point when the sign of the first velocity vx which is detected in the latest anti-shake operation and the sign of the first velocity vx which was detected in the previous anti-shake operation become different.

At the time point t31, it is judged that the values of the first velocity vx which are detected at every predetermined time interval (1 ms), have a same positive or negative sign in the fourth time-length TT4, so that it is judged that panning in the first direction x is being carried out. Accordingly even in the anti-shake mode, the anti-shake operation in the first direction x is set to the off state (stopped). Specifically, the first and second horizontal urging members fh1 and fh2 are set to the off state, so that the movable unit 30a is urged and fixed at the center of its movement range in the first direction x.

At the time point t32, it is judged that the values of the first velocity vx which are detected at every predetermined time interval (1 ms), do not have a same positive or negative sign in the fourth time-length TT4, so that it is judged the panning in the first direction x is not being carried out (or has finished). Specifically the first and second horizontal urging members fh1 and fh2 are set to the on state ((2) in FIG. 20), so that the movable unit 30a becomes movable in the first direction x.

However, from the time point t30 to the time point t32, the values of the second angular velocity vy (as an information regarding hand-shake in the second direction y) which are detected in the fourth time-length TT4, do not have the same positive sign ((3) in FIG. 20).

Accordingly at any time point from the time point t30 to the time point t32, it is not judged that the values of the second velocity vy which are detected at every predetermined time interval (1 ms), have a same positive or negative sign in the fourth time-length TT4, so that it is not judged that panning in the second direction y is being carried out.

Therefore, the first and second vertical urging members fv1 and fv2 are kept in the on state from the time point t30 to the time point t32, so that the movable unit 30a is kept movable in the second direction y.

In the eighth embodiment, the anti-shake unit 30 has two shafts (the first and second horizontal shafts sh1 and sh2) for slidably supporting the movable unit 30a in the first direction x, so that the anti-shake unit 30 has two shafts (the first and second vertical shafts sv1 and sv2) for slidably supporting the movable unit 30a in the second direction y, as in the first embodiment. However, the anti-shake unit 30 may have one shaft for slidably supporting the movable unit 30a in the first direction x, so that the anti-shake unit 30 may have one shaft for slidably supporting the movable unit 30a in the second direction y.

In this case, the first movable assembly 30a1 has the first horizontal bearing bh1, and does not have the second horizontal bearing bh2. Similarly, the second movable assembly 30a2 has the first horizontal shaft sh1, the first horizontal shaft-fixing unit sfh1, the second horizontal shaft-fixing unit sfh2, and the first vertical bearing bv1, and does not have the second horizontal shaft sh2, the third horizontal shaft-fixing unit sfh3, the fourth horizontal shaft-fixing unit sfh4, and the second vertical bearing bv2. Similarly, the fixed unit 30b has the first vertical shaft sv1, the first vertical shaft-fixing unit sfv1, the second vertical shaft-fixing unit sfv2, and does not have the second vertical shaft sv2, the third vertical shaft-fixing unit sfv3, and the fourth vertical shaft-fixing unit sfv4.

In the eighth embodiment, the arrangements of the second horizontal urging member fh2 and the second vertical urging member fv2 are similar to those in the first embodiment. However, these arrangements may be similar to those in the second embodiment, see FIG. 7.

In the first, second, third, fourth, fifth, sixth, seventh, and eighth embodiments, it is explained that the first and second horizontal urging members fh1 and fh2 and the first and second vertical urging members fv1 and fv2 have a coil shape, so that the shaft goes through the inside of the winding of the urging member. The shaft functions to guide the coil shaped urging member where the coil shaped urging member constantly extends and shrinks in the predetermined direction. However, the guide function may be performed by a member other than the shaft. Further, if the urging member is the member which extends and shrinks in the predetermined direction constantly by itself, the guide may not be needed.

Further, the shape of the urging member is not limited to the coil shape. If the urging member is a member whose extension/shrinkage ratio is high, the urging member may be a stick type member without lengthening the span of the urging member by making the member in to a coil-shaped.

In the first, second, sixth, and seventh embodiments, it is explained that the fixing position of the movable unit 30a when using the urging members, is the center of its movement range. Or, a first predetermined position to which the movable unit 30a, is moved and fixed in the first direction x, is the center of its movement range in the first direction x, and a second predetermined position to which the movable unit 30a is moved and fixed in the second direction y, is the center of its movement range in the second direction y, in order to utilize the movement range of the movable unit 30a.

However, the first predetermined position may not be the center of its movement range in the first direction x, and the second predetermined position may not be the center of its movement range in the second direction y.

In the third, fourth, fifth, and eighth embodiments, it is explained that the fixing position of the movable unit 30a by using the urging members and the PID control is the center of its movement range. Or, a first predetermined position to which the movable unit 30a is moved and fixed in the first direction x, is the center of its movement range in the first direction x, and a second predetermined position to which the movable unit 30a is moved and fixed in the second direction y, is the center of its movement range in the second direction y, in order to utilize the movement range of the movable unit 30a.

However, the first predetermined position may not be the center of its movement range in the first direction x, and the second predetermined position may not be the center of its movement range in the second direction y.

In the case that the first predetermined position is one of the edge points of the movement range of the movable unit 30a in the first direction x and the second predetermined position is one of the edge points of the movement range of the movable unit 30a in the second direction y, only one urging member for fixing the movable unit 30a in the first direction x and only one urging member for fixing the movable unit 30a in the second direction y is needed.

In the first, second, sixth, and seventh embodiments, it is explained that the anti-shake unit 30 has four urging members such as the first and second horizontal urging members fh1 and fh2 and the first and second vertical urging members fv1 and fv2, in order to fix the movable unit 30a at the predetermined position (the center of its movement range) when the photographing apparatus 1 is in the off state, and in order to fix the movable unit 30a at the predetermined position (the center of its movement range) when the photographing apparatus 1 is in the on state and in the non anti-shake mode.

However, if the purpose of using the urging member is for fixing the movable unit at the predetermined position only when the photographing apparatus 1 is in the off state, the anti-shake unit 30 may have only one urging member. Or, the one urging member extends and then urges the movable unit 30a, and moves the movable unit 30a to one of the edge points of its movement range in the first direction x or the second direction y, so that the movable unit 30a is fixed by using the urging force of the one urging member and using the friction force between the movable unit 30a and the fixed unit 30b (not depicted).

In this case, the position to which the movable unit 30a is moved and fixed, is not the center of its movement range, so that the position is one of the edge points of its movement range in the first direction x or the second direction y. Accordingly, it is unsuitable for moving and fixing the movable unit 30a when the photographing apparatus 1 is in the on state and in the non anti-shake mode, in the first and second embodiments.

In the first, second, third, fourth, fifth, sixth, seventh, and eighth embodiments, the first position-detecting and driving magnet 411b is one body in order to detect the first location in the first direction x of the movable unit 30a, and drive the movable unit 30a in the first direction x. However a magnet for detecting the first location and a magnet for driving the movable unit 30a in the first direction x, may be separated.

Similarly, the second position-detecting and driving magnet 412b is one body in order to detect the second location in the second direction y of the movable unit 30a, and drive the movable unit 30a in the second direction y. However a magnet for detecting the second location and a magnet for driving the movable unit 30a in the second direction y, may be separated.

Further, it is explained that the hall element unit 44a is attached to the movable unit 30a and the position-detecting magnets (the first and second position-detecting and driving magnets 411b and 412b) are attached to the fixed unit 30b, however the hall element unit may be attached to the fixed unit and position-detecting magnets may be attached to the movable unit.

The magnet which generates a magnetic-field, may be a permanent magnet which always generates the magnetic-field, or an electric magnet which generates the magnetic-field when it is needed.

Further, it is explained that the movable unit 30a has the imaging device 39a1. However, the movable unit 30a may have a hand-shake correcting lens instead of the imaging device.

Further, moving the movable unit 30a by the PID control is not limited by the electromotive force of the coil and the magnet.

Further, in the first, second, third, fourth, fifth, sixth, and seventh embodiments, the movable unit 30a is movable in the first direction x and the second direction y, relative to the fixed unit 30b, so that the position-detecting operation is performed by detecting the position of the movable unit in the first direction x (the first location), and in the second direction y (the second location). However, any other methods (or means) for moving the movable unit 30a on a plane which is perpendicular to the third direction z (the optical axis LX), and for detecting the movable unit 30a on the plane, are acceptable.

For example, the movement of the movable unit may only be in one dimension, so that the movable unit can be moved only in the first direction x (not the second direction y). In this case, the parts regarding the movement of the movable unit in the second direction y and regarding the position-detecting operation of the movable unit in the second direction y, such as the first and second vertical urging members fv1 and fv2 etc., may be omitted (see FIG. 4 etc.).

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Although these embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2004-123817 (filed on Apr. 20, 2004), 2004-123683 (filed on Apr. 20, 2004), 2004-123821 (filed on Apr. 20, 2004), 2004-123995 (filed on Apr. 20, 2004), 2004-124294 (filed on Apr. 20, 2004), and 2004-124298 (filed on Apr. 20, 2004), which are expressly incorporated herein by references, in their entirety.

The invention claimed is:

1. An anti-shake apparatus of a photographing apparatus, comprising:
   a movable unit that has one of an imaging device and a hand-shake correcting lens, and that can be moved in first and second directions, said first direction being perpendicular to an optical axis of a photographing optical system of said photographing apparatus, and said second direction being perpendicular to said optical axis and said first direction;
   a fixed unit that slidably supports said movable unit in both said first and second directions; and
   an urging member that extends, and then urges and fixes said movable unit when said urging member is in the off state, and that shrinks, and then releases said movable unit when said urging member is in the on state.

2. The anti-shake apparatus according to claim 1, wherein said urging member has a coil shape.

3. The anti-shake apparatus according to claim 2, further comprising a shaft that is used for moving said movable unit in one of said first and second directions;
   said shaft going through the inside of said coil shaped urging member.

4. The anti-shake apparatus according to claim 1, wherein said urging member is a shape-memory alloy.

5. The anti-shake apparatus according to claim 1, wherein said urging member is set to the off state, when said photographing apparatus is in the off state.

6. The anti-shake apparatus according to claim 1, wherein said urging member has first, second, third, and fourth urging members;
   said first and second urging members urge and fix said movable unit to a first predetermined position in said first direction; and
   said third and fourth urging members urge and fix said movable unit to a second predetermined position in said second direction.

7. The anti-shake apparatus according to claim 6, wherein said movable unit is composed of first and second movable assemblies;
   said first movable assembly has one of said imaging device and said hand-shake correcting lens which is included in said movable unit, and is movable in both said first and second directions; and
   said second movable assembly is movable in said second direction.

8. The anti-shake apparatus according to claim 7, wherein said fixed unit has a first vertical shaft which is used for moving said movable unit in said second direction and is parallel to said second direction;
   said second movable assembly has a first horizontal shaft which is used for moving said movable unit in said first direction and is parallel to said first direction, and has a first vertical bearing which slidably supports said first vertical shaft in said second direction; and
   said first movable assembly has a first horizontal bearing which slidably supports said first horizontal shaft in said first direction.

9. The anti-shake apparatus according to claim 8, wherein said first, second, third, and fourth urging members have a coil shape;
   said first horizontal shaft goes through the inside of said first and second urging members; and
   said first vertical shaft goes through the inside of said third and fourth urging members.

10. The anti-shake apparatus according to claim 9, wherein said first urging member urges said first horizontal bearing from one side in said first direction;
    said second urging member urges said first horizontal bearing from another side in said first direction;
    said third urging member urges said first vertical bearing from the side in said second direction; and said fourth urging member urges said first vertical bearing from another side in said second direction.

11. The anti-shake apparatus according to claim 8, wherein said fixed unit has a second vertical shaft which is used for moving said movable unit in said second direction and is parallel to said second direction;
- said second movable assembly has a second horizontal shaft which is used for moving said movable unit in said first direction and is parallel to said first direction, and has a second vertical bearing which slidably supports said second vertical shaft in said second direction;
- said first movable assembly has a second horizontal bearing which slidably supports said second horizontal shaft in said first direction;
- said first and second vertical shafts have a location relation where one of said imaging device and said hand-shake correcting lens which is included in said first movable assembly, is between said first and second vertical shafts in said first direction; and
- said first and second horizontal shafts have a location relation where one of said imaging device and said hand-shake correcting lens which is included in said first movable assembly, is between said first and second horizontal shafts in said second direction.

12. The anti-shake apparatus according to claim 11, wherein said first, second, third, and fourth urging members have a coil shape;
- said first horizontal shaft goes through the inside of said first urging member;
- said second horizontal shaft goes through the inside of said second urging member;
- said first vertical shaft goes through the inside of said third urging member; and
- said second vertical shaft goes through the inside of said fourth urging member.

13. The anti-shake apparatus according to claim 12, wherein said first urging member urges said first horizontal bearing from one side in said first direction;
- said second urging member urges said second horizontal bearing from another side in said first direction;
- said third urging member urges said first vertical bearing from one side in said second direction; and
- said fourth urging member urges said second vertical bearing from another side in said second direction.

14. The anti-shake apparatus according to claim 6, wherein said first, second, third, and fourth urging members are set to the off state when said photographing apparatus is in the off state, and when said photographing apparatus is in the on state and when said anti-shake apparatus does not perform the anti-shake operation; and
- said first, second, third, and fourth urging members are set to the on state when said photographing apparatus is in the on state and when said anti-shake apparatus performs the anti-shake operation.

15. The anti-shake apparatus according to claim 6, wherein when the center area of one of said imaging device and said hand-shake correcting lens which is included in said movable unit, is located on said optical axis of said photographing optical system, the location relation between said movable unit and said fixed unit is set up so that said movable unit is located at the center of said movable unit's movement range in both said first and second directions.

16. The anti-shake apparatus according to claim 6, wherein said first predetermined position is the center of said movable unit's movement range in said first direction; and said second predetermined position is the center of said movable unit's movement range in said second direction.

17. The anti-shake apparatus according to claim 1, further comprising a control apparatus that controls the on/off states of said urging member.

18. The anti-shake apparatus according to claim 1, further comprising a moving apparatus that moves said movable unit in both said first and second directions; and
- a control apparatus that controls the on/off states of said urging member, and controls said moving apparatus;
- said urging member having a first urging unit that extends, and then urges and fixes said movable unit at a first predetermined position in said first direction when said urging member is in the off state, and that shrinks, and then releases fixing said movable unit in said first direction when said urging member is in the on state, and having a second urging unit that extends, and then urges and fixes said movable unit at a second predetermined position in said second direction when said urging member is in the off state, and that shrinks, and then releases fixing said movable unit in said second direction when said urging member is in the on state;
- said movable unit being moved and fixed at said first predetermined position in said first direction and at said second predetermined position in said second direction, by said moving apparatus, in a first time-length, after said urging member is set to the off state.

19. The anti-shake apparatus according to claim 18, wherein one of said movable unit and said fixed unit has a driving magnet unit which is included in said moving apparatus, and another of said movable unit and said fixed unit has a driving coil unit which is included in said moving apparatus; and
- said movable unit is moved to said first predetermined position in said first direction and is moved to said second predetermined position in said second direction, by electro-magnetic force on the basis of said driving magnet unit and said driving coil unit.

20. The anti-shake apparatus according to claim 19, wherein said movable unit has said driving coil unit;
- said fixed unit has said driving magnet unit;
- said driving coil unit has a first driving coil which is used for moving said movable unit in said first direction, and has a second driving coil which is used for moving said movable unit in said second direction; and
- said driving magnet unit has a first driving magnet which is used for moving said movable unit in said first direction and which faces said first driving coil, and has a second driving magnet which is used for moving said movable unit in said second direction and which faces said second driving coil.

21. The anti-shake apparatus according to claim 18, wherein said first time-length is equal to or longer than a time period from when said urging member starts to extend by being set to the off state, until when said urging member fix said movable unit by extending.

22. The anti-shake apparatus according to claim 1, further comprising a moving apparatus that moves said movable unit in both said first and second directions; and
- a control apparatus that controls the on/off states of said urging member, and controls said moving apparatus;
- said urging member having a first urging unit that extends, and then urges and fixes said movable unit at a first predetermined position in said first direction when said urging member is in the off state, and that shrinks, and then releases fixing said movable unit in said first direction when said urging member is in the on state, and having a second urging unit that extends, and then urges and fixes said movable unit at a second predetermined position in said second direction when said urging member is in the off state, and that shrinks, and then releases fixing said movable unit in said second direction when said urging member is in the on state;

said movable unit being moved and fixed at said first predetermined position in said first direction and at said second predetermined position, by said moving apparatus, until a driving force which is needed for driving said moving apparatus becomes less than a predetermined standard-value, after said urging member is set to the off state.

23. The anti-shake apparatus according to claim 22, wherein one of said movable unit and said fixed unit has a driving magnet unit which is included in said moving apparatus, and another of said movable unit and said fixed unit has a driving coil unit which is included in said moving apparatus; and said movable unit is moved to said first predetermined position in said first direction and is moved to said second predetermined position in said second direction, by electro-magnetic force on the basis of said driving magnet unit and said driving coil unit.

24. The anti-shake apparatus according to claim 23, wherein said driving coil unit has a first driving coil which is used for moving said movable unit in said first direction, and has a second driving coil which is used for moving said movable unit in said second direction;

said driving force has a first driving-force component which is used for driving said first driving coil and has a second driving-force component which is used for driving said second driving coil; and said control apparatus judges that said driving force becomes less than said predetermined standard-value, when said first and second driving-force components become less than said predetermined standard-value.

25. The anti-shake apparatus according to claim 24, wherein said movable unit has said driving coil unit;

said fixed unit has said driving magnet unit; and said driving magnet unit has a first driving magnet which is used for moving said movable unit in said first direction and which faces said first driving coil, and has a second driving magnet which is used for moving said movable unit in said second direction, and which faces said second driving coil.

26. The anti-shake apparatus according to claim 1, further comprising a moving apparatus that moves said movable unit in both said first and second directions; and a control apparatus that controls the on/off states of said urging member, and controls said moving apparatus;

said urging member having a first urging unit that extends, and then urges and fixes said movable unit at a first predetermined position in said first direction when said urging member is in the off state, and that shrinks, and then releases fixing said movable unit in said first direction when said urging member is in the on state, and having a second urging unit that extends, and then urges and fixes said movable unit at a second predetermined position in said second direction when said urging member is in the off state, and that shrinks, and then releases fixing said movable unit in said second direction when said urging member is in the on state;

said movable unit being moved and fixed at said first predetermined position in said first direction and at said second predetermined position in said second direction, by said moving apparatus, in a second time-length, after said urging member is set to the on state.

27. The anti-shake apparatus according to claim 26, wherein one of said movable unit and said fixed unit has a driving magnet unit which is included in said moving apparatus, and another of said movable unit and said fixed unit has a driving coil unit which is included in said moving apparatus; and said movable unit is moved to said first predetermined position in said first direction and is moved to said second predetermined position in said second direction, by electro-magnetic force on the basis of said driving magnet unit and said driving coil unit.

28. The anti-shake apparatus according to claim 27, wherein said movable unit has said driving coil unit;

said fixed unit has said driving magnet unit;

said driving coil unit has a first driving coil which is used for moving said movable unit in said first direction, and has a second driving coil which is used for moving said movable unit in said second direction; and said driving magnet unit has a first driving magnet which is used for moving said movable unit in said first direction and which faces said first driving coil, and has a second driving magnet which is used for moving said movable unit in said second direction and which faces said second driving coil.

29. The anti-shake apparatus according to claim 26, wherein said second time-length is equal to or longer than a time period from when said urging member starts to shrink by being set to the on state, to when said movable unit becomes movable over the whole of said movable unit's movement range.

30. The anti-shake apparatus according to claim 1, further comprising a control apparatus that controls the on/off states of said urging member, where a current having a first current-value flows through said urging member after said urging member is set to the on state, in a third time-length, and a current having a second current-value flows through said urging member after said third time-length has passed;

said second current-value being less than said first current-value.

31. The anti-shake apparatus according to claim 30, wherein said urging member is a shape-memory alloy;

the temperature of said urging member can be increased to a first temperature, when the current having said first current-value flows through said urging member; and said first temperature is a value of the temperature which is more than a maximum value of a temperature-range where said urging member change said urging member's form.

32. The anti-shake apparatus according to claim 31, wherein said third time-length is equal to or longer than a time period from when said urging member is set to the on state from the off state, until the temperature of said urging member has increased to said first temperature from a standard temperature due to the current having said first current-value flowing through said urging member; and said standard temperature is a minimum value of a temperature-range where said urging member change form.

33. The anti-shake apparatus according to claim 30, wherein said urging member is a shape-memory alloy;

the temperature of said urging member can be changed to a second temperature, when the current having said second current-value flows through said urging member; and said second temperature is a value of the temperature which is slightly more than a maximum value of a temperature-range where said urging member change said urging member's form.

34. The anti-shake apparatus according to claim 30, wherein a pulse signal having a first duty is input to said urging member, through which the current having said first current-value flows, on the basis of a control signal from said control apparatus; and a pulse signal having a second duty is input to said urging member, thorough which the current having said second current-value flows, on the basis of a control signal from said control apparatus.

35. The anti-shake apparatus according to claim 1, wherein said urging member has first and second urging units;

said first urging unit urges and fixes said movable unit in said first direction;

said second urging unit urges and fixes said movable unit in said second direction; and the on/off states of said first urging unit are operated independently to the on/off states of said second urging unit.

36. The anti-shake apparatus according to claim 35, further comprising a hand-shake quantity detecting unit and a control apparatus;

said hand-shake quantity detecting unit detecting first information regarding a hand-shake which causes lag of a photographic subject image on an imaging surface of said imaging device in said first direction, and second information regarding a hand-shake which causes lag of a photographic subject image on said imaging surface of said imaging device in said second direction, at every predetermined time interval;

said control apparatus calculating a first hand-shake quantity in said first direction on the basis of said first information, and a second hand-shake quantity in said second direction on the basis of said second information, at every said predetermined time interval;

said first and second urging units are set to the off state when said photographing apparatus is in the off state, and when said photographing apparatus is in the on state and when said anti-shake apparatus does not perform an anti-shake operation; and said control apparatus controlling the on/off states of said first and second urging units.

37. The anti-shake apparatus according to claim 36, wherein said hand-shake quantity detecting unit has a first angular velocity sensor, a second angular velocity sensor, and a combined amplifier and high-pass filter circuit;

said first angular velocity sensor detects a velocity-component in said first direction of an angular velocity of said photographing apparatus, at every said predetermined time interval;

said second angular velocity sensor detects a velocity-component in said second direction of said angular velocity, at every said predetermined time interval; and said combined amplifier and high-pass filter circuit amplifies said velocity-component in said first direction, and reduces a null voltage and a drift component, and outputs a first angular velocity as said first information to said control apparatus, and amplifies said velocity-component in said second direction, and reduces a null voltage and a drift component, and outputs a second angular velocity as said second information to said control apparatus.

38. The anti-shake apparatus according to claim 36, wherein said first urging unit is set to the off state, when said photographing apparatus is in the on state and when said anti-shake apparatus performs said anti-shake operation and when the values of said first hand-shake quantity which are detected at every said predetermined time interval, have a same positive or negative sign in a fourth time-length; and said fourth time-length is longer than said predetermined time interval.

39. The anti-shake apparatus according to claim 36, wherein said second urging unit is set to the off state, when said photographing apparatus is in the on state and when said anti-shake apparatus performs said anti-shake operation and when the values of said second hand-shake quantity which are detected at every said predetermined time interval, have a same positive or negative sign in a fourth time-length; and said fourth time-length is longer than said predetermined time interval.

40. The anti-shake apparatus according to claim 36, wherein said predetermined time interval is 1 ms.

41. An anti-shake apparatus of a photographing apparatus, comprising:

a movable unit that has one of an imaging device and a hand-shake correcting lens, and that can be moved on a plane which is perpendicular to an optical axis of a photographing optical system of said photographing apparatus;

a fixed unit that supports said movable unit so as to be movable on said plane; and an urging member that extends, and then urges and fixes said movable unit when said urging member is in the off state, and that shrinks, and then releases fixing said movable unit when said urging member is in the on state.

42. An anti-shake apparatus of a photographing apparatus, comprising:

a movable unit that has one of an imaging device and a hand-shake correcting lens, and that can be moved on a plane which is perpendicular to an optical axis of a photographing optical system of said photographing apparatus;

a fixed unit that supports said movable unit so as to be movable on said plane;

an urging member that extends, and then urges and fixes said movable unit at a predetermined position on said plane when said urging member is in the off state, and that shrinks, and then releases fixing said movable unit on said plane when said urging member is in the on state; and a moving apparatus that moves said movable unit on said plane;

said movable unit being moved and fixed at said predetermined position on said plane, by said moving apparatus, in a first time-length, after said urging member is set to the off state.

43. An anti-shake apparatus of a photographing apparatus, comprising:

a movable unit that has one of an imaging device and a hand-shake correcting lens, and that can be moved on a plane which is perpendicular to an optical axis of a photographing optical system of said photographing apparatus;

a fixed unit that supports said movable unit so as to be movable on said plane;

an urging member that extends, and then urges and fixes said movable unit at a predetermined position on said plane when said urging member is in the off state, and that shrinks, and then releases fixing said movable unit on said plane when said urging member is in the on state; and a moving apparatus that moves said movable unit on said plane;

said movable unit being moved and fixed at said predetermined position on said plane, by said moving apparatus, until a driving force which is needed to drive said moving apparatus becomes less than a predetermined standard-value, after said urging member is set to the off state.

44. An anti-shake apparatus of a photographing apparatus, comprising:

a movable unit that has one of an imaging device and a hand-shake correcting lens, and that can be moved on a plane which is perpendicular to an optical axis of a photographing optical system of said photographing apparatus;

a fixed unit that supports said movable unit so as to be movable on said plane;

an urging member that extends, and then urges and fixes said movable unit at a predetermined position on said plane when said urging member is in the off state, and that shrinks, and then releases fixing said movable unit on said plane when said urging member is in the on state; and a moving apparatus that moves said movable unit on said plane;

said movable unit being moved and fixed at said predetermined position on said plane, by said moving apparatus, in a second time-length, after said urging member is set to the on state.

45. An anti-shake apparatus of a photographing apparatus, comprising:

a movable unit that has one of an imaging device and a hand-shake correcting lens, and that can be moved on a plane which is perpendicular to an optical axis of a photographing optical system of said photographing apparatus;

a fixed unit that supports said movable unit so as to be movable on said plane;

an urging member that extends, and then urges and fixes said movable unit on said plane when said urging member is in the off state, and that shrinks, and then releases fixing said movable unit on said plane when said urging member is in the on state; and a control apparatus that controls the on/off states of said urging member, where a current having a first current-value flows through said urging member after said urging member is set to the on state, in a third time-length, and a current having a second current-value flows through said urging member after said third time-length has passed;

said second current-value being less than said first current-value.

* * * * *